United States Patent
Osendorf et al.

(10) Patent No.: US 8,361,181 B2
(45) Date of Patent: Jan. 29, 2013

(54) AIR CLEANER ASSEMBLIES; FILTER CARTRIDGES THEREFOR; FEATURES; AND, METHODS

(75) Inventors: Richard Osendorf, St. Paul, MN (US);
Dolan Bartels, Delphi, IN (US);
Andrew Albitz, Mulberry, IN (US);
Bradley Keumpel, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 564 days.

(21) Appl. No.: 12/454,230

(22) Filed: May 14, 2009

(65) Prior Publication Data

US 2010/0037570 A1 Feb. 18, 2010

Related U.S. Application Data

(60) Provisional application No. 61/131,292, filed on Jun. 6, 2008.

(51) Int. Cl.
*B01D 46/00* (2006.01)
(52) U.S. Cl. ............. 55/498; 55/476; 55/502; 55/510
(58) Field of Classification Search ............ 55/476, 55/498, 502, 510; 210/437, 493.2, 497.01
See application file for complete search history.

(56) References Cited

U.S. PATENT DOCUMENTS

| | | |
|---|---|---|
| 2,962,121 A | 11/1960 | Wilber |
| 3,147,100 A | 9/1964 | Wilber |
| 3,201,927 A | 8/1965 | Karl0August Wachter |
| 3,295,680 A | 1/1967 | Wilber |
| 4,007,941 A | 2/1977 | Stancati |
| 4,135,899 A | 1/1979 | Gauer |
| 4,138,234 A | 2/1979 | Kubesa |
| 4,159,197 A | 6/1979 | Schuler et al. |
| 4,211,543 A | 7/1980 | Tokar et al. |
| 4,243,397 A | 1/1981 | Tokar et al. |
| 4,314,832 A | 2/1982 | Fox |
| 4,365,980 A | 12/1982 | Culbert et al. |
| 4,402,830 A | 9/1983 | Pall |
| 4,443,237 A | 4/1984 | Ulvestad |
| 4,491,460 A | 1/1985 | Tokar |
| 4,609,465 A | 9/1986 | Miller |
| D289,078 S | 3/1987 | Vassallo et al. |
| 4,720,292 A | 1/1988 | Engel et al. |
| 4,826,512 A | 5/1989 | Fuller |

(Continued)

FOREIGN PATENT DOCUMENTS

| EP | 0329659 | 8/1989 |
|---|---|---|
| GB | 2 005 777 | 4/1979 |

(Continued)

OTHER PUBLICATIONS

Pending drawings corresponding to U.S. Appl. No. 29/403,205, filed Oct. 3, 2011.

(Continued)

*Primary Examiner* — Robert Clemente
(74) *Attorney, Agent, or Firm* — Merchant & Gould P.C.

(57) ABSTRACT

Air cleaner assemblies and serviceable filter cartridges therefor are described. Example filter cartridges described which include a first end cap with a air flow aperture therethrough, having an outer axial surface and axial seal ring thereon. Example arrangements are provided with air flow inlet tube section defining the aperture through the first end cap. Also, water seal arrangements, typically positioned radially inwardly from the air seal arrangement, are described.

26 Claims, 43 Drawing Sheets

U.S. PATENT DOCUMENTS

| | | | |
|---|---|---|---|
| 5,474,337 A | | 12/1995 | Nepsund et al. |
| 5,484,466 A | * | 1/1996 | Brown et al. ............... 55/498 |
| 5,556,440 A | * | 9/1996 | Mullins et al. .............. 55/498 |
| 5,613,992 A | | 3/1997 | Engel |
| D386,246 S | | 11/1997 | Sonden et al. |
| 5,690,712 A | * | 11/1997 | Engel ........................... 55/428 |
| 5,730,769 A | | 3/1998 | Dungs et al. |
| 5,779,903 A | | 7/1998 | Smith et al. |
| 5,897,676 A | * | 4/1999 | Engel et al. ................. 55/498 |
| 5,938,804 A | | 8/1999 | Engel et al. |
| 5,954,849 A | | 9/1999 | Berkhoel et al. |
| 5,972,063 A | | 10/1999 | Dudrey et al. |
| 6,004,366 A | * | 12/1999 | Engel et al. ................. 55/428 |
| D427,668 S | | 7/2000 | Stout, Jr. |
| D427,673 S | | 7/2000 | Stout, Jr. |
| D435,090 S | | 12/2000 | Stout, Jr. |
| D437,034 S | | 1/2001 | Stout, Jr. |
| 6,187,073 B1 | | 2/2001 | Gieseke et al. |
| 6,258,145 B1 | * | 7/2001 | Engel et al. ................. 55/428 |
| 6,322,602 B2 | | 11/2001 | Engel et al. ................. 55/428 |
| 6,358,292 B1 | | 3/2002 | Clements |
| 6,413,289 B2 | * | 7/2002 | Engel et al. ................. 55/428 |
| 6,521,009 B2 | * | 2/2003 | Engel et al. ................. 55/428 |
| 6,537,339 B2 | * | 3/2003 | Schmitz et al. ............. 55/498 |
| D475,447 S | | 6/2003 | Stout, Jr. |
| D475,449 S | | 6/2003 | Stout, Jr. |
| D475,780 S | | 6/2003 | Stout, Jr. |
| 6,652,614 B2 | | 11/2003 | Gieske et al. |
| 7,083,661 B2 | * | 8/2006 | Hasegawa et al. .......... 55/498 |
| D534,253 S | | 12/2006 | Sandman et al. |
| 7,303,604 B2 | | 12/2007 | Gieseke et al. |
| 7,455,707 B2 | * | 11/2008 | Engel et al. ................. 55/428 |
| D646,368 S | | 10/2011 | Osendorf |
| 2008/0041026 A1 | | 2/2008 | Engel et al. |
| 2008/0066435 A1 | | 3/2008 | Engel et al. |
| 2010/0037570 A1 | | 2/2010 | Osendorf et al. |

FOREIGN PATENT DOCUMENTS

| | | |
|---|---|---|
| JP | 6-193524 | 7/1994 |
| JP | 6-207561 | 7/1994 |
| WO | WO 93/10881 | 6/1996 |

OTHER PUBLICATIONS

Drawings Corresponding to U.S. Appl. No. 29,308,264, submitted Dec. 29, 2010.

Allowed drawings corresponding to U.S. Appl. No. 29/403,205.

* cited by examiner

AIR CLEANER ASSEMBLIES; FILTER CARTRIDGES THEREFOR; FEATURES; AND, METHODS

CROSS-REFERENCE TO RELATED APPLICATIONS

The present application includes the disclosure of, with edits, U.S. provisional application Ser. No. 61/131,292 filed Jun. 6, 2008. A claim of priority to U.S. Ser. No. 61/131,292 is made to the extent appropriate. The complete disclosure of U.S. Ser. No. 61/131,292 is incorporated herein by reference.

FIELD OF THE DISCLOSURE

The present disclosure relates to air cleaners and particularly concerns an air cleaners in which serviceable filter cartridges are removably positioned, for use. The features characterized herein, are particularly adapted for use with air cleaner assembly configured for in-to-out air flow pattern, with respect to air flow through media in a filter cartridge when positioned within the air cleaner assembly. Assemblies; componentry and techniques are described.

BACKGROUND

Air cleaner assemblies are used for filtering engine air intake flow to a variety of equipment such as over-the-highway trucks. The air cleaner assemblies typically include a removable, serviceable, filter cartridge therein, which is removed during a servicing operation. In a typical servicing operation, the filter cartridge is removed from a remainder of the air cleaner assembly; and: is replaced by a new filter cartridge; or, is refurbished and replaced; or, is replaced with a previously used, but refurbished, filter cartridge.

Some air cleaner assemblies are configured for use with filter cartridges constructed and arranged for in-to-out flow, during filtering. Example systems are described, in U.S. Pat. Nos. 5,613,992; and, 6,521,009; each of which is incorporated herein by reference. A general characteristic of such assemblies is that the media pack is positioned around an open filter interior. Unfiltered air is directed from the environment through an end cap, into the open interior of the cartridge. It is then directed through the media pack in an "in-to-out" pattern, with respect to filtering flow through the media pack of the filter cartridge. The filtered air, now positioned in a clean air annulus surrounding the filter cartridge, is directed outwardly from the air cleaner, into appropriate duct work for direction to equipment with which the cleaned air is used. Typically, the duct work is directed, eventually, to the filtered air intake for an engine.

Improvements have been desired in such air cleaner assemblies as those characterized in the previous paragraphs, with respect to such features as: ease of assembly; ease of installation; convenient servicing; and, convenient air cleaner housing configuration. Features characterized herein provide for improvement in "in-to-out" flow air cleaner assemblies, in these and other areas.

SUMMARY

According to the present disclosure air filter cartridges or cartridge arrangements for use in air cleaner assemblies are provided. The air filter cartridges are generally configured for removable positioning in the air cleaner housing, for use. That is, the filter cartridge is installed in a housing for use and it is removed therefrom during a servicing operation.

In general terms, the air filter cartridges characterized herein include a media pack comprising media surrounding an open interior and having first and second ends. The media typically defines an outer media perimeter and an inner media perimeter. The media can comprise, for example, pleated media configured in a cylindrical form.

A first end cap is positioned on the first end of the media. Typically, an air inlet tube section, separate from the air cleaner housing, is included as part of the filter cartridge. The air inlet tube section is typically retained in the cartridge, as the cartridge is installed in, and removed from the air cleaner, although alternatives are possible. The air inlet tube section generally extends through the first end cap and surrounds and defines the central air flow inlet aperture. Although alternatives are possible, in a typical application the air inlet tube section is non-removable from a remainder of the first end cap. By "non-removable" in this context, and by similar terms, it is meant that the air inlet tube cannot be separated from a remainder of the first end cap, (and thus from a remainder of the cartridge), without damage to the cartridge. It is noted that in an alternate embodiment described herein, the air inlet tube is specifically made to be separable from a remainder of the cartridge.

The air inlet tube section typically includes a section projecting axially away from a remainder of the filter cartridge, and typically to a location at least 10 mm, usually at least 20 mm and typically an amount within the range of 25-60 mm beyond a first end of the media, outwardly from the filter cartridge. By the term "axially" and variants thereof in this context, reference is meant to projection in a direction according to a central longitundal axis of the filter cartridge, around which the media pack is positioned. The term is not meant to require a specific, parallel, alignment with a filter cartridge central longitundal axis, in this extension. For example, the air inlet tube can flare outwardly radially away from the central axis, as it extends generally axially. This is shown in an example. However, when reference is made to a distance from the end of the media, reference is meant to a straight line, axial measurement.

Typically, a housing axial air seal ring is positioned surrounding, and spaced radially outwardly from, the central air flow inlet aperture. The housing axial air seal ring generally comprises an axial seal ring projection on the first end cap, in axial overlap with the media pack, oriented to form an axial seal with a housing, when the cartridge is properly installed in a housing. The axial air seal ring defines a free distance of extension or projection (i.e. non-compressed extension) axially away from the media. Typically, the air inlet tube section projects, axially, at least 10 mm, usually at least 15 mm and often an amount within the range of 20-50 mm, inclusive, further from the media than the housing axial seal ring.

The filter cartridge typically includes a second end cap on a second end of the media. In example arrangements described herein, the second end cap includes an outer perimeter radial housing seal portion. The outer perimeter radial housing seal portion generally comprises a portion of the second end cap configured to form an outwardly directed, peripheral, radial seal with an air cleaner housing, when installed. In typical example arrangements described herein, the second end cap includes a central portion with a drain aperture arrangement therethrough, which allows water to drain from an interior of the cartridge exteriorly, downwardly, when positioned in an air cleaner housing when in use.

Example air filter cartridges depicted herein also typically include a water seal projection thereon, typically spaced radially inwardly from a peak of the housing axial air seal ring, and defining an outer, radial, housing water seal surface. The water seal projection is generally configured to form a water seal with a portion of an air cleaner housing, when properly installed. Such a water seal inhibits water from flowing into selected regions between the filter cartridge and the housing, to advantage.

Further advantageous features of air filter cartridges for removable use in an air cleaner housing, are described. In addition, air cleaner assemblies (including such filter cartridges positioned in an air cleaner housing) are described, as well as features, methods of assembly, servicing and use.

It is noted that there is no specific requirement that a filter cartridge or assembly include all of the features characterized herein, in order to obtain some benefit according to the present disclosure.

BRIEF DESCRIPTION OF THE DRAWINGS

in FIG. 5 selected internal componentry being shown.

in FIG. 13 the filter cartridge being depicted with portions shown in cross-section, and selected portions shown in phantom view.

in FIG. 30 an inlet screen portion depicted removed to view internal features.

in FIG. 35 a screen portion being removed, for viewing internal detail.

DETAILED DESCRIPTION

I. A First Embodiment, FIGS. 1-29A

A. General Air Cleaner Features, FIGS. 1-5

Figure 1:
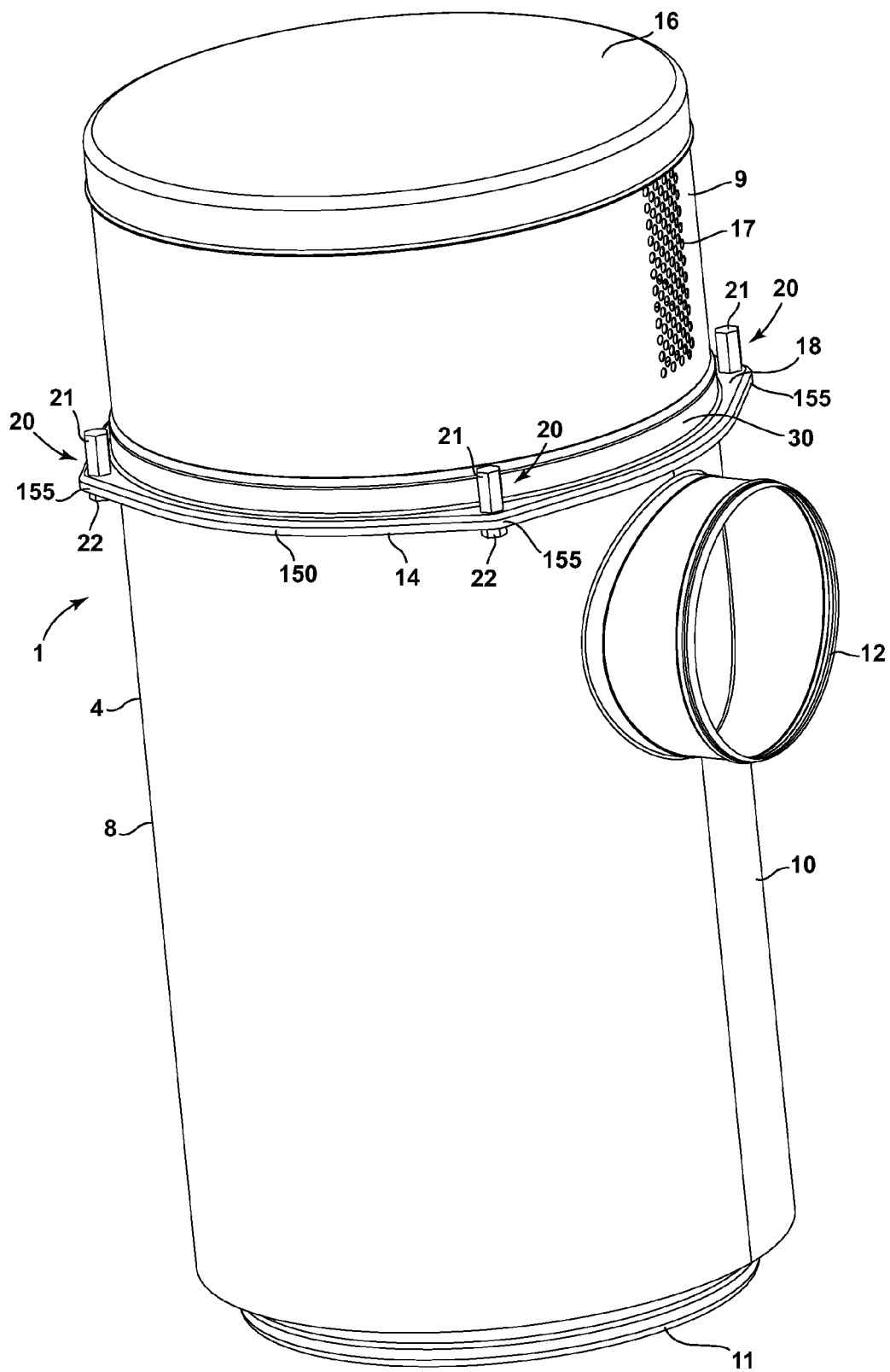
FIG. 1 is schematic, top perspective view of an air cleaner assembly according to the present disclosure.

Reference numeral 1, FIG. 1 generally designates an air cleaner (or air cleaner assembly or arrangement) according to the present disclosure. The air cleaner 1 comprises a housing 4 in which is removably received a serviceable filter cartridge 5, not viewable in FIG. 1, see FIG. 3. By the term "removably received" in this context, it is meant that the filter cartridge 5 can be installed in the housing 4, and it can be removed from the housing 4, without damage to either the filter cartridge 5 or the housing 4.

Still referring to FIG. 1, the housing 4 includes main body or bottom section 8, and a removable access (or service) cover assembly 9. In general terms, with selective removal of the access cover assembly 9, service access to an interior of housing 4 is obtained, for servicing (removing or installing) an interiorly received filter cartridge 5, FIG. 6.

Still referring to FIG. 1, for the particular air cleaner 1 depicted, the bottom section 8 includes sidewall 10 and bottom end 11. On the sidewall 10 is provided an air flow outlet arrangement 12.

In addition, bottom section 8 includes, at an upper portion of sidewall 10, mounting ring or flange 14, which is engaged by access cover assembly 9.

Still referring to FIG. 1, access cover assembly 9 includes: top 16; perforated (side or perimeter) air flow inlet section or screen 17; and, mounting ring or flange 18. The access cover assembly further includes a centering and seal plate arrangement 30, discussed below. The access cover assembly 9 is secured in place on bottom section 8, by engagement between flanges 14 and 18, at fasteners 20. Further, for the example assembly 1 depicted, to separate the access cover assembly 9 from the bottom section 8, a service provider unfastens nuts 21 from bolts 22 of fasteners 20, and lifts access cover assembly 9 upwardly.

Housing 4 can be constructed from a variety of materials. The particular air cleaner assembly 1 depicted, is provided with a housing 4 formed from metal parts, such as sheet metal (stainless steel). In typical instances, the metal will have been highly polished on exterior surfaces, to provide for an attractive appearance.

Many of the features of the assembly 1 are analogous to those described in U.S. Pat. No. 6,521,009, incorporated herein by reference. There are, however, some key differences, described in detail below.

In general, assembly 1 is configured so that air to be filtered passes into the housing 4 through perforated air flow inlet section or screen 17. Within an interior of housing 4, the air is directed into a filter cartridge 5, and, once filtered by passage through the filter cartridge 5, the air exits the housing 4 through side outlet 12.

The assembly 1 would typically be mounted on the side of an over-the-highway truck, in use. Thus, a substantial flow of air, from truck movement, will enter and flow through screen 17. Much of this flow will not enter cartridge 5.

Figure 2:
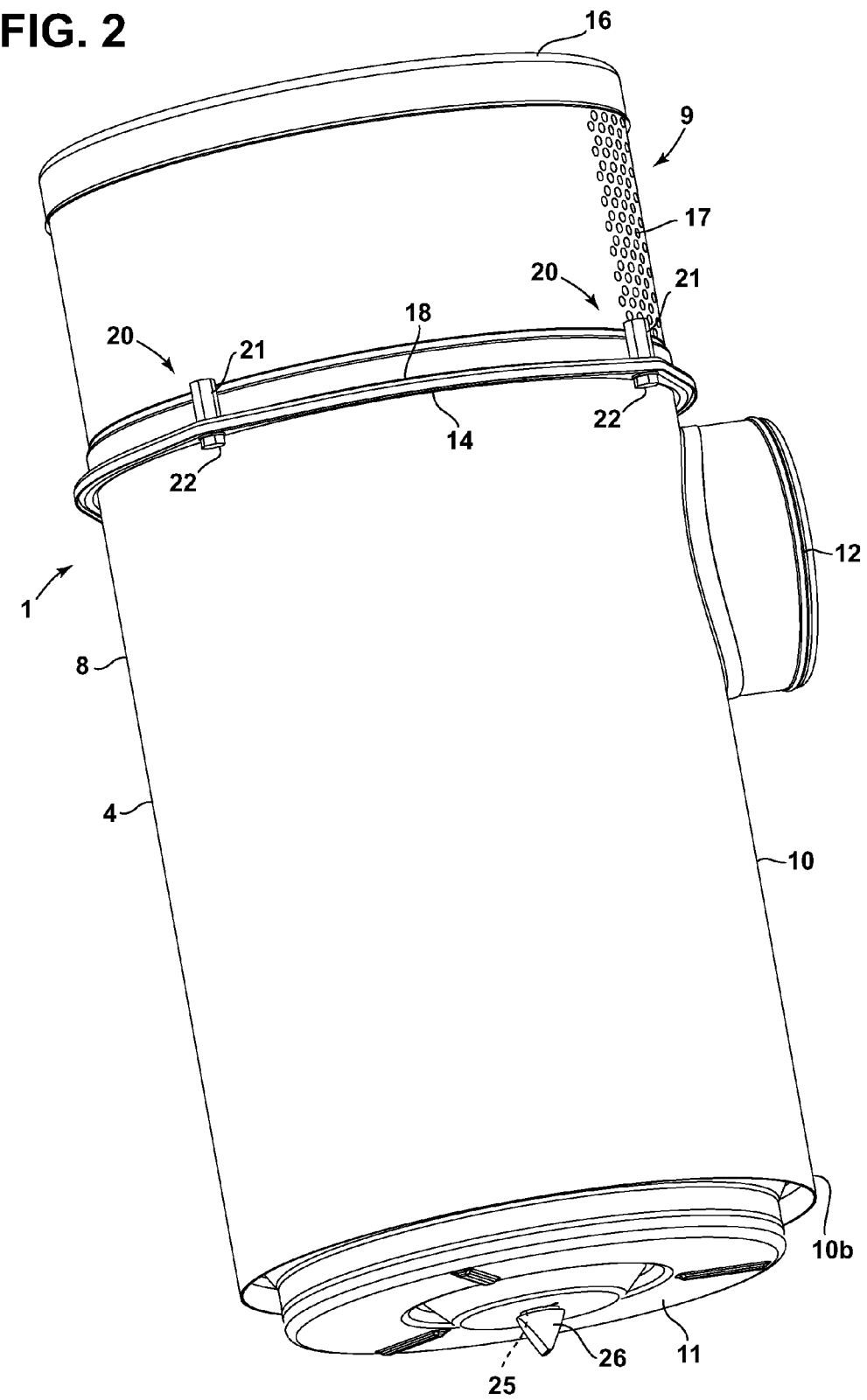
FIG. 2 is a schematic, bottom perspective view of the air cleaner assembly of FIG. 1.

In FIG. 2, a bottom perspective view of assembly 1 is provided. Here, bottom 11 can be seen. The bottom 11 includes a central aperture arrangement 25, covered by evacuator valve arrangement 26. Aperture arrangement 25 generally operates as a housing drain, for drain flow of water collected within housing 4 therefrom. The evacuator valve arrangement 26 allows for controlled release of the water from an interior of housing 4.

Figure 3:
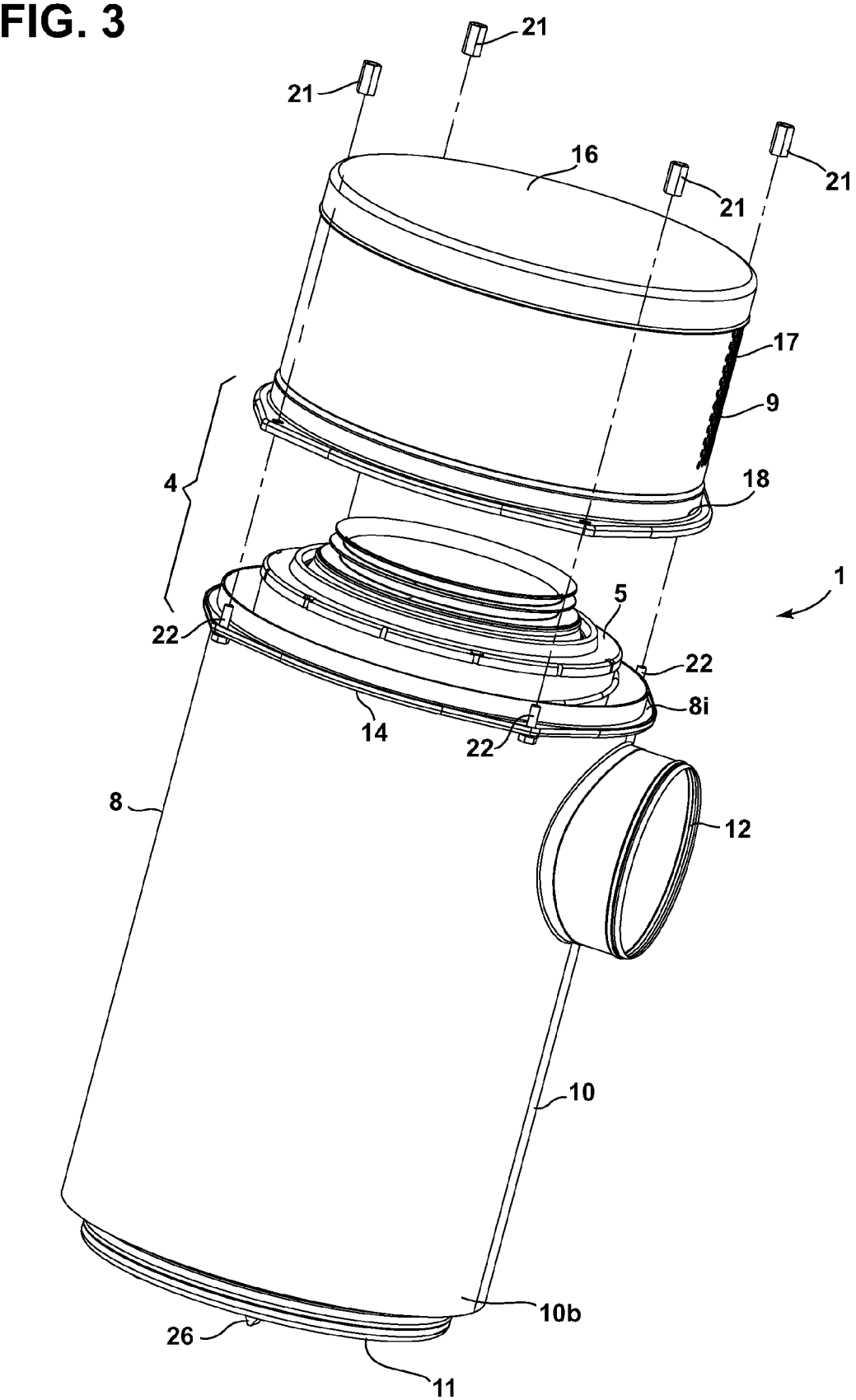
FIG. 3 is a schematic, exploded, perspective view of the air cleaner assembly of FIG. 1, depicting an access cover assembly separated from a body assembly having a filter cartridge removably positioned therein.

Attention is now directed to FIG. 3, an exploded perspective view depicting access cover assembly 9 separated from bottom section 8. It can be seen that nuts 21 have been loosened allowing for the separation. Filter cartridge 5 can be seen operably positioned within an interior 8i of bottom section 8, protruding upwardly therefrom.

Figure 4:
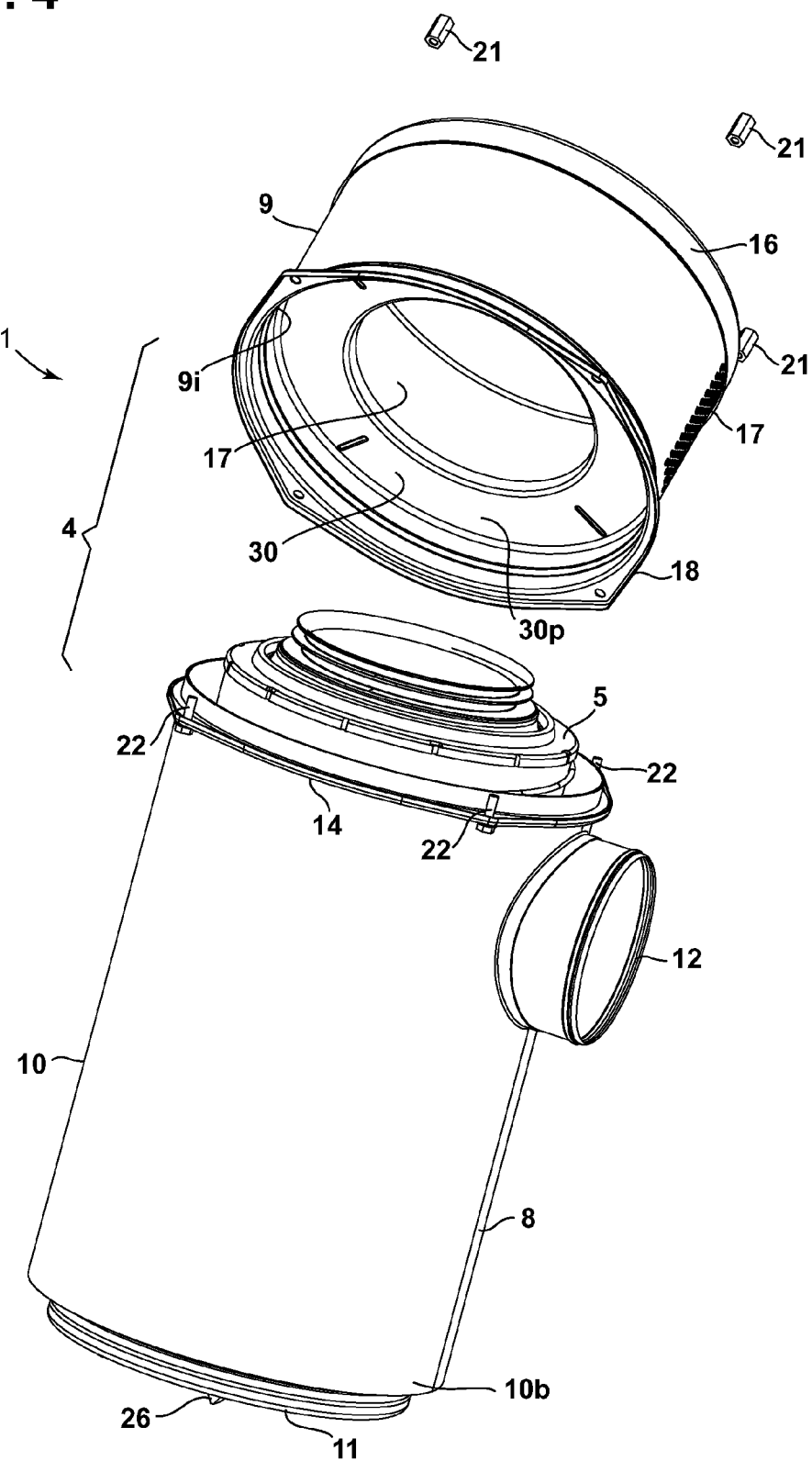
FIG. 4 is a second, schematic, exploded view analogous to FIG. 3, depicting a bottom perspective view of the cover assembly.

Attention is now directed to FIG. 4, a view analogous to FIG. 3 except providing a bottom perspective view of access cover assembly 9. Here, centering and seal plate 30 is viewed with ring or seal plate (portion) 30p positioned within an interior 9i of access cover assembly 9. The seal and centering plate 30 provides for a number of operations, described in detail below. In general, these features include: providing for air sealing engagement with cartridge 5, to inhibit flow of unfiltered air from inlet section 17 to outlet 12; providing a second sealing relationship with cartridge 5, to inhibit water leakage from inlet section 17 to regions above cartridge 5; and, providing a centering function to help center the cartridge 5 in a desirable position in housing bottom section 8, as the access cover assembly 9 is positioned on the bottom section 8, to ensure the cartridge 5 is properly positioned.

Figure 5:
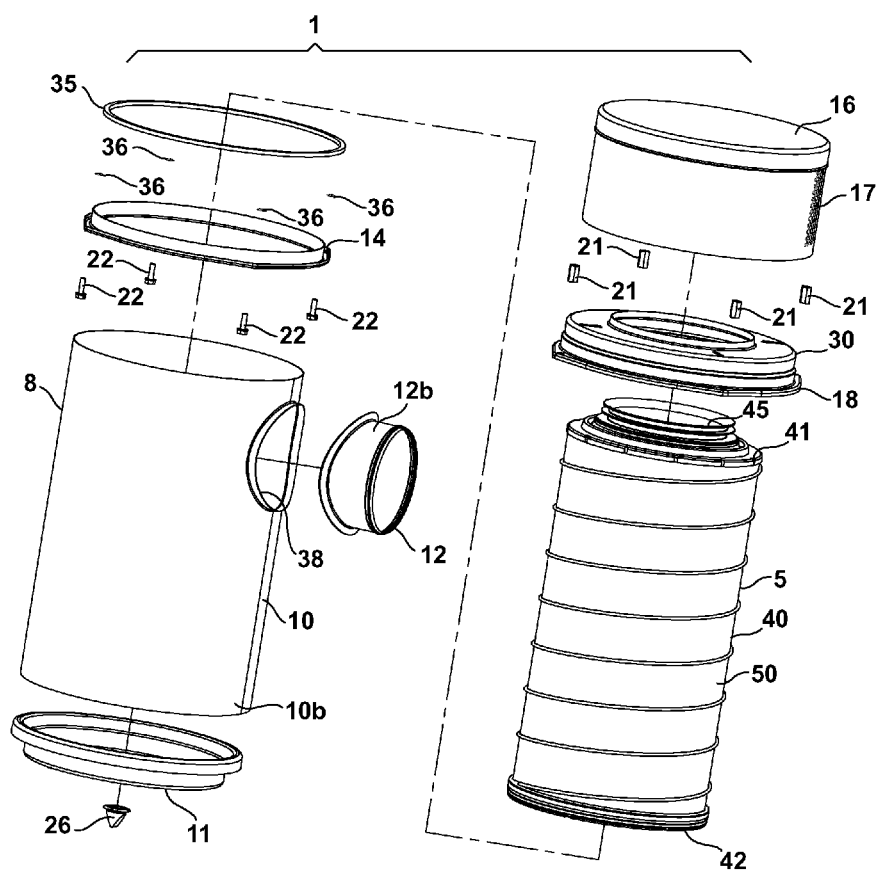
FIG. 5 is a schematic, exploded, perspective view of the assembly of FIGS. 1 and 2.

Attention is now directed to FIG. 5, a more completely exploded view of air cleaner assembly 1. Referring to FIG. 5, certain portions of access cover assembly 9 are shown separated from one another. In particular, top 16 with perforated air flow inlet section 17 attached thereto, is shown separated from seal and centering (or centering and seal) plate 30 having mounting flange 18 secured thereto (Typically, screen 17 is attached to plate 30 by spot welding). Nuts 21 are separated from bolts 22. Filter cartridge 5 is viewed separated completely out of the housing 4. Gasket 35 is viewable. The gasket 35 would typically be positioned between mounting ring or flange 18 and mounting ring or flange 14. Mounting flange 14 is shown separated from sidewall 10, the two normally being welded together. Washers or retainers 36, for bolts 22 and nuts 21, to form fasteners 20, FIG. 1, are viewable.

Referring to FIGS. 4 and 5, it is noted that typically bolts 22, once installed in ring 14 are not separable therefrom. Thus, the bolts 22, may, for example, be spot welded in place on ring 14.

Sidewall 10 is depicted with aperture 38 therethrough, over which outlet tube 12b, to form side outlet 12, is mounted, typically by welding. A bottom end 10b of sidewall 10 is closed by bottom 11, shown separated by sidewall 10. Typically bottom 11 is welded to an interior portion of sidewall 10. Evacuator valve arrangement 26 is shown separated from bottom 11.

Still referring to FIG. 5, in general cartridge 5 comprises a media pack 40 extending between first and second end caps 41, 42. First end cap 41 includes a central aperture 45 therethrough, in communication with an open interior surrounded by media 50 of pack 40. In operation, air flow enters air cleaner 1 through perforated air flow inlet screen 17. The air is directed downwardly into an open interior of cartridge 5, through aperture 45. The air then exits through the media pack 40, into an annular region 37, FIG. 6, in bottom section 8 surrounded by sidewall 10 and surrounding media pack 40. The air is then directed outwardly through outlet 12, into duct work directing the air to appropriate engine components, typically ultimately to a combustion air intake for engine of a vehicle such as, for example, an over-the-highway truck.

It is noted that the example end cap 42 includes drain features thereon, for draining water therefrom, outwardly from cartridge 5 and bottom section 8.

When cartridge 5 is operably installed, end cap 41 is an upper end cap and end cap 42 is a lower end cap.

B. The Filter Cartridge 5, FIGS. 6-29A

Figure 6:
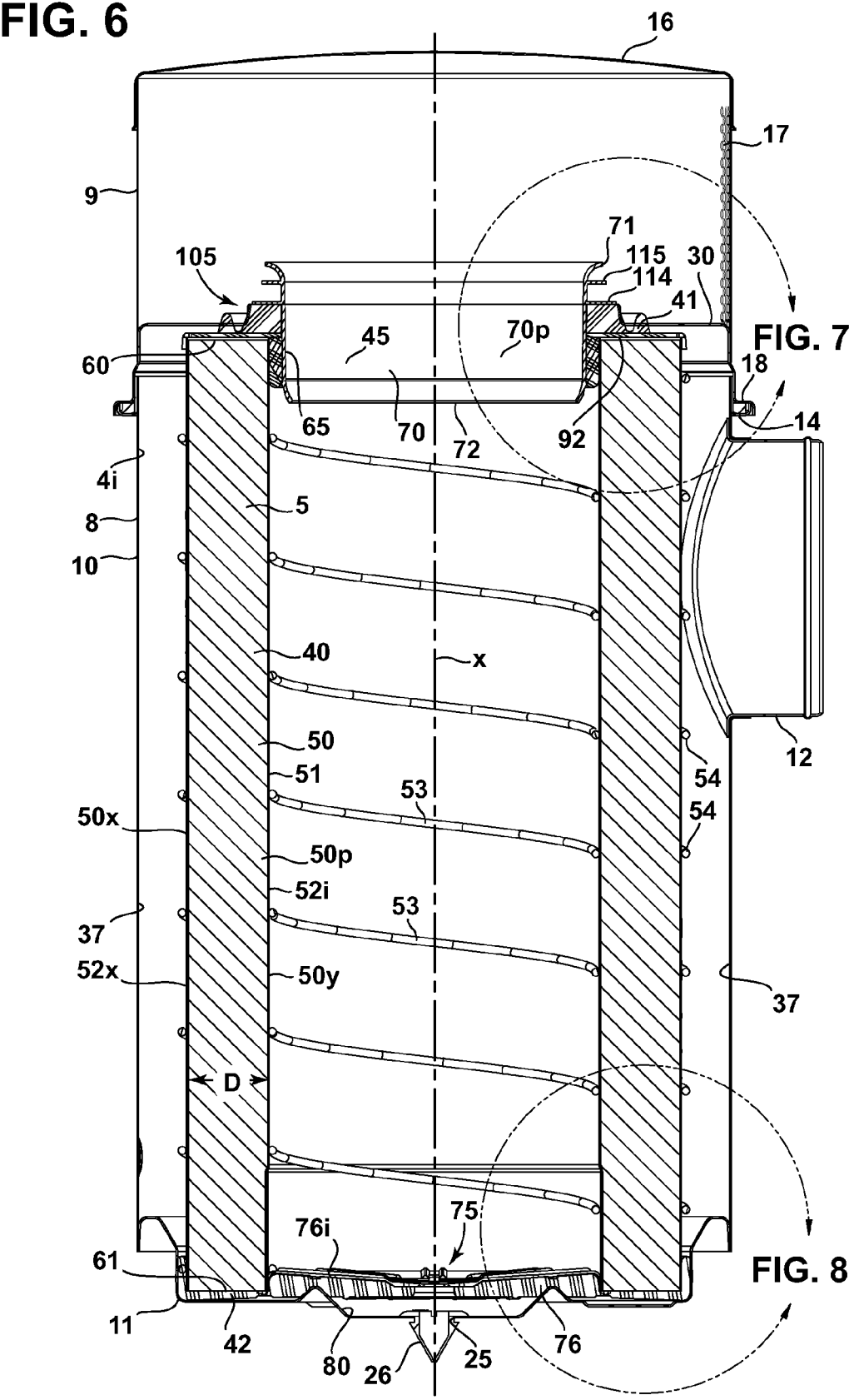
FIG. 6 is a schematic, cross-sectional view of the assembly of FIGS. 1 and 2.

Attention is now directed to FIG. 6, a cross-sectional view of air cleaner assembly 1. In FIG. 6, the assembly 1 is oriented as it would be, for normal use, with access cover assembly 9 positioned above bottom section 8.

Referring to FIG. 6, cartridge 5 is shown in position within interior 4i of housing 4. Cartridge 5, again, comprises media pack 40 positioned in extension between first and second end caps 41, 42 respectively. Media pack 40 comprises media 50 positioned in extension around an open filter interior 51, in extension between end caps 41, 42. The media 50 can comprise a variety of air filter media, and typically comprises pleated media 50p. In general, the media 50 defines an outer media perimeter 50x and an inner media perimeter 50y. When pleated media 50p is used, the outer perimeter 50x is defined by outer pleat tips and the inner media perimeter 50y is defined by inner pleat tips. Pleat depth dimension D, FIG. 6, generally corresponds to a distance between the outer perimeter 50x and inner perimeter 50y.

Media pack 40 can include an inner media support liner 52i; and/or an outer media support liner 52x. In the example cartridge 5 depicted, both an inner media support 52i and an outer media support liner 52x are present. Each liner, 52x, 52i, in a typical example, will comprise expanded metal, although alternatives are possible. Referring to FIG. 6, hot melt inner coil 53 is depicted, to facilitate pleat spacing; and, hot melt outer coil 54 is provided, to facilitate pleat spacing.

Referring to FIG. 6, media 50 can be viewed as having a first end 60 and a second, opposite, end 61. The first end 60 generally comprises an end of the media 50 adjacent to, and typically embedded in, end cap 41; and, second end 61 and be viewed as comprising an end of media 50 adjacent to, and typically embedded in, end cap 42.

End cap 41 includes a central air flow inlet aperture 45 therethrough. The inlet aperture 45 is surrounded by, and defined by, inlet tube, inlet tube arrangement or inlet tube section 70. Typically, the aperture 45 is as large as possible, to provide as little resistance or restriction to air flow entering into interior 51, as possible. Typically, aperture 45 is at least, at its smallest portion, of a diameter at least 65% of a dimension across open interior 51, and typically 70% or more.

The particular inlet tube section 70 depicted, comprises a first outer edge 71 and opposite second inner edge 72. The outer edge 71 defines an air flow inlet end for inlet section tube 70. In general terms, the inlet tube section 70 can be viewed as having an axial outer end 71 and an axial inner end 72. By the term "axial" end, reference is generally meant that in the general direction of a central axis X, FIG. 6, extending through the cartridge 5 and air cleaner 1. Thus, the term "axial" means in the direction of the axis X. However, the term "axial" is not meant to require perfectly parallel extension to the central axis X. End 71 is an outer axial end of tube section 70, since it is an end tube 70 in extension generally along axis X, exterior to the media pack 40. End 72 is an inner axial end, since it is an end of tube section 70, in the general direction of axis X, most inwardly positioned with respect to media pack 40.

It is noted that end 71, in the example tube section 70 depicted, FIG. 6, is flared radially outwardly away from axis X; and, end 72 is flared radially inwardly toward axis X. The inner edge 72 defines and comprises an outlet edge for air flow from inlet tube section 70 into media interior 51.

In the example depicted, inlet tube section 70 is secured to a remainder of filter cartridge 5. A portion 71 of inlet tube section 70 projects axially outwardly from aperture 45 in a direction away from end cap 42 and above, i.e. beyond, media pack 60. Typically, tip 71 extends to a position located at least 10 mm, usually at least 20 mm; and, often an amount within the range of 25-60 mm, beyond end 60 of media 50. The tip 71 may extend to a location in axial alignment with end 61, i.e. to a location actually, axially, positioned over end 60, or portion 71 may stop short of sufficient radial outward extension to reach a location over end 60. In any event, the references to an mount of axial extension or projection are meant to refer to a shortest, straight line, axial measurement parallel to axis X.

Inlet tube section 70 also projects inwardly toward end cap 42, to edge 72. In general, inlet tube section 70 provides for a preferred inlet flow of air from access cover assembly 9 to interior 51 of cartridge 5.

In the particular example assembly 1 depicted in FIG. 6, the inlet tube section 70 is non-removably secured to a remainder of cartridge 5. By this it is meant that the tube section 70 cannot be separated from a remainder of cartridge 5, i.e. from a remainder of end cap 41, without damage to either the cartridge 5 or the inlet tube section 70. In general, the inlet tube section 70, whether removable or not, does not comprise either a portion of the housing 4; nor does it form part of, and remain with, the housing 4 when the cartridge 5 is removed; nor is inlet tube section 70 a portion of further inlet duct work, from which cartridge 5 is separated as cartridge 5 is removed from housing 4. Even if inlet tube section 70, as described for the embodiment below, is separable from the cartridge 5, it is viewed as a portion of the cartridge 5 component, and not part of the housing 4 or some engine duct work system.

Still referring to FIG. 6, end cap 42 forms a bottom end cap. End cap 42 can typically be characterized herein as a drain end cap, when end cap 42 is defined with aperture arrangement 75 therethrough. Referring more specifically to end cap 42, FIG. 6, end cap 42 includes a central portion 76 extending across, and closing, filter interior 51. The particular central portion 76 depicted includes a drain aperture arrangement 75 extending therethrough. This allows water collected in interior 51, for example on an interior surface 76i of end cap 75, to pass through end cap 42 into housing region 80. From housing region 80 liquid can pass through aperture 25, in particular through evacuator valve arrangement 26, to be evacuated from air cleaner assembly 1.

A variety of arrangements can be used to define central portion 76, in particular interior surface 76i. Some usable ones are described in U.S. Pat. No. 6,521,009, incorporated herein by reference. The particular end cap 42 depicted, is generally analogous to an end cap described in U.S. Pat. No. 6,521,009.

Figure 7:
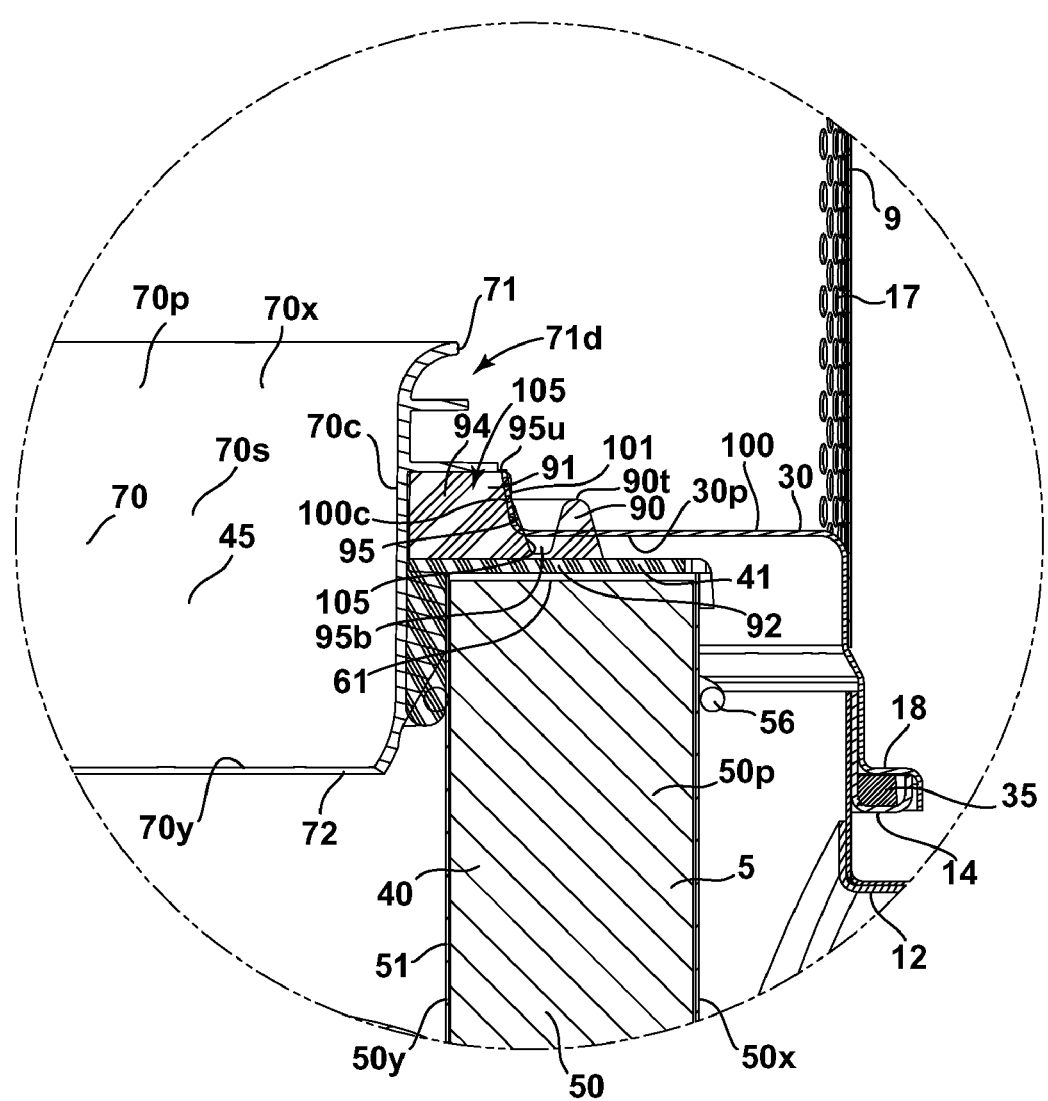
FIG. 7 is an enlarged, schematic, fragmentary view of a selected portion of FIG. 6.

Attention is now directed to FIG. 7, an enlarged, fragmentary view of a selected portion of FIG. 6. Referring to FIG. 7, inlet tube section 70 generally defines an inner surface 70s which is typically smooth and contoured. By the term "smooth" in this context, it is meant that preferably surface 70s is free of ribs, recesses bumps or projections that would tend to destabilize air flow thereacross. The particular inner surface 70s includes an upper outwardly flared portion 70x, which is positioned adjacent end 71 and defines an interior funnel surface. Surface 70s also includes a lower interior taper or projection portion 70y, which defines an inwardly flared surface portion, directed generally radially toward axis X, FIG. 6.

It is noted that surface portion 70x can be defined as a "bell", if desired. On the other hand it may be convenient to truncate tip 71 short of a perfect bell surface, for convenient assembly (axially). It is noted that in the particular assembly depicted, tip 71 terminates just over media 50, adjacent inner perimeter 50y.

Still referring to FIG. 7, surface 70s can be generally characterized as having an "open S-shaped" configuration. The term "S-shaped" generally refers to the surface definition of surface 70s, in cross-section. The term "open" in this context is meant to indicate that at the tips, 71, 72, the curvature is not completely over at least a semi-circular shape, but rather ends at a more open curve at each end; further, the center region 70a is straightened somewhat. Thus, at end 71, the flare is not typically turned to extend downwardly; at end 72, the flare is not typically turned to extend upwardly, and, in the center 70*c*, the "s" is straightened.

It is also noted that due to the outward flare adjacent tip 71, in region 71*d*, under tip 71, a "dead space" with respect to air flow into aperture 45 is created, which can help with water separation exteriorly of tube 70.

An advantage to the inwardly flare at end 72, i.e. region 70*y* is that air flow along surface 70*s*, carrying any water therewith, is generally directed toward axis X, FIG. 6. This will help the water separation to occur more toward a center region 76*i*, and away from the media 50.

In more general terms, the outward flare or approximate bell surface portion 70*x* is an air flow inlet tube section 70, with little or no entrance flow restriction. Flow over surface 70*s* to inwardly projecting end 70*y*, causes water on adjacent surface 70*s* (or in the air flow) to generally be directed toward central axis X. This will inhibit some of the water from reaching the media 50, and facilitate water separation without as a high level of soaking the media 50.

Still referring to FIG. 7, end cap 41 includes: a housing air seal member 90; a housing water seal member 91; and, end cap (axially inner base) portion 92. The housing seal member 90 and water seal member 91, together, can be seen as an axially outer end cap portion 105.

In more general terms, region 92 can be characterized as an axially inner molded-in-place base portion of end cap 41; and, region 105, comprising seal member 90 and water seal member 91, it can be characterized as an axially outer molded-in-place seal portion of end cap 41.

In general, the housing air seal member 90 is configured to form an air seal between the cartridge 5 and a portion of the housing 1. The example housing air seal member 90 depicted in FIG. 7 is configured to form an axial seal against a lower surface or ring 100 of seal and centering plate 30, i.e. against seal plate 30*p*. In FIG. 7, seal member 90 is depicted in a non-distorted configuration, schematically in overlap with ring 100. In the actual assembly, seal member 90 would be compressed by flange 100, forming the axial seal. Herein, in this context, the term "axial" is generally meant to refer to along a direction of forces of compression (seal) in the same general direction as a direction of extension of central axis X of cartridge 50 and/or assembly 1, FIG. 6. Typically, seal member 90 will be configured to compress, axially, an amount within the range of 30-60% of its height, from its free, non-compressed state, to its maximally compressed, extension or projection, when the axial seal is formed. Usable materials for seal 90 are described below, to accomplish this. The particular seal member 90 depicted, has a generally inverted v-shape, with an apex or tip 90*t* projecting furthermost in extension away from media 50. This shape will be typical, although alternatives are possible.

The example seal ring 90 depicted, is continuous in extension around tube 70 and central axis X. It is also typically positioned with tip 90*t* oriented at least 25% of a distance across media 50 (between outer perimeter 50*x* and inner 50*y*) from each of outer perimeter 50*x* and inner perimeter 50*y*. Usually it is located, across end 60, at least 33% of a distance from each perimeter 50*x*, 50*y*. It is typically centered axially over media 50.

Figure 8:
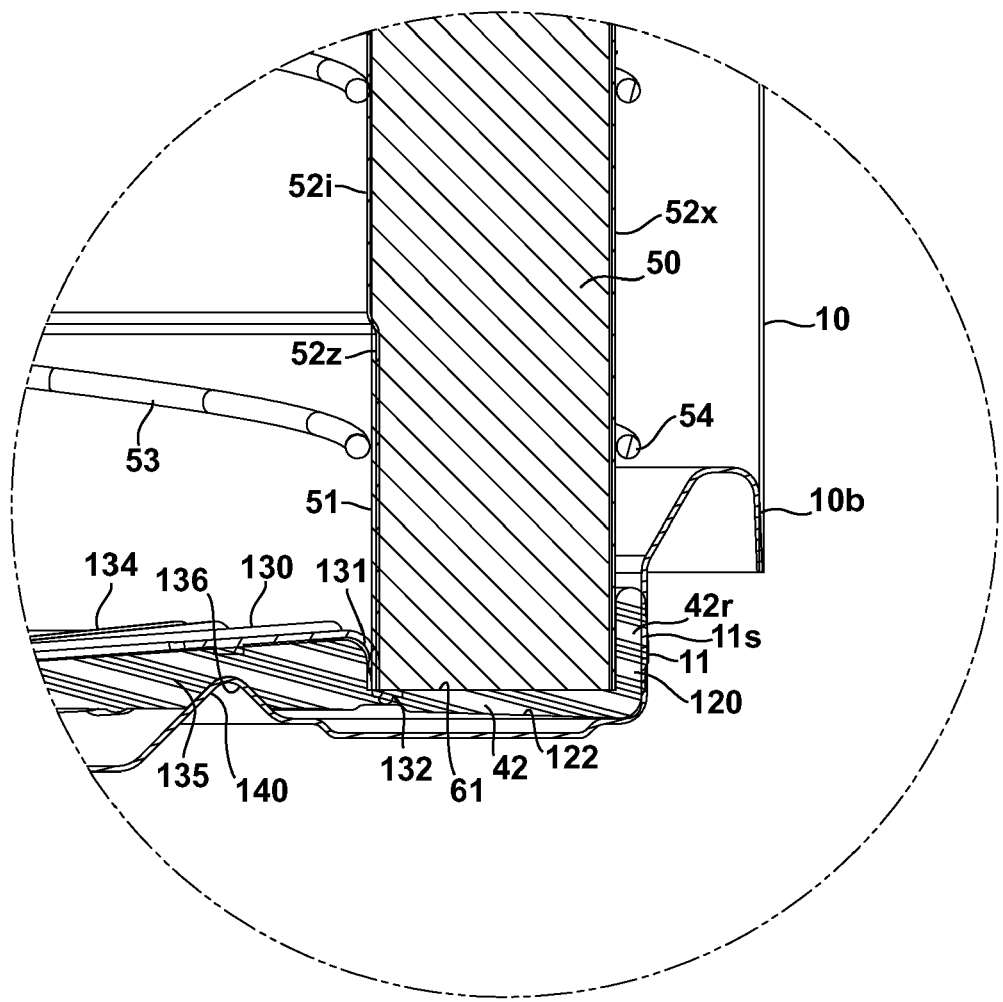
FIG. 8 is an enlarged, schematic, fragmentary, cross-sectional view of a second selected portion of FIG. 6.

In FIG. 8, an enlarged fragmentary view of a selected portion of FIG. 6 is depicted. Here, a portion of bottom end cap 42 is positioned at end 61 of media 50. Housing bottom 11 can be seen welded to sidewall bottom 10*b*. End cap 42 can be seen to have a portion 42*r* configured to form an outwardly directed radial seal with portion 11*s* of housing bottom 11. This is described in further detail below.

At end section 52*z*, inner liner 52*i* biased radially outwardly somewhat, to contain a media pack, comprising inner liner 52*i*, media 50 and outer liner 52*x*, together, during assembly.

Figure 9:
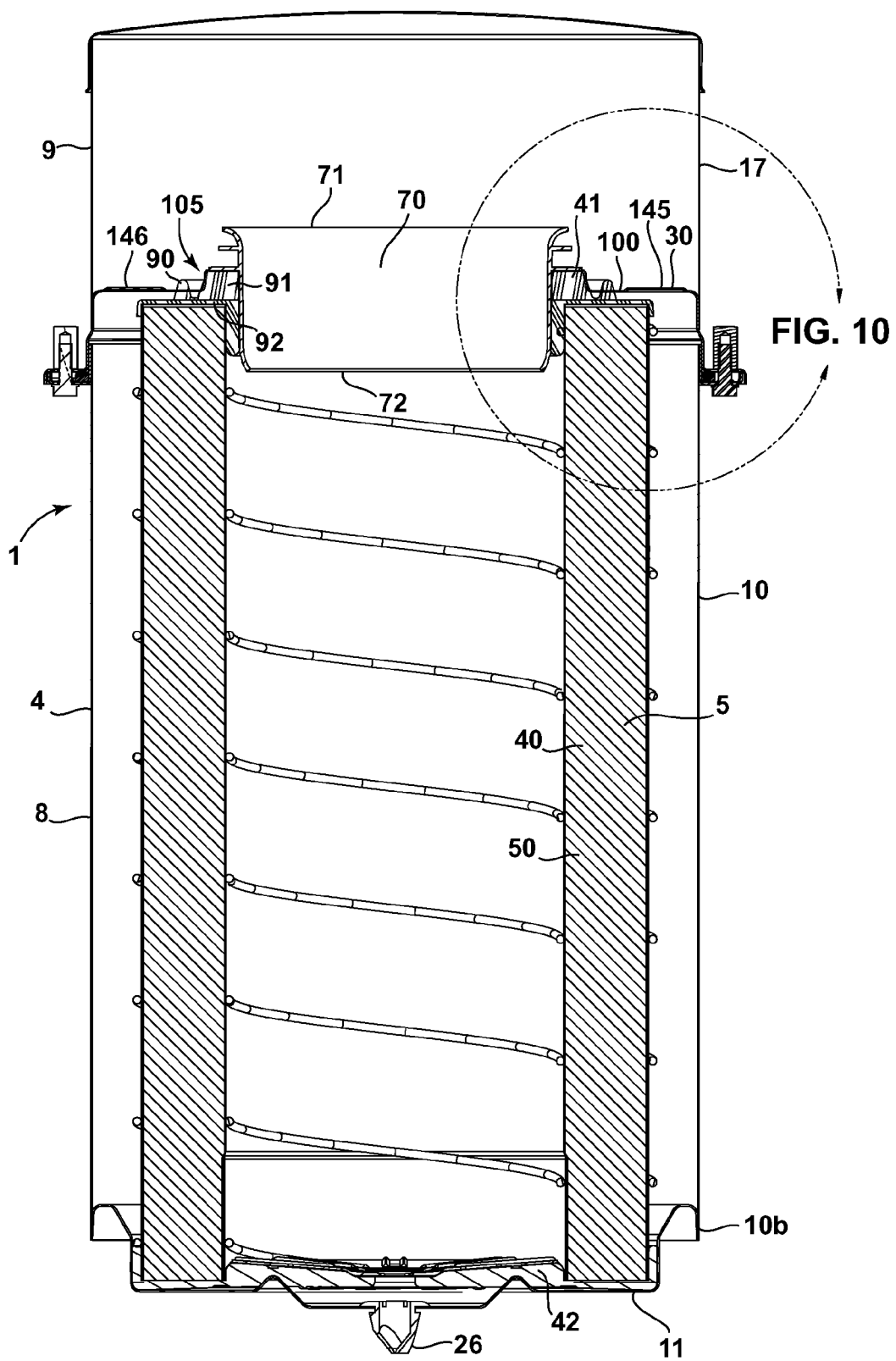
FIG. 9 is a second, schematic, cross-sectional view of the assembly of FIGS. 1 and 2, taken generally orthogonal to the view of FIG. 6.
Figure 10:
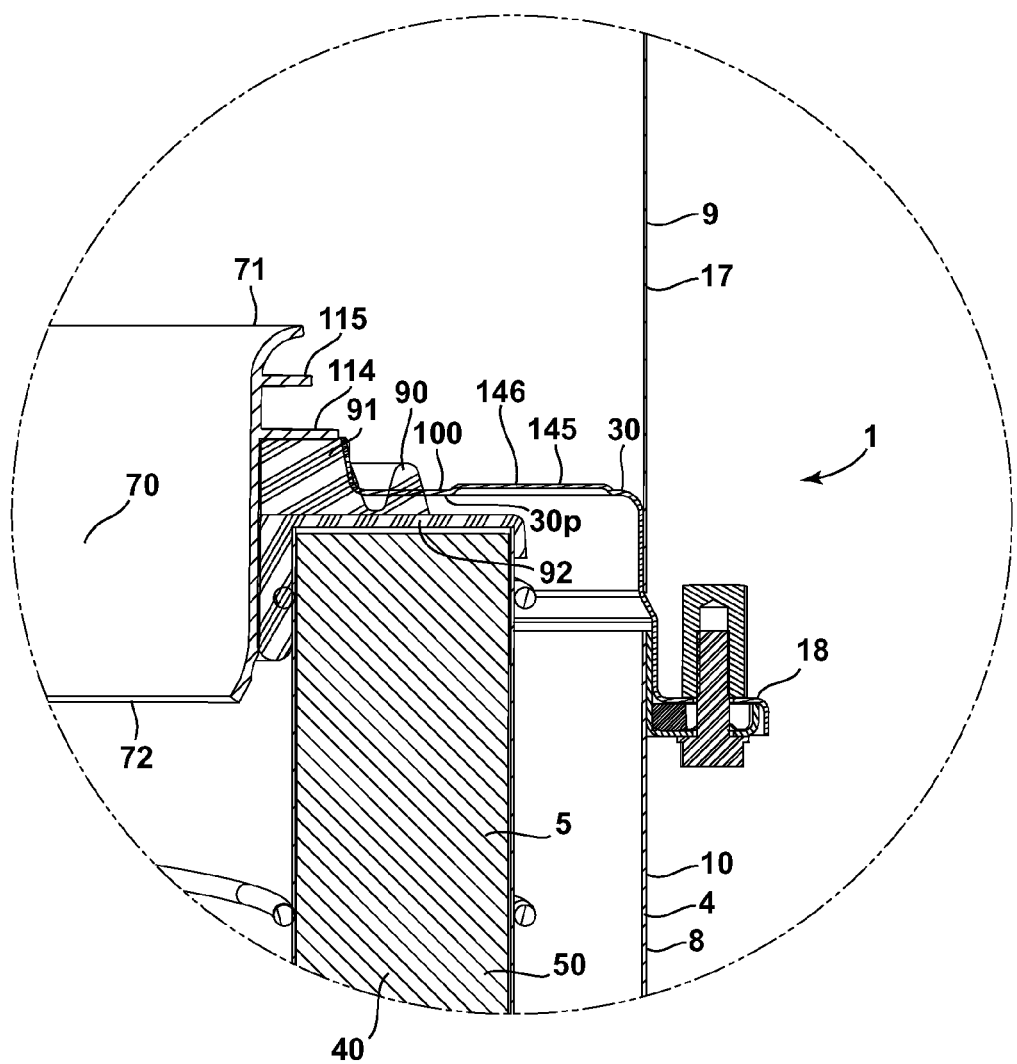
FIG. 10 is a schematic, enlarged, fragmentary, cross-sectional view of an identified portion of FIG. 9.

In FIG. 9, a cross-sectional view of assembly 1 is provided. Housing 4 containing cartridge 5 is viewable. In FIG. 10, an enlarged fragmentary view of a portion of FIG. 9 is provided.

Figure 11:
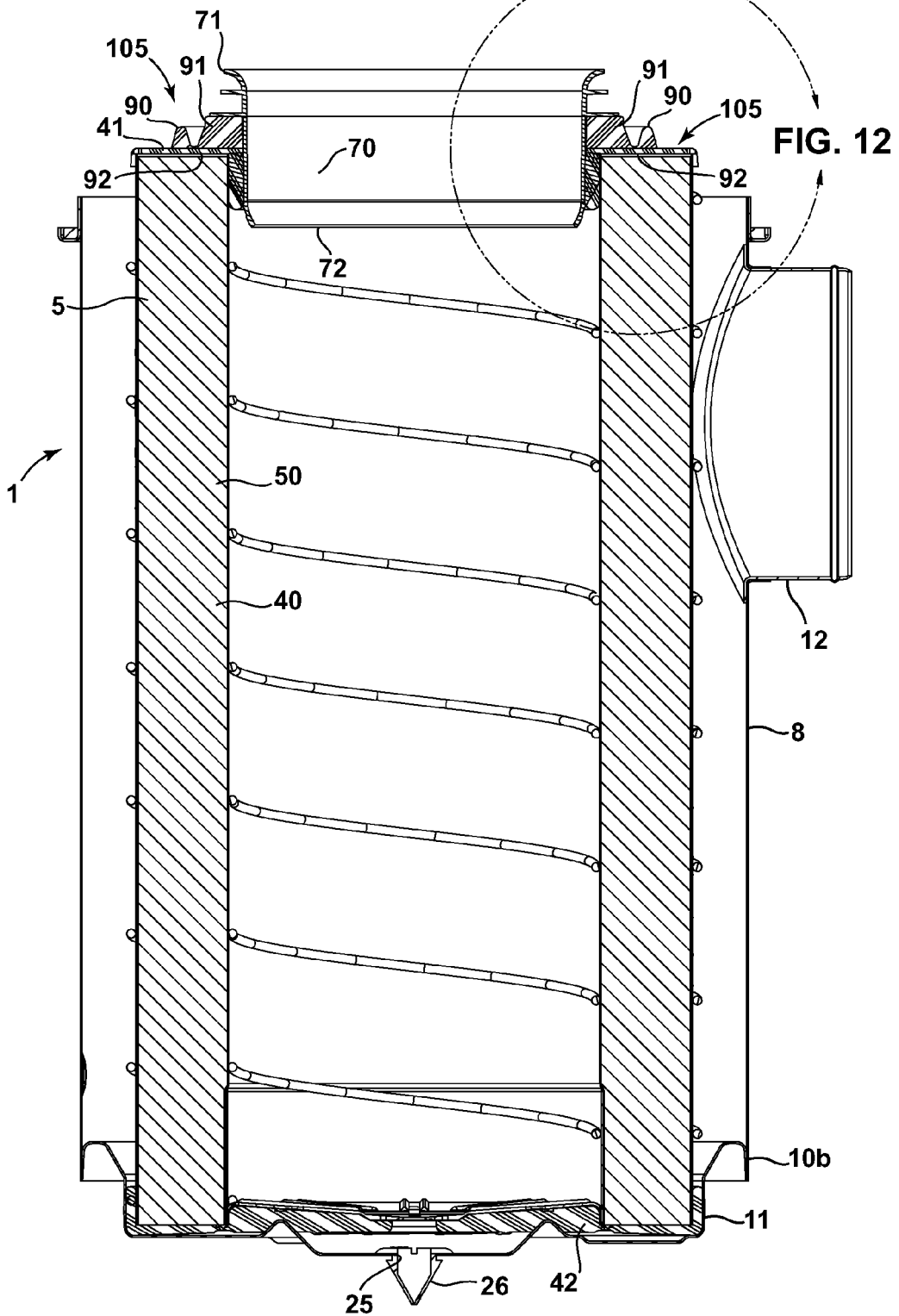
FIG. 11 is a schematic, cross-sectional view analogous to FIG. 6, depicting the assembly of FIGS. 1 and 2 with a cover assembly removed.
Figure 12:
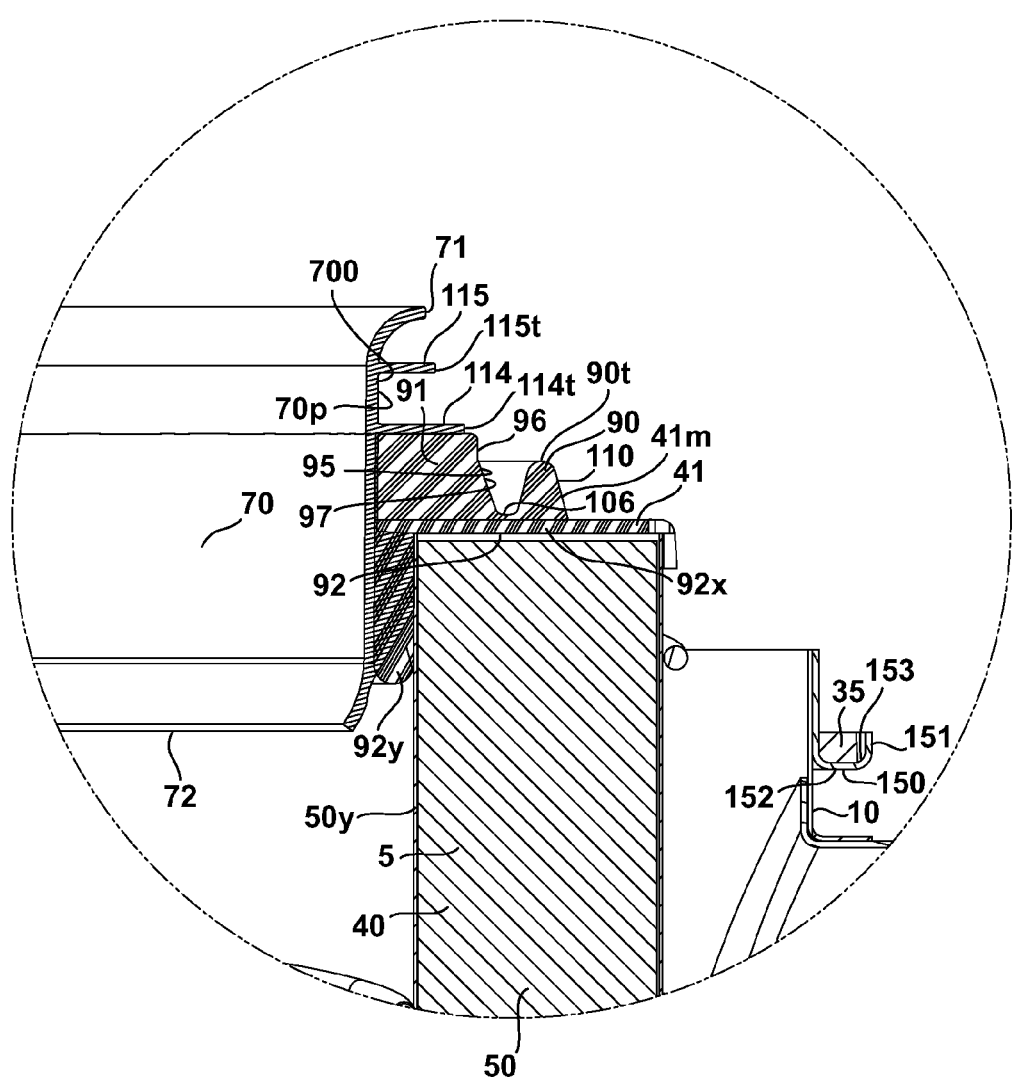
FIG. 12 is an enlarged, schematic, fragmentary view of an identified portion of FIG. 11.

In FIG. 11, air cleaner 1 is depicted with access cover assembly 9 removed, so cartridge 5 can be viewed with housing base 8, with end cap 41 not overlapped by seal ring 100, FIG. 7. Here, housing water seal 91 on cartridge 5, can be more readily reviewed. In FIG. 12, an enlarged view of a portion of FIG. 11, housing water seal 91 can be seen to have a radial outer surface 95. The radial outer surface 95 of the particular water seal 91 depicted has two sections: an uppermost vertical or nearly vertical section 96 and a lower generally flared or frusto-conical section 97, which extends generally radially outwardly in extension downwardly, from region 96, toward media 50.

Housing water seal 91 is positioned radially inwardly, on end cap 41, from housing inner seal member 90. Referring to FIG. 7, housing water seal 91 is configured with surface 95 oriented to project into central aperture 100*c* of ring 100, FIG. 7, to form a radially directed seal against (upwardly turned), inner end flange 101 of ring 100. Engagement between flange 101 and housing water seal member 91 will be to form a water seal between the two, inhibiting water leakage between the end cap 41 and seal and centering plate 30. This will inhibit damage to end cap 41, and leakage to outlet 12, should the water enter the indicated region. Thus, water seal 91 is typically radially continuous around axis X.

It is also noted that engagement between the ring 100 and the cartridge 5 is conducted where ring 100 engages, preferably, compressible or flexible material, such as foamed polyurethane. Thus, projection 91 and seal member 90 operate as vibration dampeners, limiting to the extent to which housing vibration is transferred into the cartridge 5. Thus, the mass of urethane on the top of the filter, that interfaces with the cover, can be seen as "isolator" of vibration. This is also facilitated by the seal member of the opposite end cap.

The vertical or nearly vertical section 96, FIG. 12, provides for a tolerance make-up. That is, as the length of cartridge 5 varies, or the location of ring 100 and/or end flange 101 vary, due to manufacturing tolerances, the vertical extension section 96, FIG. 12, will help ensure water seal against flange 101, nevertheless will occur.

Still referring to FIG. 12, in a typical arrangement housing water seal member radially sealing surface 95 will be radially inwardly spaced from tip 90*t* of air seal member 90, for example by ring recess 106. Often housing air seal member 90 and housing water seal member 91 will comprise integral portions of molded-in-place portion 41*m* (i.e. outer portion 105) of end cap 41, as shown.

Typically, recess 106 will have a deepest point well below a level of compression for axial seal ring 90, so as to provide clearance for extension of ring 101 across seal ring 90, for engagement with radial seal surface 95.

For the example depicted, FIG. 12, base portion 92, of end cap 41, provides the following operations. It includes an inner (axial) section 92*x* extending across end 60 of media pack 50, closing end 60. It includes a radial inner region 92*y* position adjacent interior perimeter of media pack 40 which provides for engagement with inlet tube section 70. It also operates as a support base, for air seal 90.

Typically base portion 92 will be molded from a material that is relatively hard, by comparison to the material used for mold 105, to form housing air seal member 90 and housing water seal member 91. For example, in a typical arrangement, mold 105, forming seal member 90, 91, will comprise compressible foamed polyurethane having an as molded density of no greater than 20 lbs/cu.ft. (0.32 g/cc) typically no greater 15 lbs/cu.ft (0.24 g/cc) and usually within the range of 10 lbs/cu.ft to 15 lbs/cu.ft (0.16 g/cc-0.24 g/cc) and a hardness, Shore A of no greater than 20, usually no greater that 18 and typically within the range of 12-18, inclusive. On the other hand, the material from which base 92 is formed, will typically comprise a polyurethane of at least 22 lbs/ft$^3$, (0.35 g/cc) typically at least 25 lbs/cu.ft. (0.4 g/cc). It will typically have a hardness, Shore A, of at least 22.

Referring still FIG. 12, it is noted that in the particular cartridge 5 depicted, inlet tube section 70 is non-removably secured within a remainder of cartridge 5. For the example cartridge 5 depicted, inlet tube section 70 can comprise a pre-form 70p, for example molded from plastic, secured to end cap 41, when end cap 41 is molded. For example inlet tube section 70 can include projections for mechanical engagement, embedded in region 92y of base portion 92, when base portion 92 is formed.

Inlet tube section 70, when pre-formed, will typically be formed of a plastic sufficiently robust for the intended use. It is expected that typically a glass filled polypropylene will be usable. If adhesion issues between the inlet tube section 70 and the end cap material (when polyurethane) are an issue, inlet tube section 70 may more conveniently be formed from a nylon, for example, glass filled nylon, material.

Alternate configurations for inlet tube section 70, and engagements between inlet tube 70 and a remainder of cartridge 5, are possible, and are discussed below.

Still referring to FIG. 12, projecting outwardly from end cap 41, inlet tube section 70 includes an outer perimeter 70o having first and second projections 114, 115 thereon.

In general, projection 114 comprises a ring, extending over housing water seal member 91. Ring 114 provides a number of functions. First, during a step of manufacturing end cap 41, ring 114 is helpful for supporting inlet tube section 70 in a desired positioned within a mold, and for providing a mold seal for resin used to form regions 105, 92. This is described below in connection with FIGS. 39 and 40. Also ring 114 provides a second, lower, centering ring for cartridge 5 (ring 115 providing a first, upper, centering).

Typically, ring 114 is positioned, axially, with an outer tip 114t in overlap with media 50, at a position, axially, at a higher location in extension away from media 50 than is tip 90t of seal ring 90. Typically, tip 114t is positioned spaced from media 50 at least 2 mm further than tip 90t, when seal ring is in a free, non-compressed, state. Usually the distance is within the range of 2 to 9 mm, inclusive.

In the example depicted, ring 114 extends continuously around an outer portion of tube 70.

Ring 115 is positioned on inlet tube 70, spaced upwardly, from ring 114. Ring 115 also typically extends continuously around an adjacent portion of inlet tube 70. The particular ring 115 depicted, does not extend radially outwardly from surface 70o as far as ring 114. Tip 115t is usually spaced at least 20 mm, typically an amount within the range of 20 to 50 mm, from media 50; and at least 5 mm, usually an amount within the range of 5 to 20 mm, from ring 114.

In general, ring 115 provides engagement projection or ring, for centering cartridge 5, in a manner discussed below.

For the example assembly depicted in FIGS. 6 and 7, as indicated above, the inlet tube section 70 can comprise a pre-from 70p, i.e. a piece made prior to the formation of cartridge 5, and before engaging end cap 41. The pre-form 70p can be formed from a variety of materials, however a molded plastic member will typically be chosen for inlet tube section 70. An advantage to molded plastic members for inlet tube section 70 is that surface defining the inlet flared end 71, and the outlet outwardly flared end 72 can be readily formed in a selected specification.

Attention is now directed back to FIG. 8. FIG. 8, again, is an enlarged fragmentary view of a selected portion of FIG. 6. In particular, a portion adjacent the end 61 of media pack 50 which forms a bottom of cartridge 5 when installed in housing 4. End cap 42 is viewable in cross-section. End cap 42 includes an outer perimeter portion 120 which is configured to form an outwardly directed radial seal against radial outer surface 121 surrounding bottom 11. This outwardly directed radial seal, for filter cartridge 5, is described, for example, in U.S. Pat. No. 6,521,009, incorporated herein by reference.

End cap 42 includes end portion 122 extending across end 161 of media pack 50, sealing same.

Still referring to FIG. 8, end cap 42 includes, secured therein, pre-form 130. The pre-form 130 is configured to extend across interior 51, adjacent end 61. The pre-form 130 includes an outer rim 131, having a projection arrangement 132 thereon, extending under end 61 of media pack 50. Pre-form 130 further includes central portion 134 including a surface tapering downwardly to aperture arrangement 75, FIG. 6. Pre-form 130 is secured in place by molded end cap region 135, which is molded integral with regions 120, 122. Typically, the molded-in-place portion of end cap 42, comprising regions 120, 122 and 135 is formed from a urethane such as a that used for air seal 90 and water seal 94, FIG. 7. Pre-form 130 will typically be a plastic piece.

It is noted that pre-form 130 can be provided with free rise apertures therethrough, in region 134, for rise of material forming region 135, secures. This will help provide mechanical interlock pre-form 130 and cartridge 5.

Pre-form 130 and a remainder of end cap 142 can be as defined in U.S. Pat. No. 6,521,009, if desired.

Still referring to FIG. 8, region 135 includes a recess 136 therein. The recess 136 is generally in a portion of region 135 surrounded by end 61 of media pack 50, and does not overlap media pack 50 axially. Further, region 136 generally defines a continuous trough sized and shaped to receive rib or projection 140 in housing bottom 11, projecting upwardly into trough 136. If desired, a secondary seal between end cap region 135 and rib 140, on bottom 11, can be formed, for example in trough 136, to inhibit migration of water and other materials across rib 140. Features to accommodate this are described in U.S. Pat. No. 6,521,009, incorporated herein by reference.

Referring to FIG. 6, aperture arrangement 75 is generally sized to extend through both pre-form 130 and region 135. A single aperture or a plurality of apertures can be used, for aperture arrangement 75. In the particular arrangement depicted, the aperture arrangement 75 is a single circular aperture, having a cross-sectional size much smaller than aperture 45, and typically on the order of about 10 to 20 mm, although alternatives are possible.

Attention is now directed to FIG. 9. FIG. 9, again, is a cross-sectional view through assembly 1, taken generally orthogonal to the cross-sectional view of FIG. 6. Here, attention is focused on seal and centering plate 30, and in particular on region 145, which is positioned radially outwardly from portion 100 which engages air seal 90.

Referring to FIG. 10, in region 145, a rib 146, projecting upwardly in seal and centering plate 30 is provided. A plurality of ribs 146 will typically be positioned spaced around plate 30. Ribs 146 provide for strengthening to region 145, and inhibit positioning of air seal engagement with flange 100 at an undesirable location, radially outwardly from the example housing air seal member 90 as depicted. It is desirable not have sealing be at radially outer portions of flange 100, in order to provide ease of assembly, without undesired stress on flange 18

Attention is now directed to FIG. 11. FIG. 11, again, is generally analogous to FIG. 6, except with access cover assembly 9 removed. FIG. 11 depicts housing bottom section 8 with cartridge 5 installed therein. The configuration of FIG. 11, for example, is after cartridge 5 has first been installed in housing bottom 8, before access cover assembly 9 is positioned. Alternatively, of course, the configuration of FIG. 11 will be encountered when access cover assembly 9 is first removed, for servicing of cartridge 5.

Attention is again directed to FIG. 12, an enlarged fragmentary view of an identified portion of FIG. 11. Here, attention is directed to pressure ring 150, mounted on sidewall 10, surrounding the sidewall. The pressure ring 150 includes an outer flange 151 and a bottom 152 defining an inner receiver 153. In assembly, a gasket 35 will typically be received within receiver 153.

Ring 150 is generally configured to support gasket 35 for engagement with a portion of access cover assembly 9, FIG. 1, forming a weather seal or a rain seal therebetween. Also, flange 151 is configured to bottom out against a portion of access cover assembly 9, as fasteners 20, FIG. 1, are tightened.

It is noted that at radially spaced locations, ring 150 includes mounting projections 155, FIG. 1, to support fasteners 20.

Figure 13:
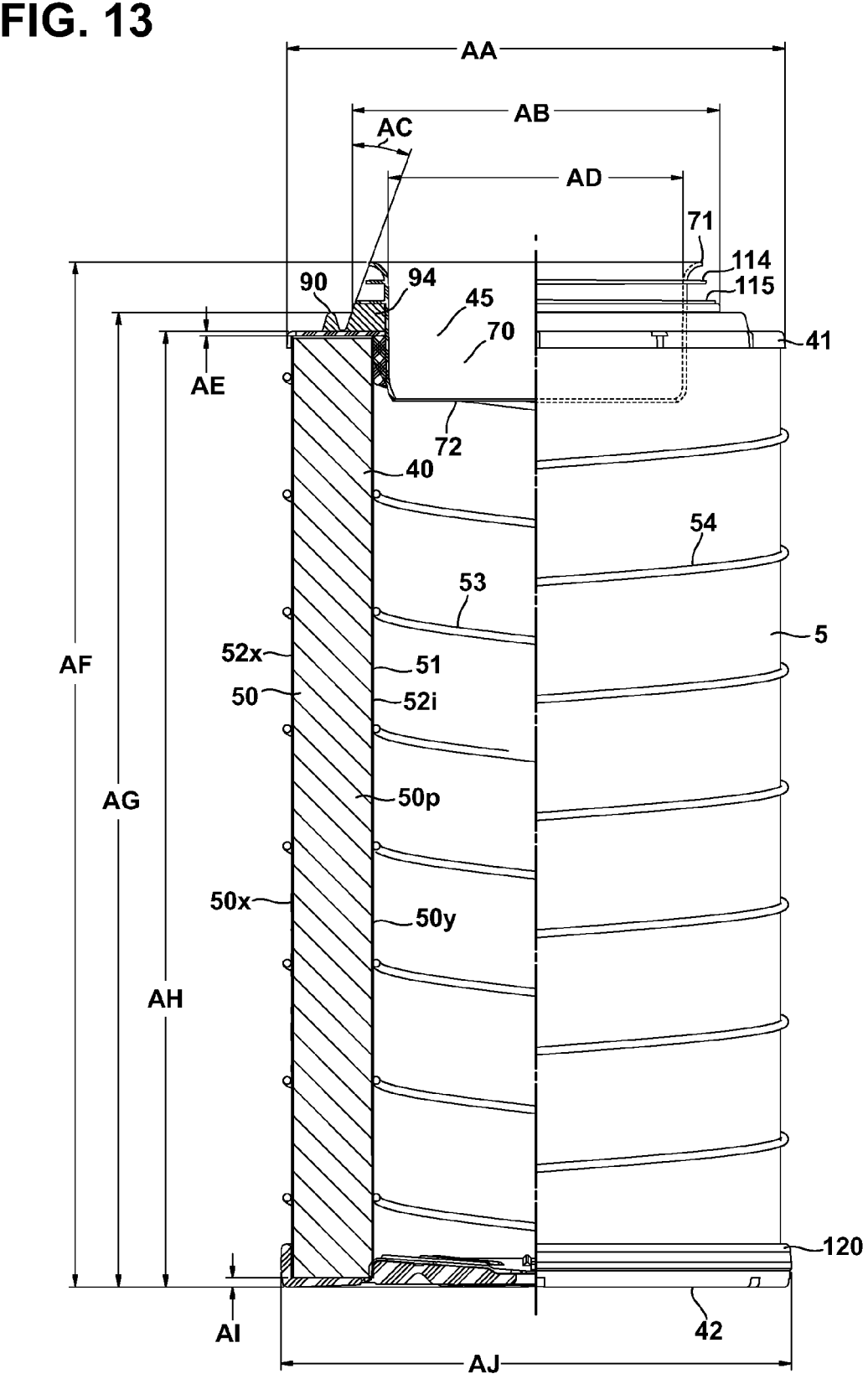
FIG. 13 is a schematic, side elevational view of a serviceable filter cartridge usable in the air cleaner assembly of FIGS. 1 and 2 taken along line 13-13, FIG. 14.

Attention is now directed to FIG. 13, in which cartridge 5 is depicted removed from housing 4, FIG. 1. Referring to FIG. 13, some example dimensions are provided, as follows: AA=323.6 mm; AB=238.8 mm; AC=20°; AD=191.6 mm; AE=3 mm; AF=666.2 mm; AG=633.3 mm; AH=620.9 mm; AI=6 mm; and, AJ=331.6 mm. It is noted that herein these example dimensions are provided for an example assembly, and alternatives and variations therefrom are possible. That is, the dimensions provided are intended to be an indication of example only, and alternative dimensions are possible for assemblies incorporating principles according to the present disclosure.

Figure 14:
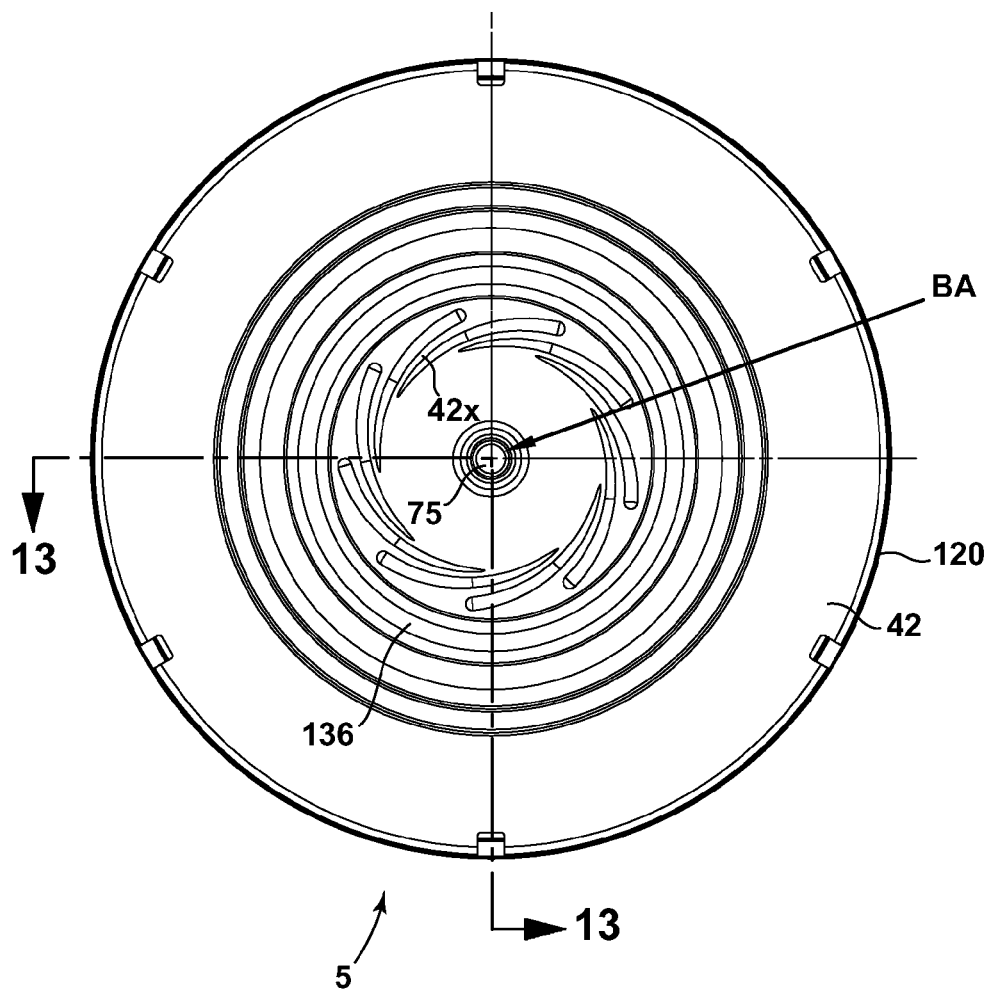
FIG. 14 is a schematic, bottom plan view of the filter cartridge of FIG. 13.

In FIG. 14, a bottom plan view of cartridge 13 is viewable. Trough 136 and aperture arrangement 75 are viewable. Dimension BA, corresponding to a diameter of aperture arrangement 75 (a single aperture in the example depicted) is 12.19 mm. In FIG. 14, indicia is molded into end cap 42, for decoration and source identification.

Figure 15:
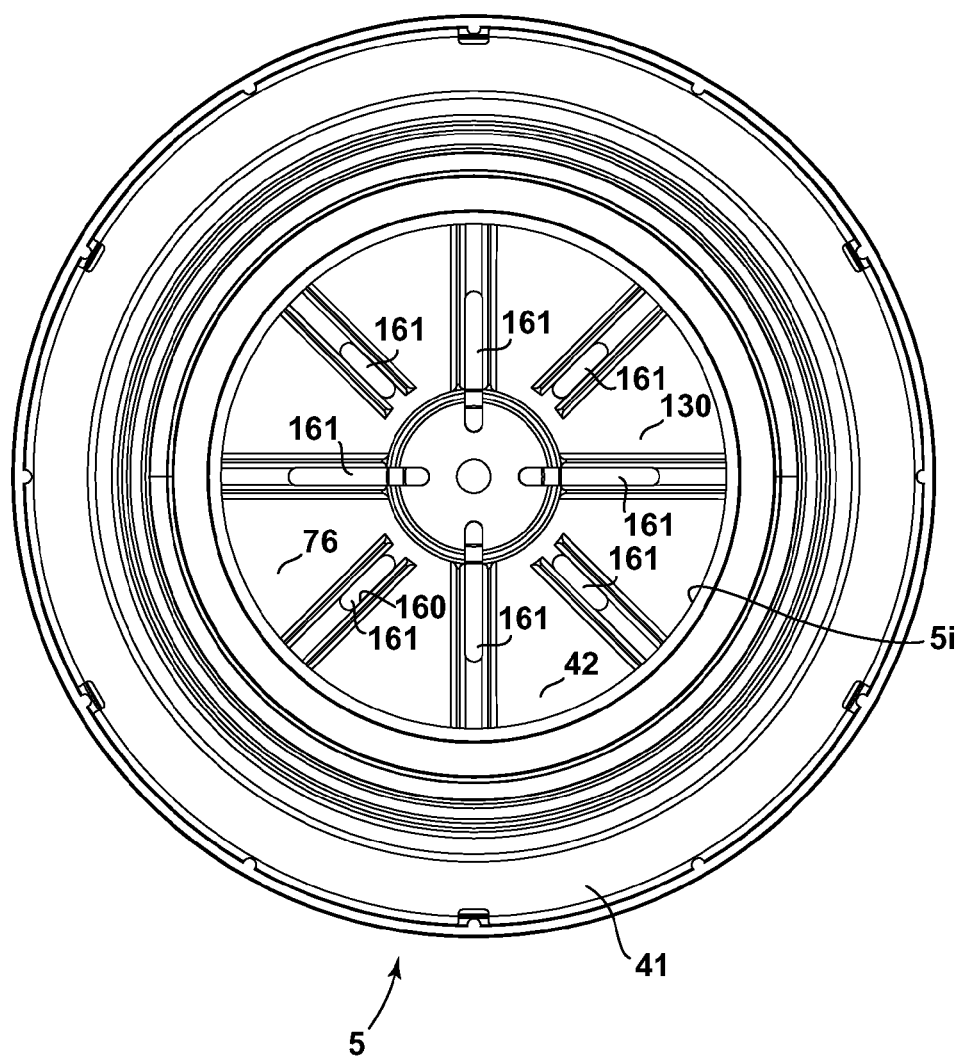
FIG. 15 is a schematic, top plan view of the filter cartridge of FIG. 13.

In FIG. 15, a top plan view of cartridge 5 is provided. In interior 5$i$, central portion 76 with drain aperture 75 therethrough is viewable. Also viewable are free rise apertures 160, (through pre-form 130) through which resin 161 of region 135 will have risen, during molding molded-in-place portions of end cap 42.

Figure 16:
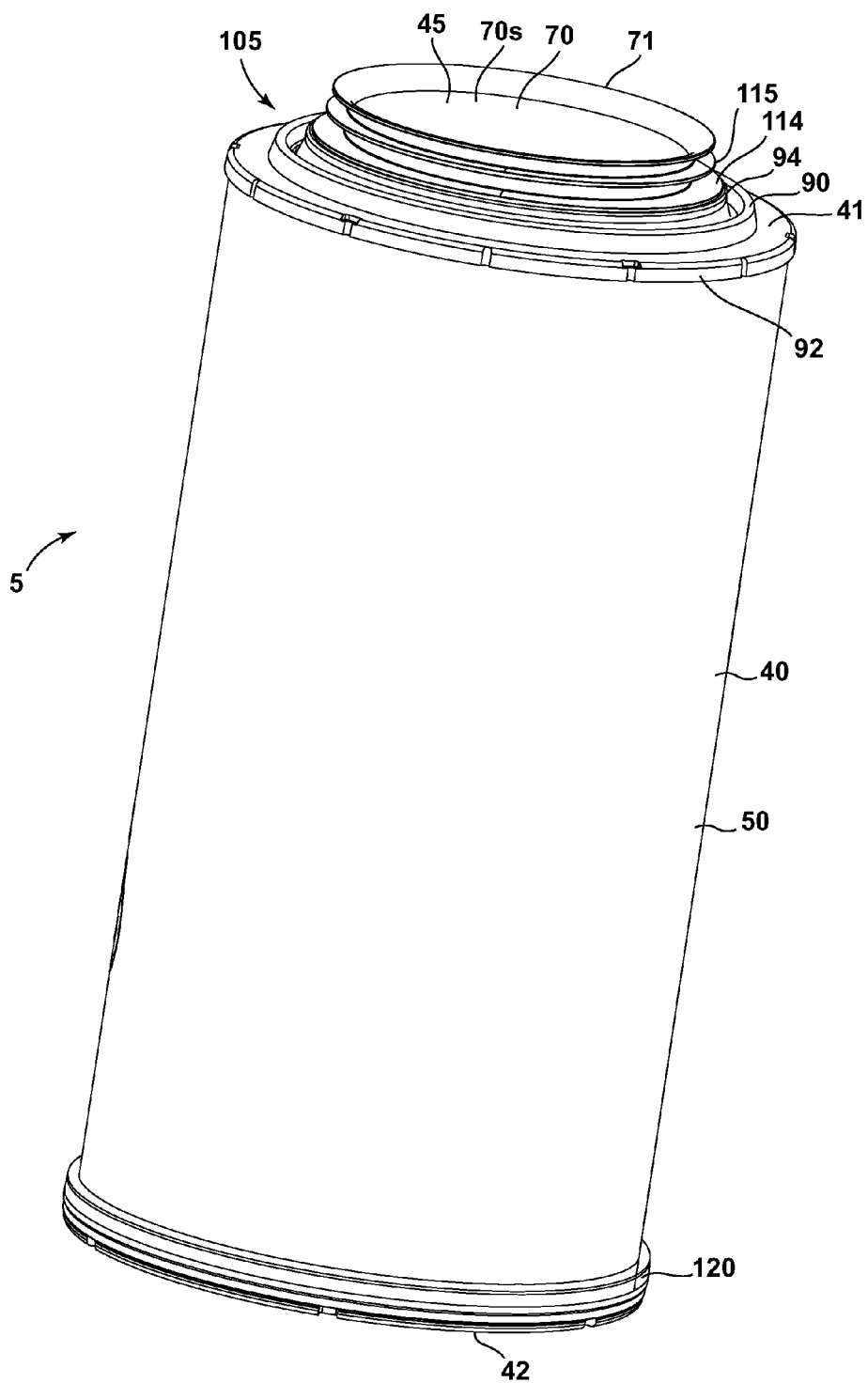
FIG. 16 is a schematic, top perspective view of the filter cartridge of FIG. 13.

In FIG. 16, a top perspective view of cartridge 5 is provided. With respect to the media pack 40, the view of FIG. 16 is schematic, with no media and/or support detail provided.

Figure 17:
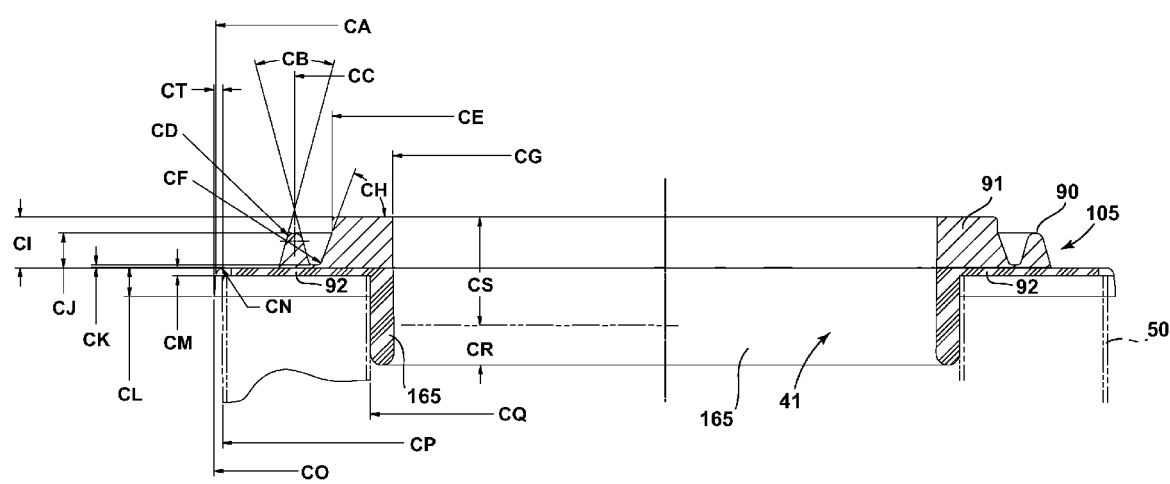
FIG. 17 is an enlarged, schematic, cross-sectional view of certain molded-in-place portions of a first, upper, end cap of the filter cartridge of FIGS. 13-16.

In FIG. 17, molded-in-place portions of end cap 41 are depicted separated from a remainder of cartridge 5. Separate molding forming base 92, and a molding 105 forming air seal member 90 and housing water seal 91 are viewable. In FIG. 17, dimensions of an example system are provided as follows: CA=322.4 mm diameter; CB=30°; CC=265.9 mm diameter; CD=3 mm radius; CE=238.8 mm diameter; CF=1.5 mm radius; CG=195.41 mm diameter; CH=70°; CI=18.2 mm; CJ=12.4 mm; CK=1 mm; CL=10.4 mm; CM=3.0 mm; CN=3 mm radius; CO=323.6 mm diameter maximum; CP=317.6 mm diameter; CQ=211.5 mm diameter; CR=14.2 mm; CS=39 mm; and, CT=3 mm.

Figure 18:
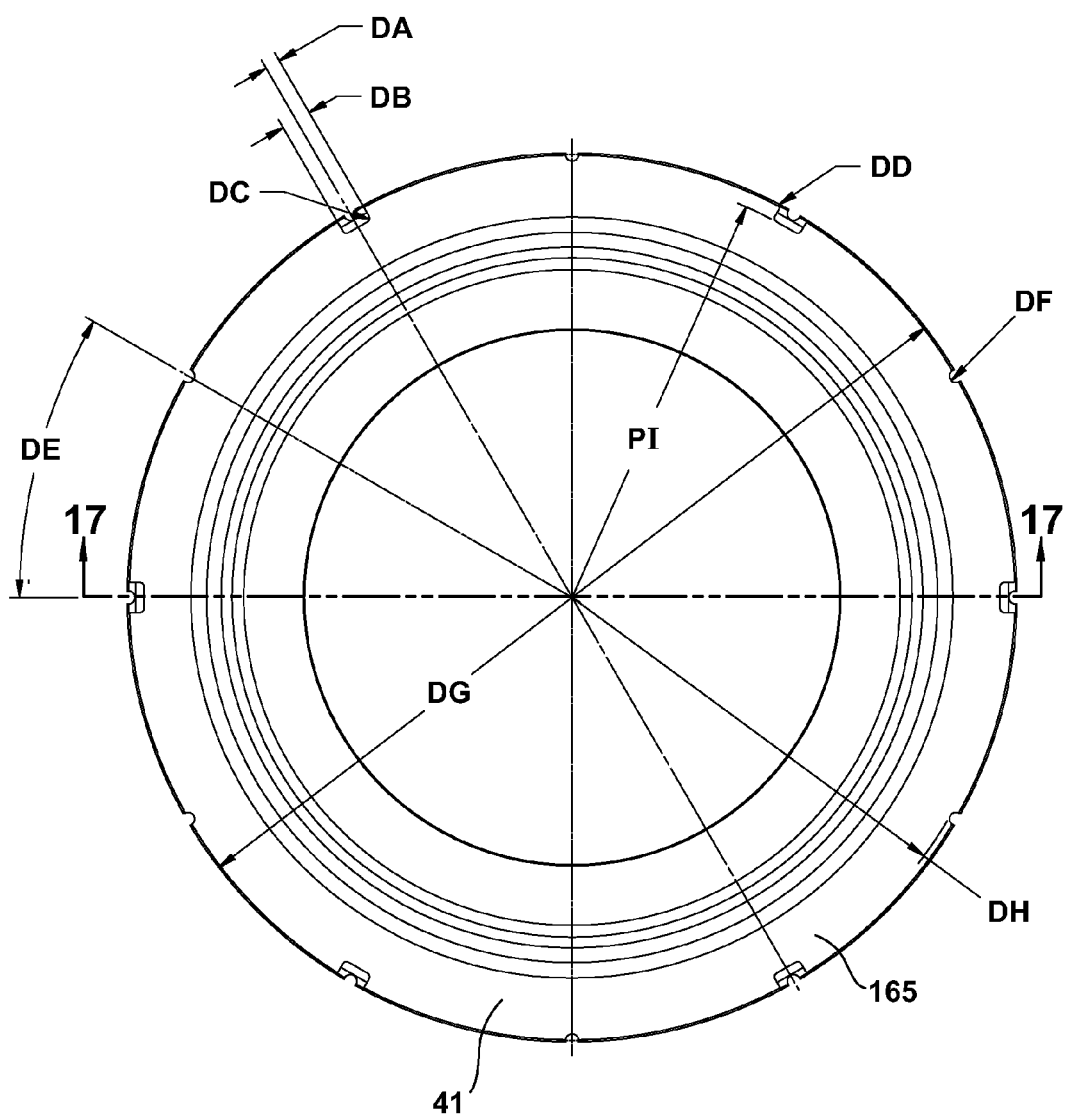
FIG. 18 is a schematic, top plan view of the molded-in-place portions of the first end cap, also depicted in FIG. 17.

In FIG. 18, a top plan view of the portions of end cap 41 depicted, FIG. 17, is provided. Here, example dimensions are as follows: DA=5.5 mm; DB=11 mm; DC=1.5 mm radius; DD=1.5 mm radius; DE=30°; DF=2.4 mm radius; DG=323.6 mm diameter; and, DH=158.9 mm radius. DI, in FIG. 18, reflects 155.7 mm radius.

Figure 19:
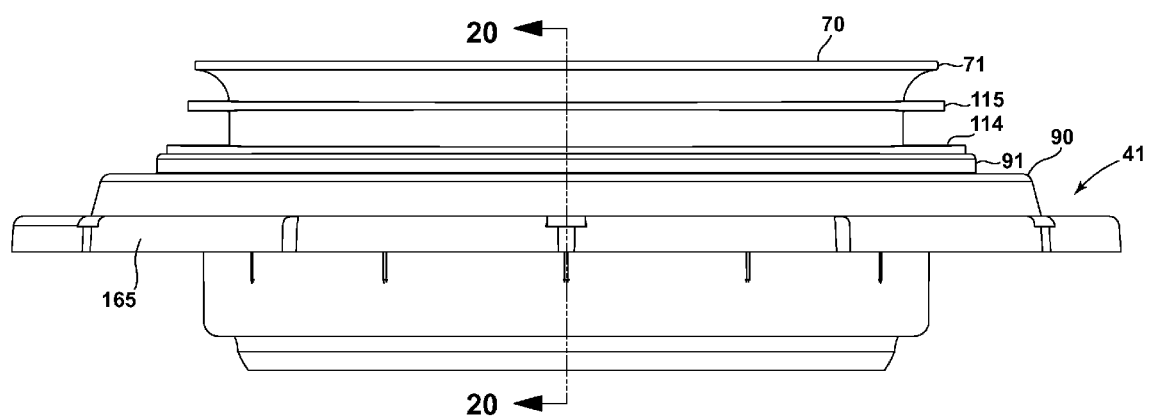
FIG. 19 is a schematic, side elevational view of a first, upper, end cap component of the cartridge of FIGS. 13-16.

In FIG. 19, a side elevational view of end cap 41, separated from a remainder of cartridge 5 is depicted. Here, end cap 41 depicted with both the molded-in-place portions 165 of FIGS. 17 and 18, and with inlet tube section 70 in place.

Figure 20:
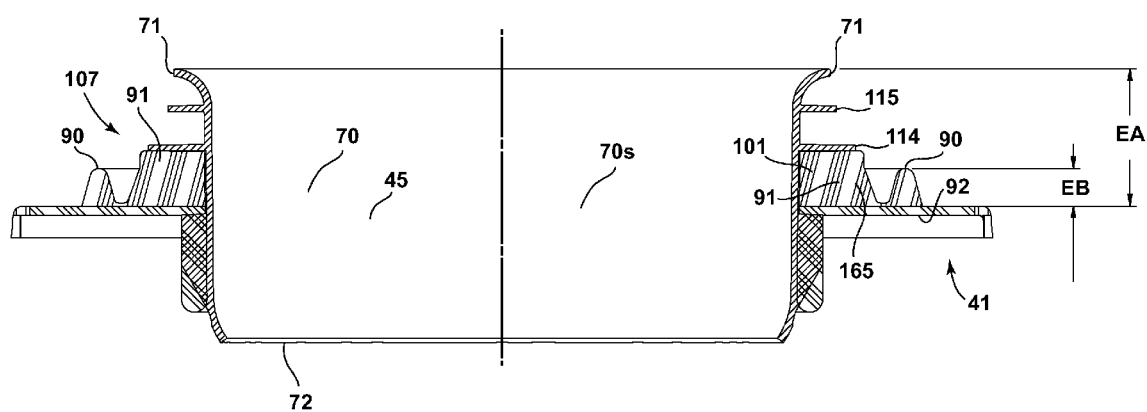
FIG. 20 is a schematic, cross-sectional view of the component depicted in FIG. 19.

In FIG. 20, a cross-sectional view taken along line 20-20, FIG. 19, is provided. In FIG. 20, some example dimensions are indicated as follows: EA=45.3 mm; and, EB=12.4 mm.

Referring to FIG. 19, it can be seen that either separately or together, rings 114, 115, can be characterized as a radial centering ring or ring arrangement spaced from the outer end 71 of the inlet tube section 70, toward the media (50, FIG. 6) at least in partial overlap with the media 50 (FIG. 6).

Also referring to FIG. 20, the filter cartridge 5 having end cap 41 thereon, can be characterized as having a projection arrangement 107 thereon, comprising one or both of the water seal member 91 and the inlet tube section 70, projecting away from the media 50, FIG. 6, further than a distance of free axial extension of axial air seal ring 90.

Figure 20A:
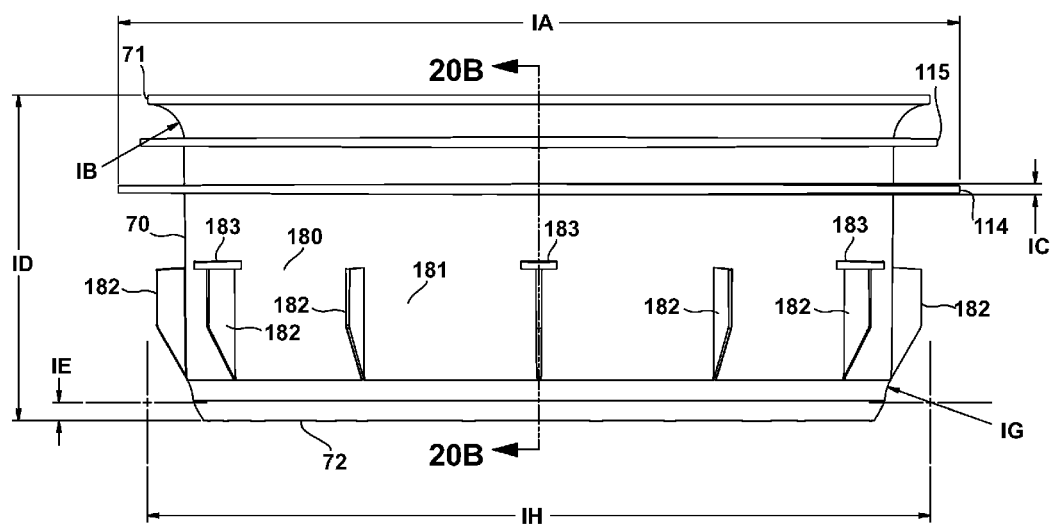
FIG. 20A is a schematic side elevational view of a pre-form component of the end cap of FIG. 19.

In FIG. 20A, a view is provided of a pre-form 180 useable to provide inlet tube section 70. That is, pre-form 180 would be premade, and then secured in place in molded-in-place portions of end cap 41, i.e. portions 92, 105, FIG. 17, collectively referenced as molded-in-place portions 165. Referring to FIG. 20A, pre-form 180 can be seen to include inlet tube section 70 with outer tip 71 and inner tip 72. Further, it defines rings 115, 114. Also, in region 181, pre-form 180 includes radially outwardly directed side flanges 182, some of which include upper plates 183. Flanges 182 provide for a mechanical inner lock with molded-in-place portions of end cap 41.

In FIG. 20A, some example dimensions are provided as follows: IA=233.1 mm; IB=10.2 mm radius; IC=3 mm radius; ID=90.3 mm; IE=5.2 mm; IG=12.7 mm radius; and, IH=216.9 mm. It is noted that a radius of 10.2, i.e. IB, defines a bell for end 71.

Figure 20B:
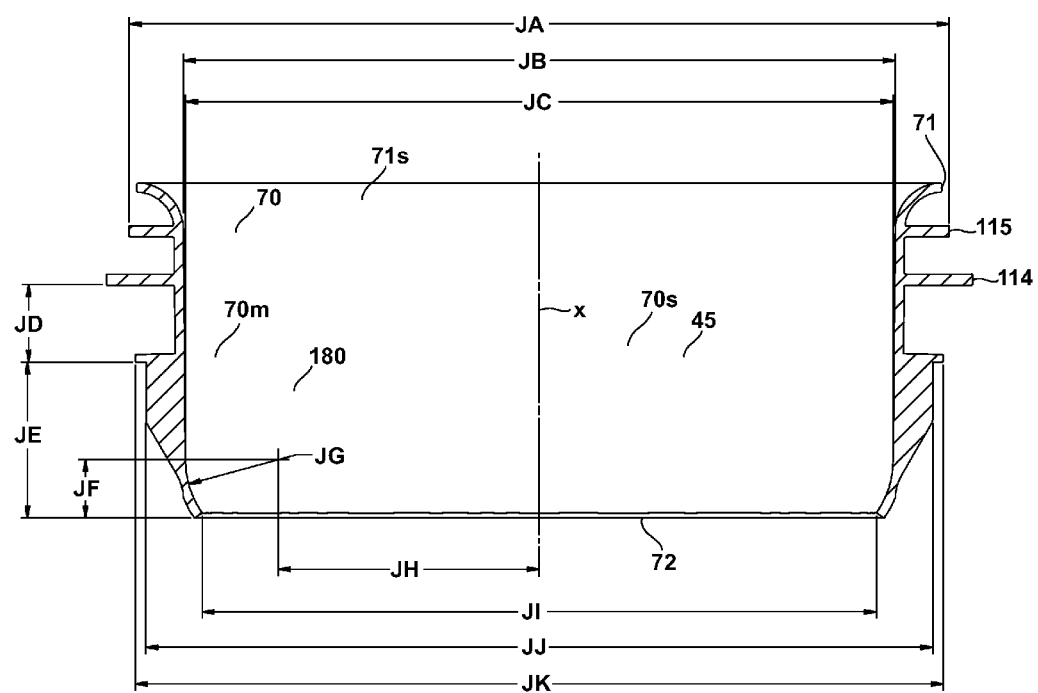
FIG. 20B is a schematic cross-sectional view of the pre-form component of 20A.

In FIG. 20B, a cross-sectional view of pre-form 180 is viewable. Example dimensions in FIG. 20B are provided as follows: JA=220.6 mm; JB=191.6 mm; JC=190.5 mm; JD=20.9 mm; JE=42.1 mm; JF=15.7 mm; JG=25 mm radius; JH=70.2 mm; JI=181.5 mm; JJ=211.8 mm; and, JK=217.4 mm. It is noted that the dimension JD, radius 25 mm, indicates in part, a curve inwardly of tip 72 with respect to central axis X.

In more general terms, the outer curve of the inner face or bell surface adjacent end 71, FIG. 20B, is typically an outer flare radius within of the range of 8 to 15 mm. Further, the inner surface inner curve of flare tip 72, is typically curved defined by a flare radius within the range of 20 to 30 mm, although alternatives for each are possible.

Also, typically, referring to FIG. 20, tube section 70 can be seen to include a central section 70$m$ having a first diameter, corresponding generally to diameter JC. Further, the inner end 72 can be said to have a second internal diameter, corresponding generally to the diameter JI. Typically, the diameter of end 72 is at least 7 mm smaller than the inner diameter of the central region 70$m$, usually at least 8 mm less, and typically an amount less within the range of 8-15 mm less.

Figure 21:
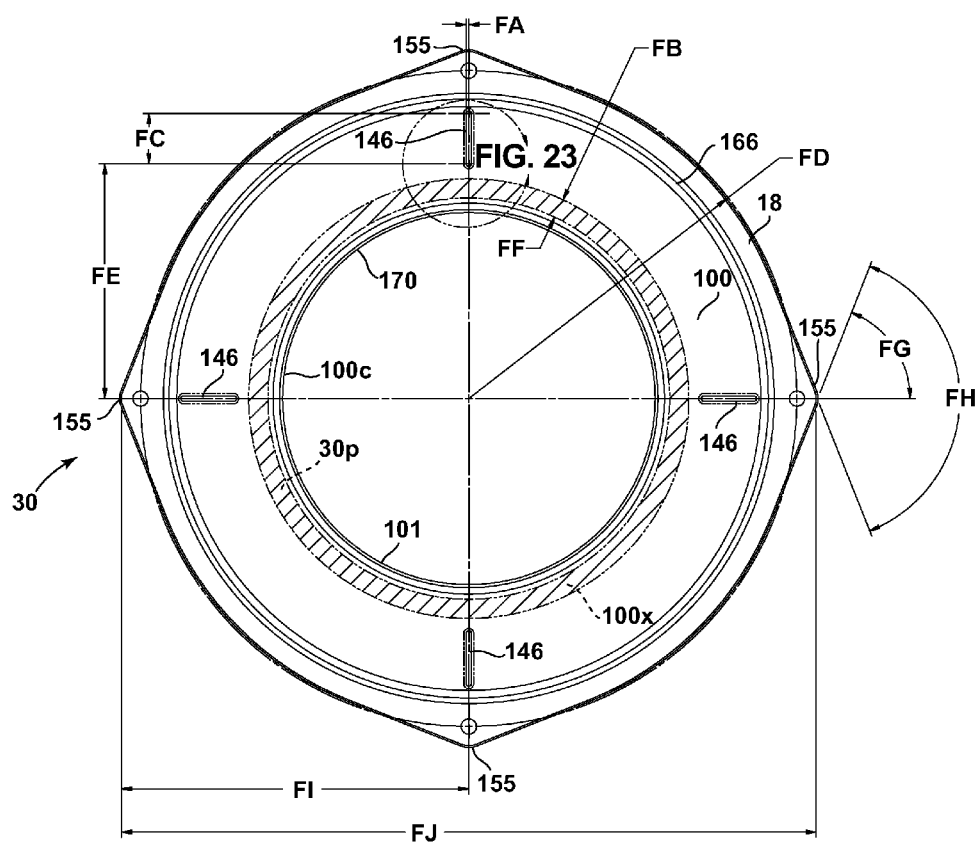
FIG. 21 is a schematic, top plan view of a cover component for the housing portion of the air cleaner assembly of FIGS. 1 and 2.

In FIG. 21, a top plan view of a seal and centering plate 30 is provided. It can be seen that seal and centering plate 30 includes flange 101, outer rim 166, and inner ring 101, around aperture 100c. Ring 100 extends radially inwardly from ring 166 to upwardly turned water seal flange 101, defining inner aperture 100c. The aperture 100c is sized to fit around outer portions of tube 70, and housing water seal member 91, FIG. 6. In FIG. 21, ring 166 includes radial projections 155 thereon. In FIG. 21, ribs 145 are also viewable. In sealing and centering plate 30, region 100x is shown in phantom lines. On an underside of plate 100, i.e. seal plate 30p, region 100x would be the area in which sealing to seal projection 90 would occur.

In FIG. 21, some example dimensions are provided as follows: FA=0.07 inch (1.78 mm); FB=10.9 inches diameter (276.9 mm); FC=1.25 inches (31.8 mm); FD=8.09 inch radius (205.5 mm); FE=5.82 inches (147.8 mm); FF=0.5 inch (1.27 mm); FG=68.5°; FH=137°; FI=8.611 inches (218.7 mm); and, FJ=17.22 inches (437.4 mm).

Figure 22:
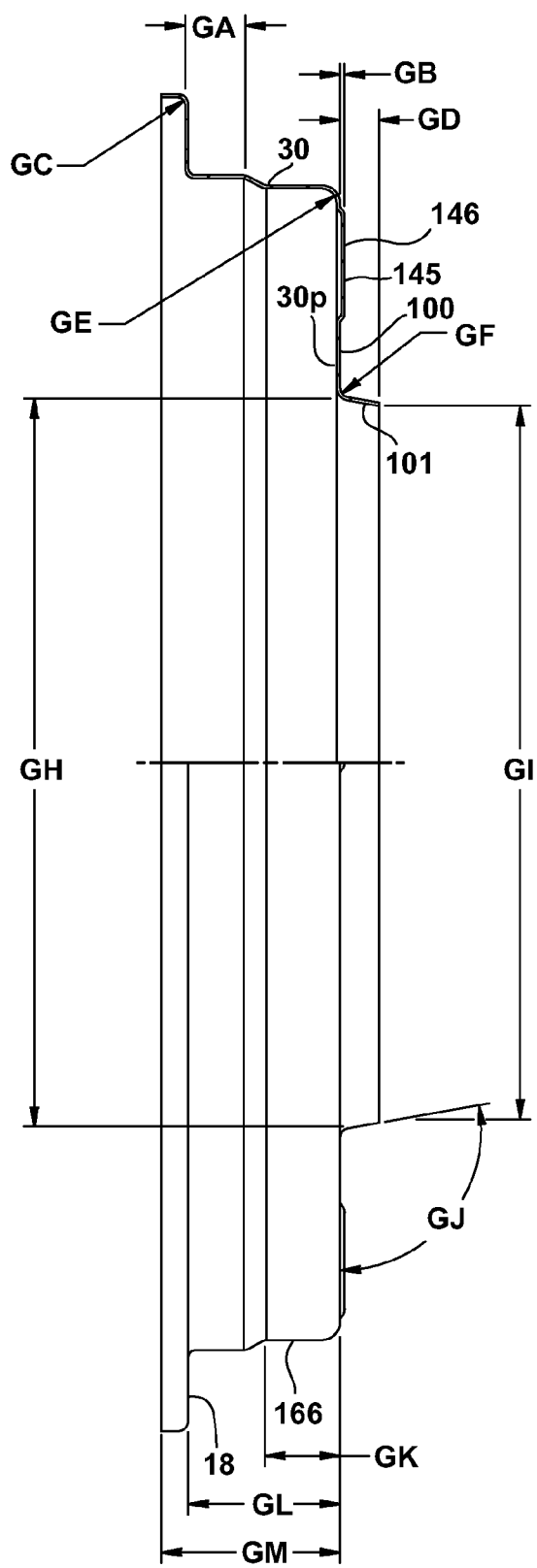
FIG. 22 is a schematic, cross-sectional view of the cover component depicted in FIG. 21.

In FIG. 22, a cross-sectional view of a seal and centering plate 30, FIG. 21, is viewable. In FIG. 22, example dimensions are provided as follows: GA=0.79 inches (20.1 mm); GB=0.06 inch (1.52 mm); GC=0.09 inch radius (2.29 mm); GD=0.5 inch (12.7 mm); GE 0.19 inch radius (4.83 mm); GF=0.12 inch radius (3.05 mm); GH=9.43 inches (239.5 mm); GI=9.23 inch (234.4 mm; GJ=100°; GK=0.97 inch (24.64 mm): GL=1.96 inches (49.8 mm); and, GM=2.31 inches (58.7 mm).

Figure 23:
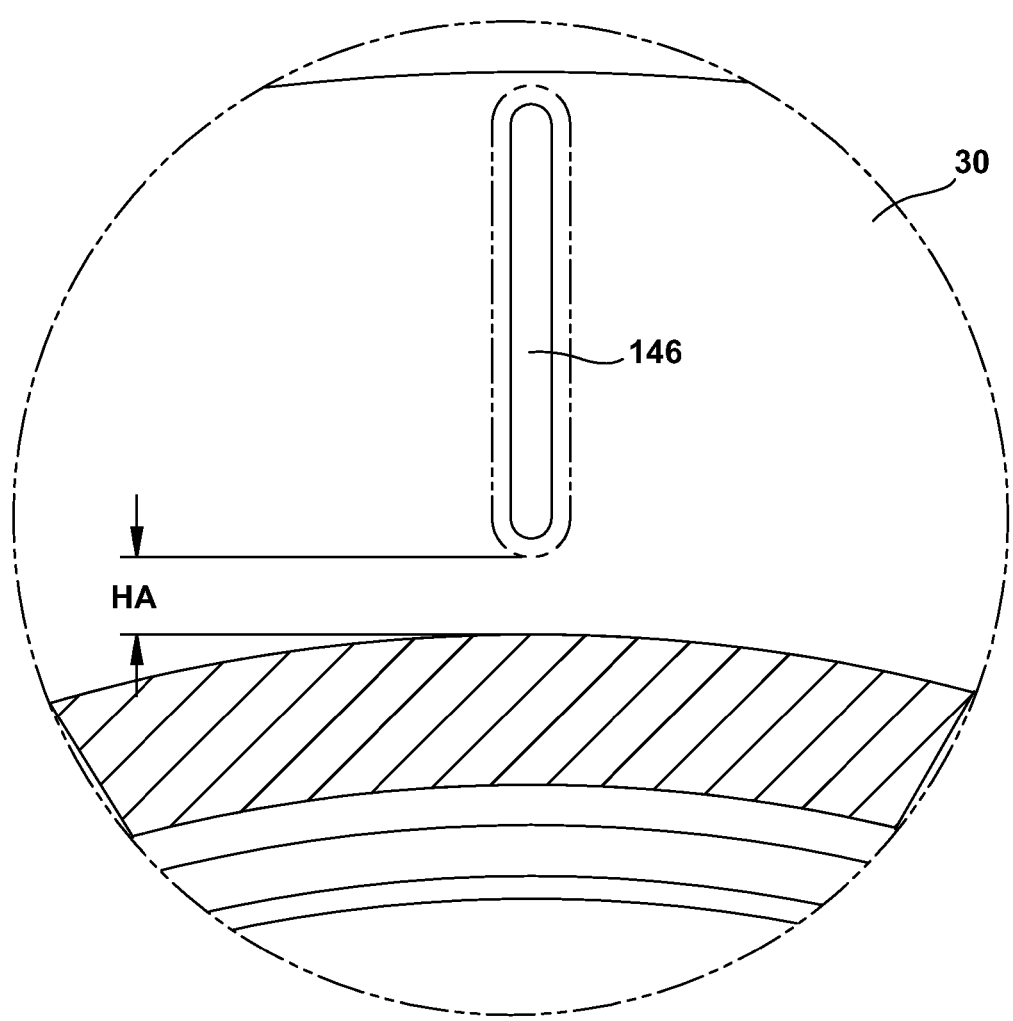
FIG. 23 is an enlarged, schematic, fragmentary view of a selected portion of the cover component of FIG. 21.

In FIG. 23, an enlarged fragmentary of a portion of FIG. 21 is provided, and rib 146 is viewable. In FIG. 23, an example dimension is provided as follows: HA=0.24 inch (6.1 mm).

C. Installation and Centering of a Cartridge, FIGS. 24-29A

As referenced previously, a first step of installing cartridge 5 within air cleaner assembly 1, involves lowering the cartridge 5 into the housing bottom 8. This is generally done, after the access cover assembly 9 is removed, with lowering occurring until the lower seal is formed between perimeter portion 120, of end cap 42, and flange 11s surrounding housing bottom 11.

Figure 24:
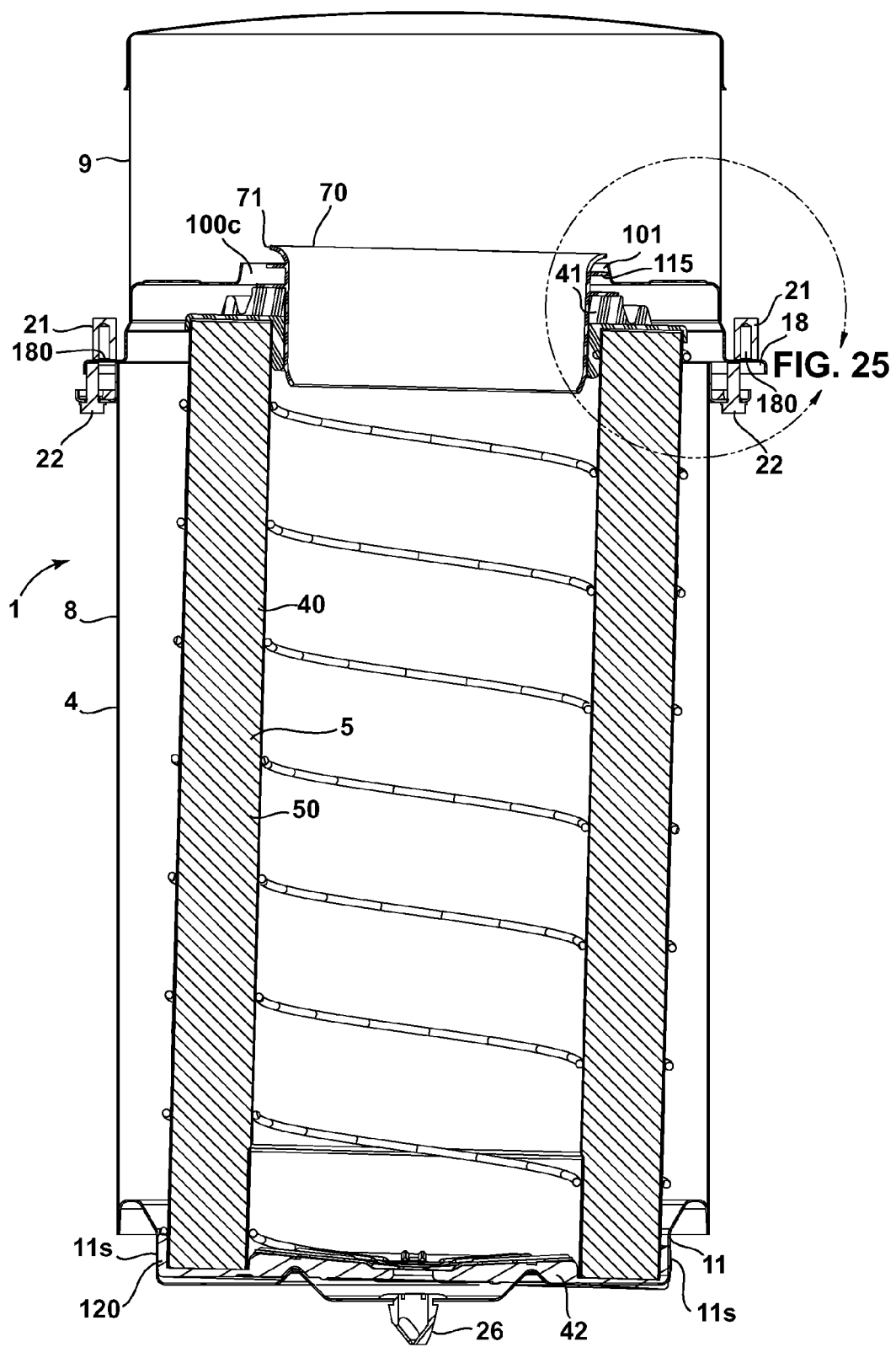
FIG. 24 is a schematic, cross-sectional view analogous to FIG. 9, depicting a step of centering the filter cartridge within a housing of an air cleaner assembly according to FIGS. 1 and 2.
Figure 25:
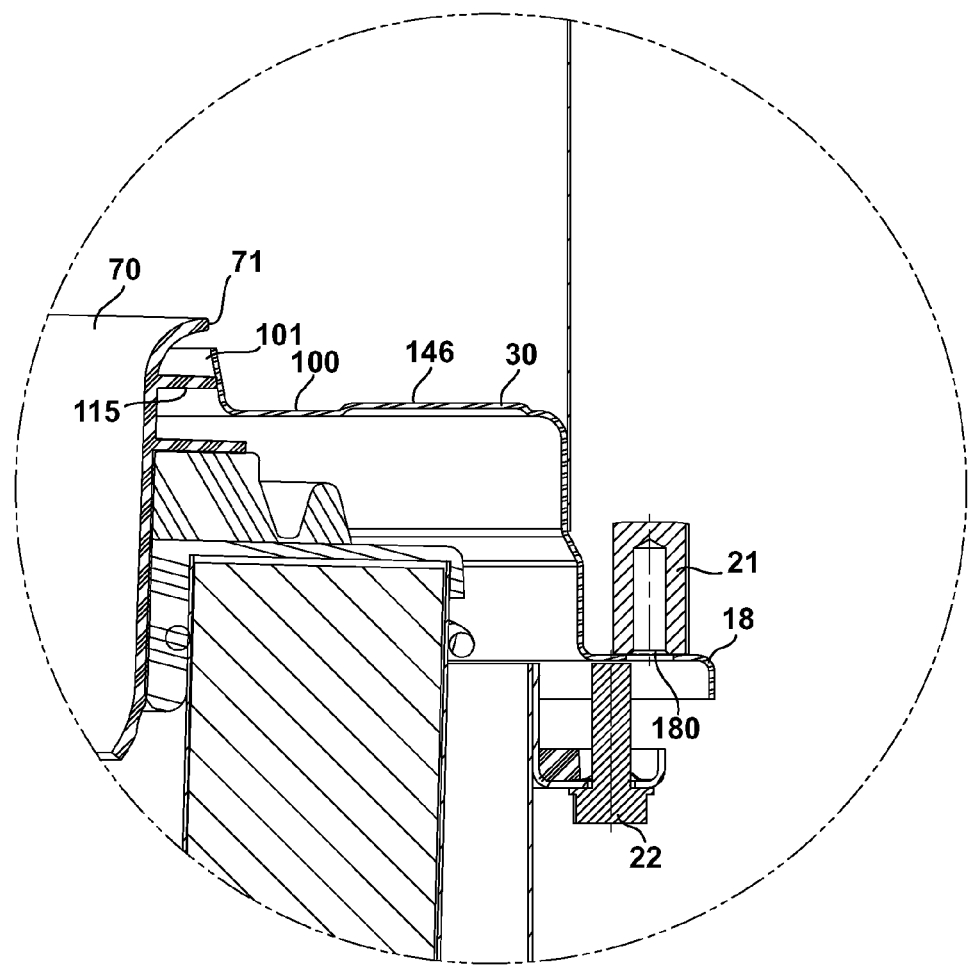
FIG. 25 is an enlarged, schematic, fragmentary view of an identified portion of FIG. 24.

Referring to FIG. 24, a cross-sectional view of generally analogous to FIG. 11, but showing access cover assembly 9 being lowered over a portion of cartridge 5. The cartridge 5 may, after being lowered, not be centered within housing base 8, to project upwardly in a desired, centered, manner with respect to sidewall 10. In the particular example depicted in FIG. 24, the cartridge 5 can be seen leaning to the right in extension upwardly. As the access cover assembly 9 is lowered, an upper end 71 of inlet tube section 70 will pass through aperture 100c in plate 30. When this occurs, flange 101 of plate 30 will radially engage a portion of ring 115 on inlet tube 70, FIG. 25. As the service provider moves the cover assembly 9 over, (i.e. to the left in FIGS. 24 and 25) to align apertures 180 (and eventually nuts 21) with bolts 22, flange 101 will push against ring 115, moving the cartridge 5 to a more vertical, non-leaning, orientation. It is noted that in FIGS. 24 and 25, nuts 21 are shown positioned, however typically they will not have yet been positioned against flange 18.

Figure 26:
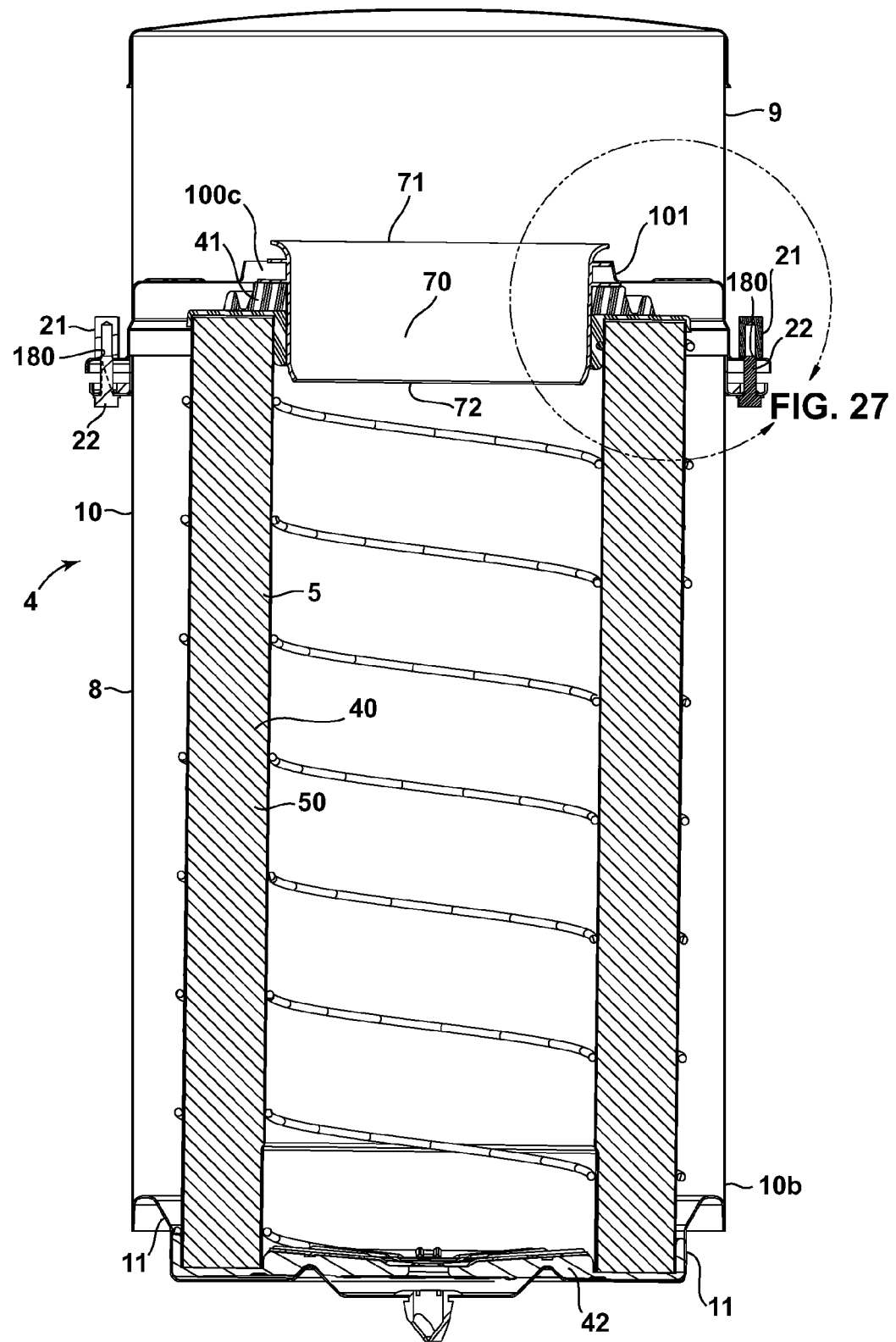
FIG. 26 is a schematic view analogous to FIG. 24, depicting further centering.
Figure 27:
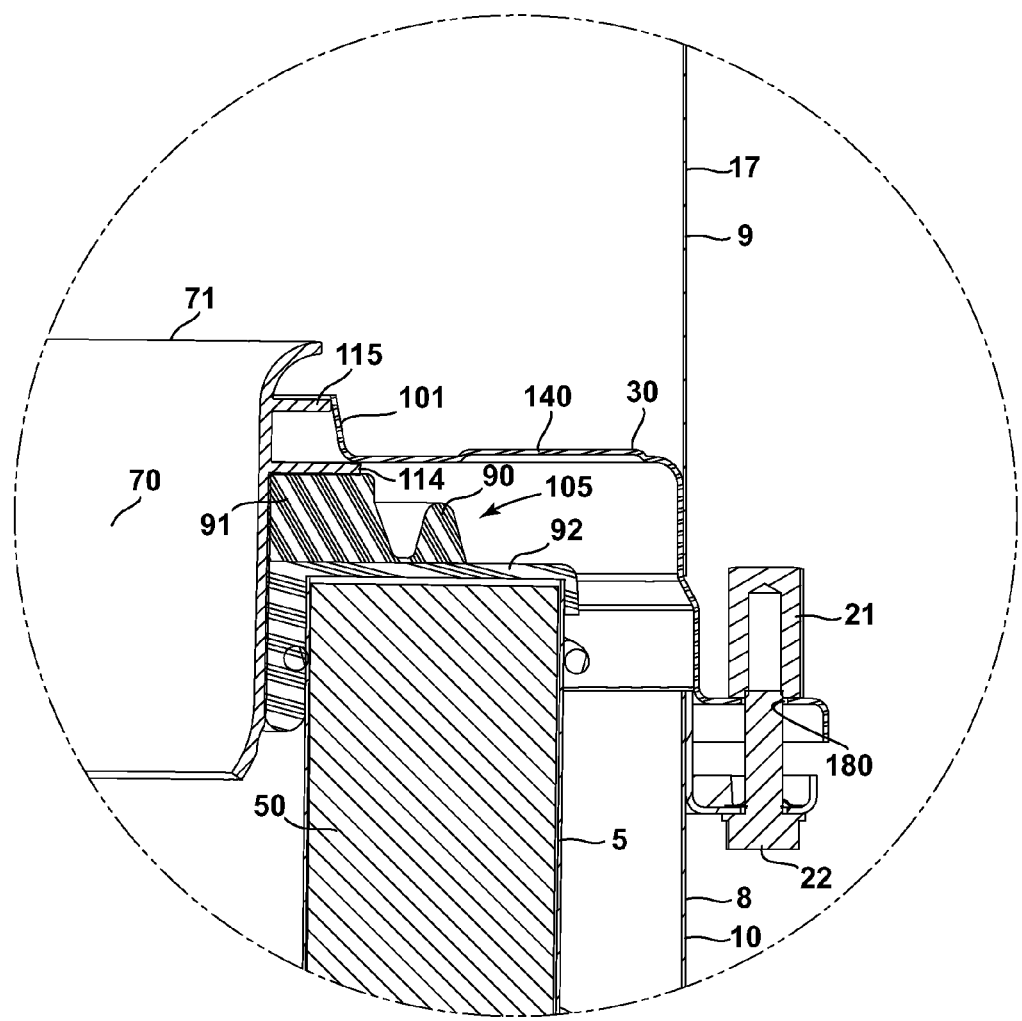
FIG. 27 is an enlarged, fragmentary, schematic view of a selected portion of FIG. 26.

In FIGS. 26 and 27, the process of centering is continued, showing the access cover assembly 9 now having been moved some to the left, FIG. 24, aligning bolts 22 with apertures 180. Nuts 21 are now alignable with the bolts 21, projecting through apertures 180, for attachment.

FIG. 27 is an enlarged fragmentary view of a portion of FIG. 26. Referring to FIG. 27, it can be seen that flange 101 is shown nearly clearing ring 115 but not ring 114. Indeed, referring to FIG. 26, cartridge 5 is still leaning to the right.

Figure 28:
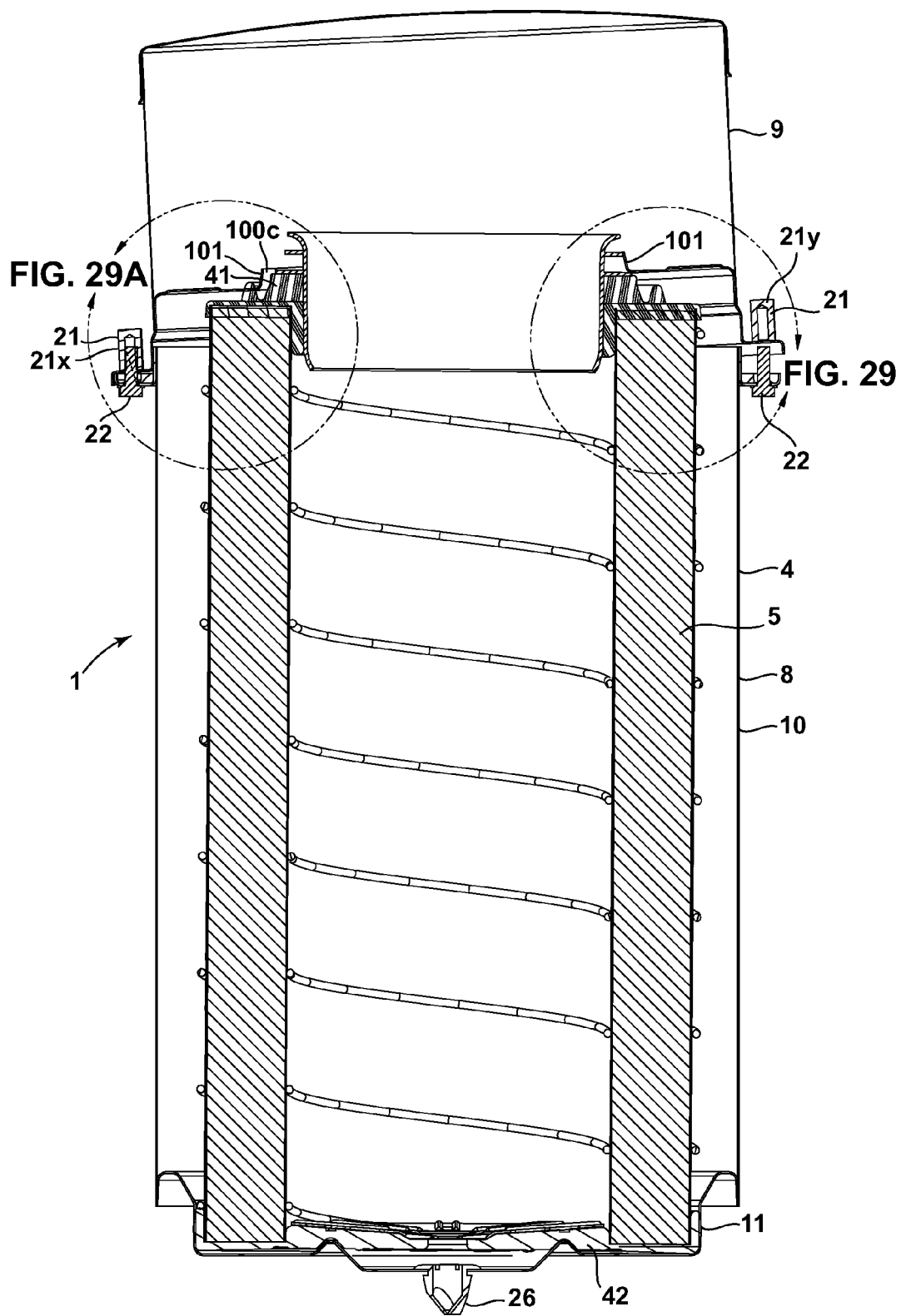
FIG. 28 is schematic, cross-sectional view analogous to FIGS. 24 and 26, depicting the cartridge being further centered by movement of a cover assembly during tightening of a fastener.
Figure 29:
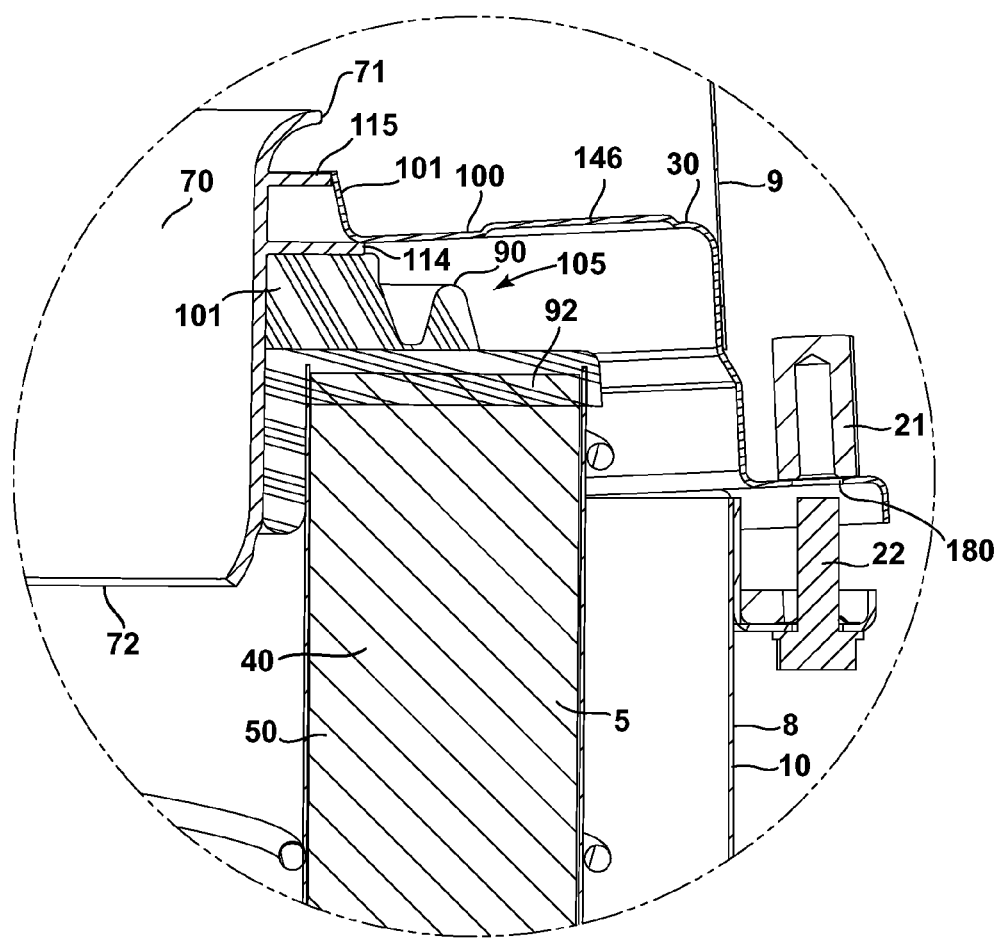
FIG. 29 is an enlarged, fragmentary, schematic view of an identified portion of FIG. 28.
Figure 29A:
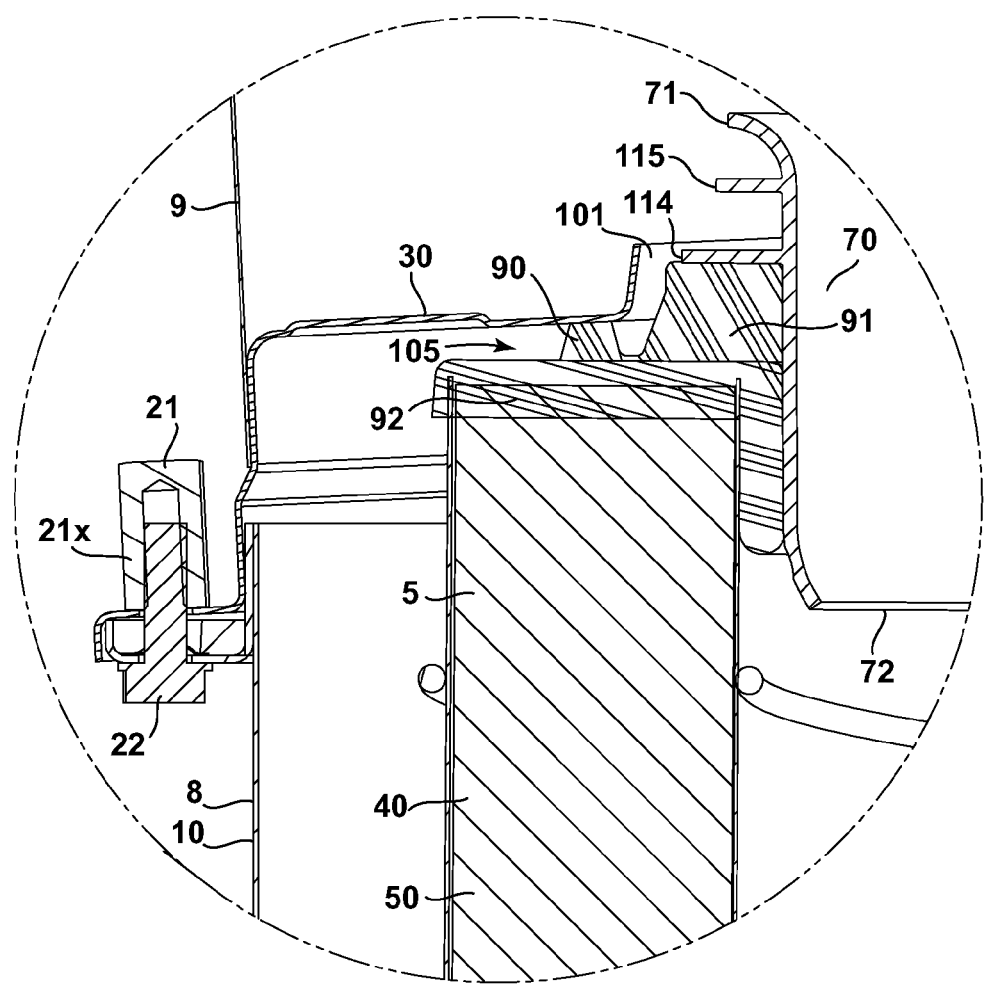
FIG. 29A is an enlarged, fragmentary, schematic view of a second identified portion of FIG. 28.

In FIG. 28, a step of starting the tightening of one of the nuts 21, and in particular nut 21x is shown. It can be seen that this step of tightening will center the cartridge 5 even more, in the housing 4; i.e. in the housing bottom 8. In FIG. 29, an enlarged fragmentary view of a portion of FIG. 29 is depicted. It can be seen that in this side, when the nut 21 has not yet been tightened, flange 101 has still not cleared ring 114. However, referring to FIG. 29A, in the side where nut 21x is tightened down on the bolt 22, flange 101 has cleared ring 114, and has begun to seal against axial seal member 90.

In general, as the nut tightening continues, cartridge 5 will tend to self-align sufficiently, so that flange 101 will clear ring 114, allowing tightening of nut 21y, FIG. 28, in positioning. That is, in general terms, assembly 1 includes a centering feature for the cartridge 5. The centering feature involves flange 101 on seal and centering ring 30, and one or both of outwardly projecting rings 114, 115, on inlet tube 70. Assembly 9 can be moved to cause some of the centering. Tightening of the assembly 9 down, by nuts 21, will complete the centering. If centering has not occurred, jamming will tend to occur; signaling the service provider to move the access cover 9 adequately, to provide the clearance needed. This helps ensure that both the housing air seal formed by seal member 90, and the housing water seal formed by flange 101 and region 91, are fully established.

II. Some Alternate Configurations, FIGS. 30-38

A. A First Alternate Embodiment, FIGS. 30-32

Figure 30:
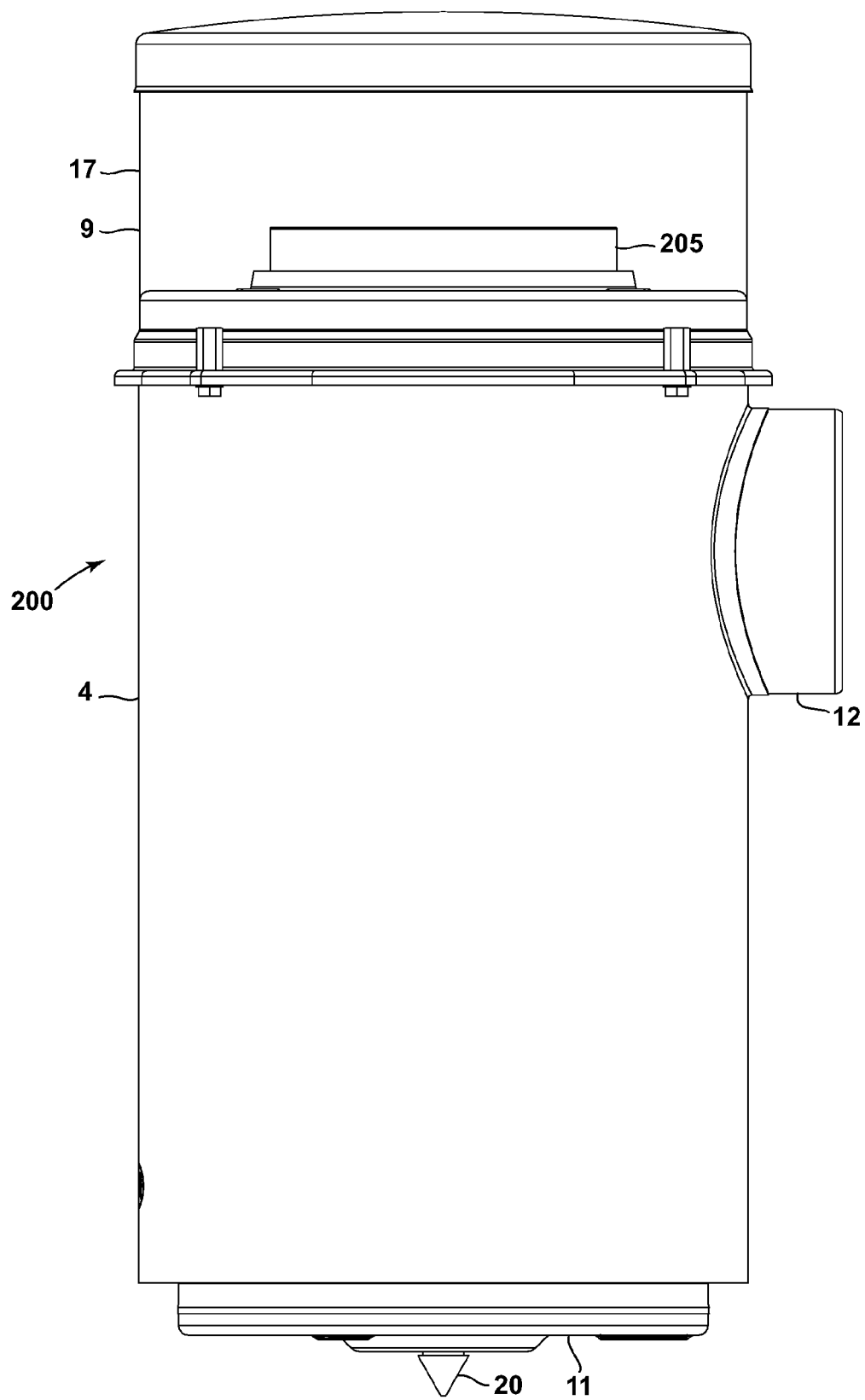
FIG. 30 is a schematic, side elevational view of an air cleaner assembly according to a first alternate embodiment of the present disclosure.

In FIGS. 30-38, some alternate embodiments of arrangements according to the present disclosure, not depicted in FIGS. 1-29A, are provided. Referring first to FIG. 30, air cleaner assembly 200 is depicted. Air cleaner assembly 200 can comprise housing 4 which is generally identical to housing 4 discussed previously. However, cartridge 205 positioned within housing 4 is different from cartridge 5 in certain manners discussed below.

It is noted that in FIG. 30, service access cover assembly 9 is depicted with a portion of screen 17 removed or broken away, to allow viewing of a portion of cartridge 205.

Figure 31:
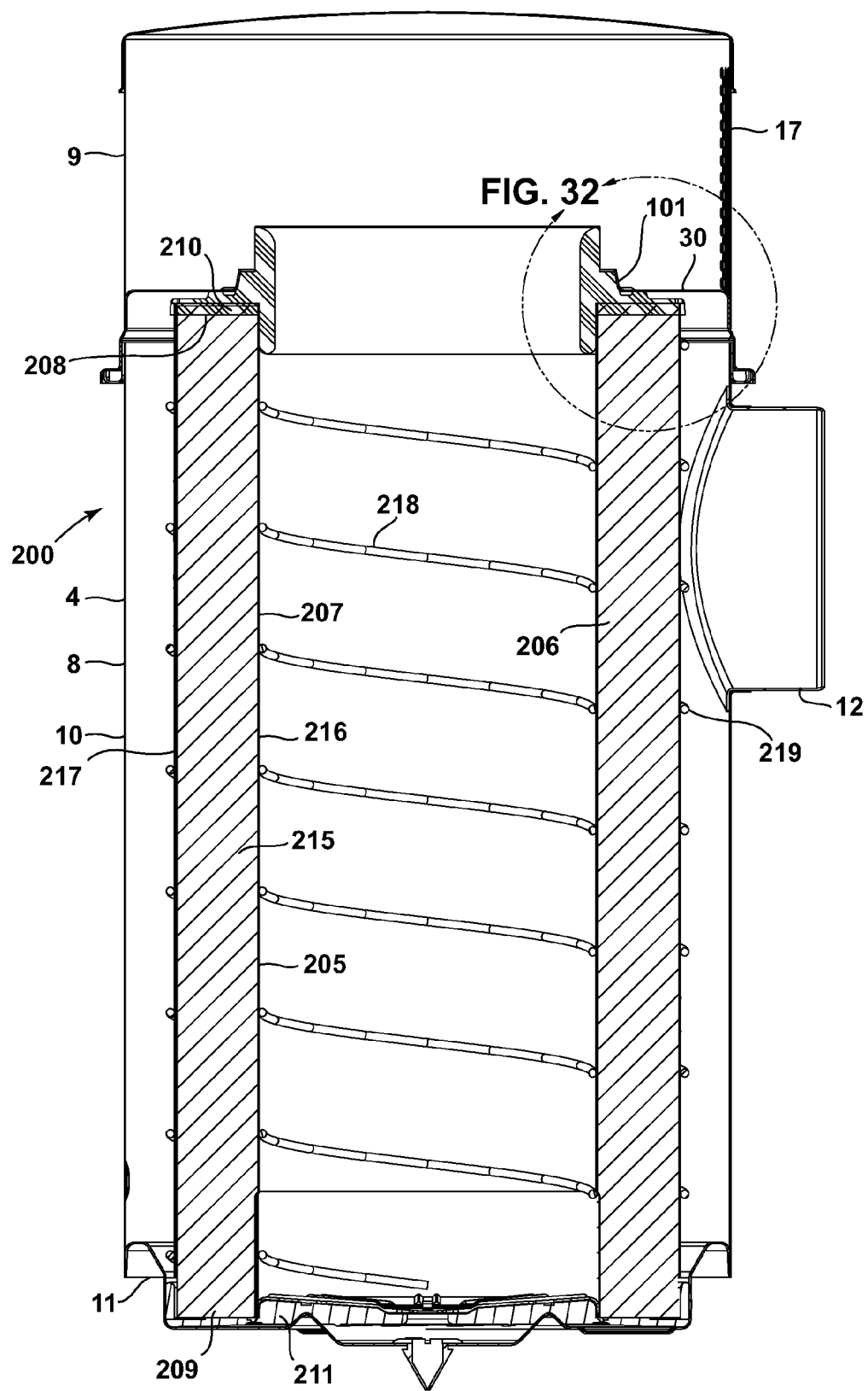
FIG. 31 is a schematic, cross-sectional view of the assembly of FIG. 30.

Referring to FIG. 31, a cross-sectional view taken through assembly 200 is depicted. Here cartridge 205 can be viewed. The cartridge 205 comprises a media pack 206 surrounding an open interior 207, and extending between a first end 208 and a second end 209. At first end 208 is provided a first end cap 210 and at second end 209 is provided a second end cap 211. End cap 211 can be generally identical to end cap 42, FIG. 1-29A.

The media pack 206 can be generally identical to media pack 40 FIG. 6, if desired, comprising: media 215 surrounding and defining an open interior 207, with inner support provided by an inner liner 216 and outer support provided by an outer liner 217. Adhesive spirals 218, 219, analogous to spirals 53, 54 are provided. Housing outlet 12 is also provided.

The difference in assembly 200, from assembly 1, relates to differences between the cartridge 5 and the cartridge 205, and in particular relates to differences between end cap 41 and end cap 210.

Figure 32:
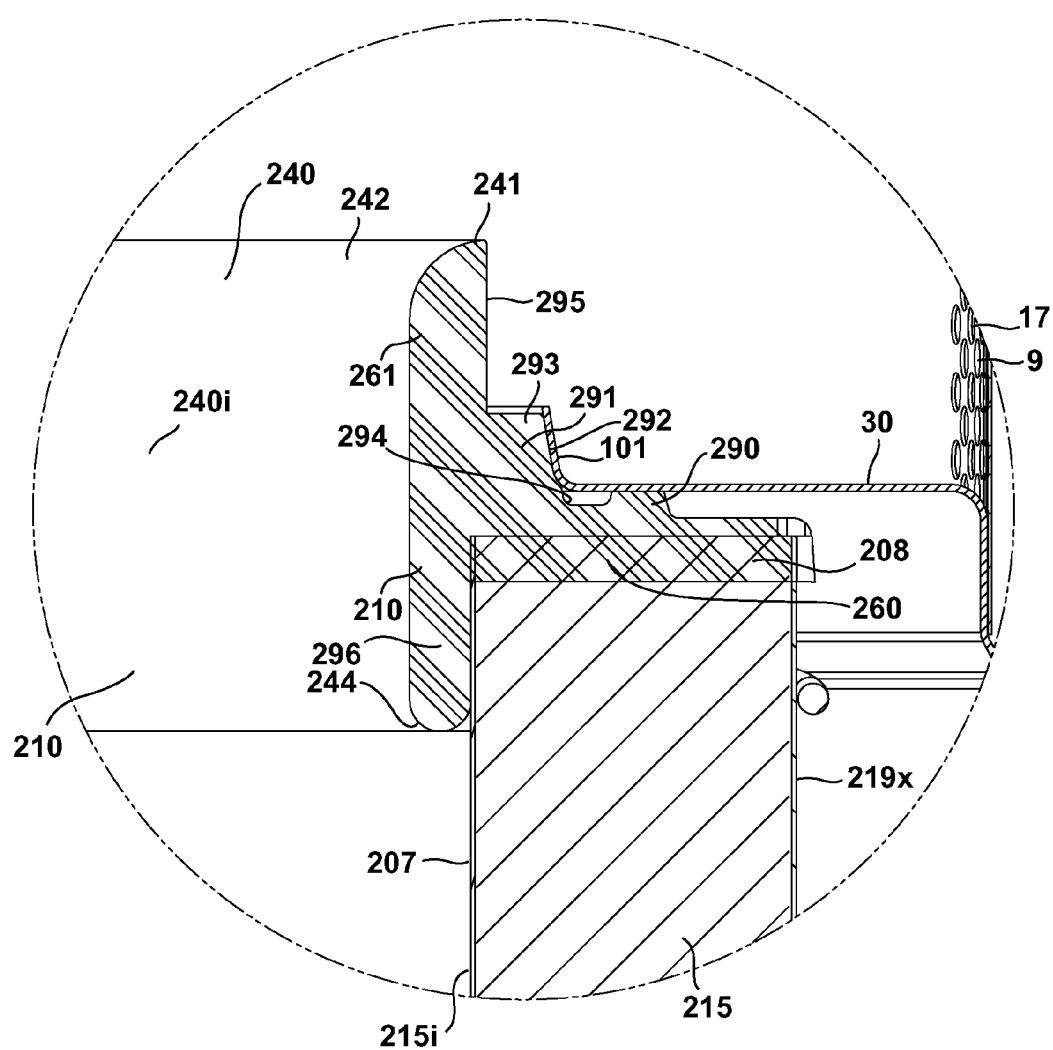
FIG. 32 is an enlarged, fragmentary, schematic view of an identified portion of FIG. 31.

Referring now to FIG. 32, an enlarged fragmentary view of a portion of FIG. 31, end cap 210 can be seen as formed molded-in-place and not including a pre-form analogous to pre-form 70p therein. In FIG. 32, inlet tube section 240 is formed integral with a remainder of end cap 210. The inlet tube section 240 includes an upper edge 241 with an inner surface 242 defining a outward flare; and, a lower end 244.

For the particular embodiment depicted, end cap 210 is molded-in-place, and comprises two molded sections: relatively axially inner, base, hard section 260 and a softer axially outer section 261.

The material for base region 260 can generally be analogous to the material for region 92, FIG. 12; and, the material for soft region 261 can be analogous to the material for region 105, FIG. 12.

Referring to FIG. 32, region 261 is molded in the form of: housing air seal member 290; housing water seal member 291; and, inlet tube 240. Housing seal member 290 can be generally analogous to member 90, and comprise a molded-in-place, continuous ring projection extending axially upwardly from media 215, positioned spaced inwardly from an outer perimeter 215x of media 215, and spaced outwardly from an inner perimeter 215i of media 215, typically at least one-third of the way across media end 208 and usually about halfway across media end 208.

Housing water seal member 291 is shown spaced radially inwardly from housing air seal member 290, and includes an outer circumferential surface portion 292 tapering outwardly in extension toward bottom 294. Surface 292 is positioned for engagement with flange 101, to form radially directed water seal. The definition of surface 292 can be as described above for surface 95, FIG. 7.

In general, inlet tube section 240 is defined by an upper projection 295 extending axially upwardly from housing water seal member 291; and, inner projection 296 extending axially downwardly into interior 298i. It is noted that the end cap configuration 210 depicted in FIG. 32 is not as desirable as the assembly of FIGS. 1-29A, in part as rings 114 and 115 are not present, to facilitate centering. However, end cap 210 can be readily manufactured and does not require a pre-form or pre-made components. Further, interior surface 240i of tube 240 is not as well configured for convenient air flow or water flow therethrough. For example, although surface 242 is outwardly flared at 245 to define an air collection surface; region 244 is not inwardly flared.

B. A Second, Alternate, Embodiment, FIGS. 33 and 34.

Figure 33:
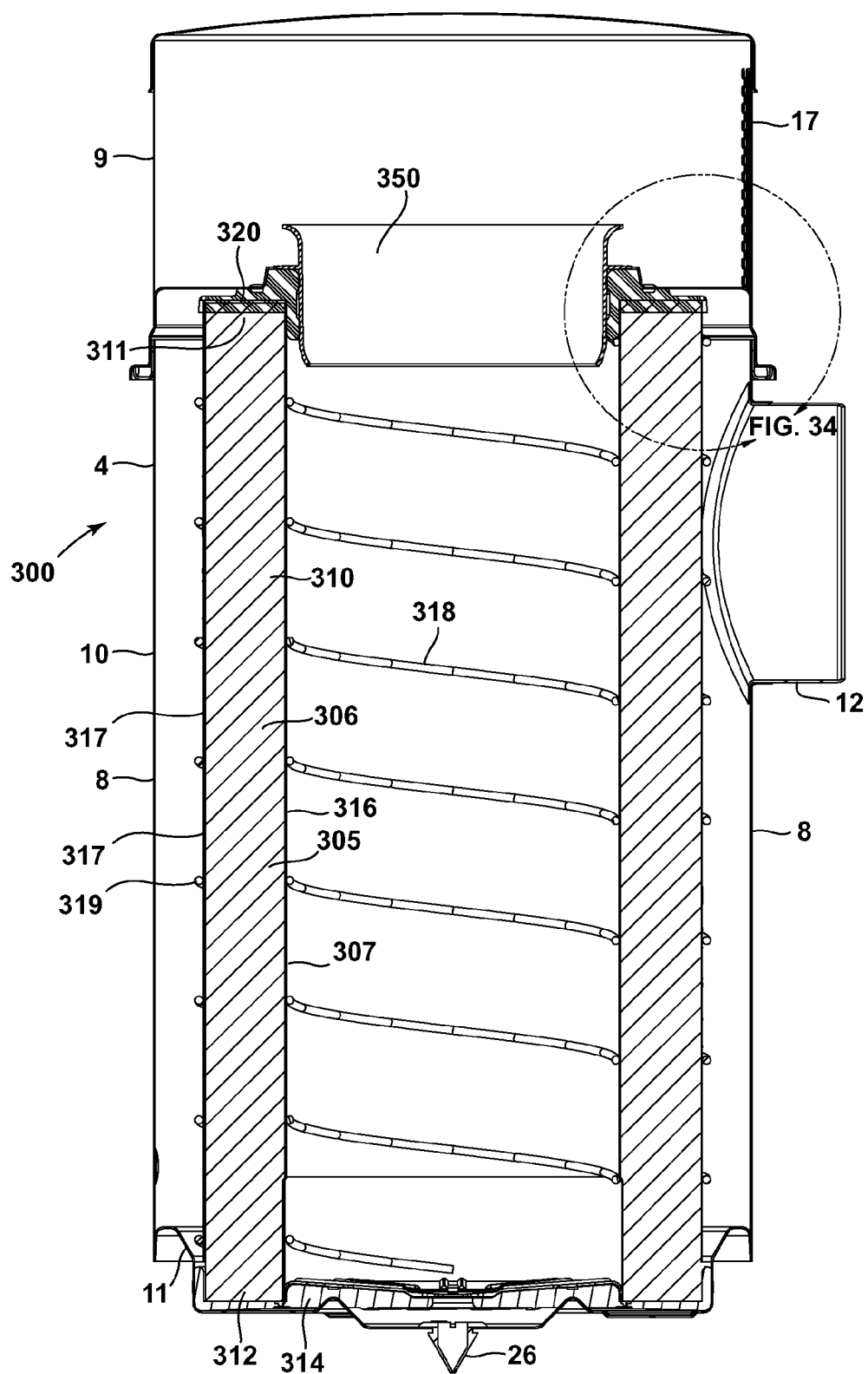
FIG. 33 is a schematic, cross-sectional view of a second alternate embodiment of an air cleaner assembly according to the present disclosure.
Figure 34:
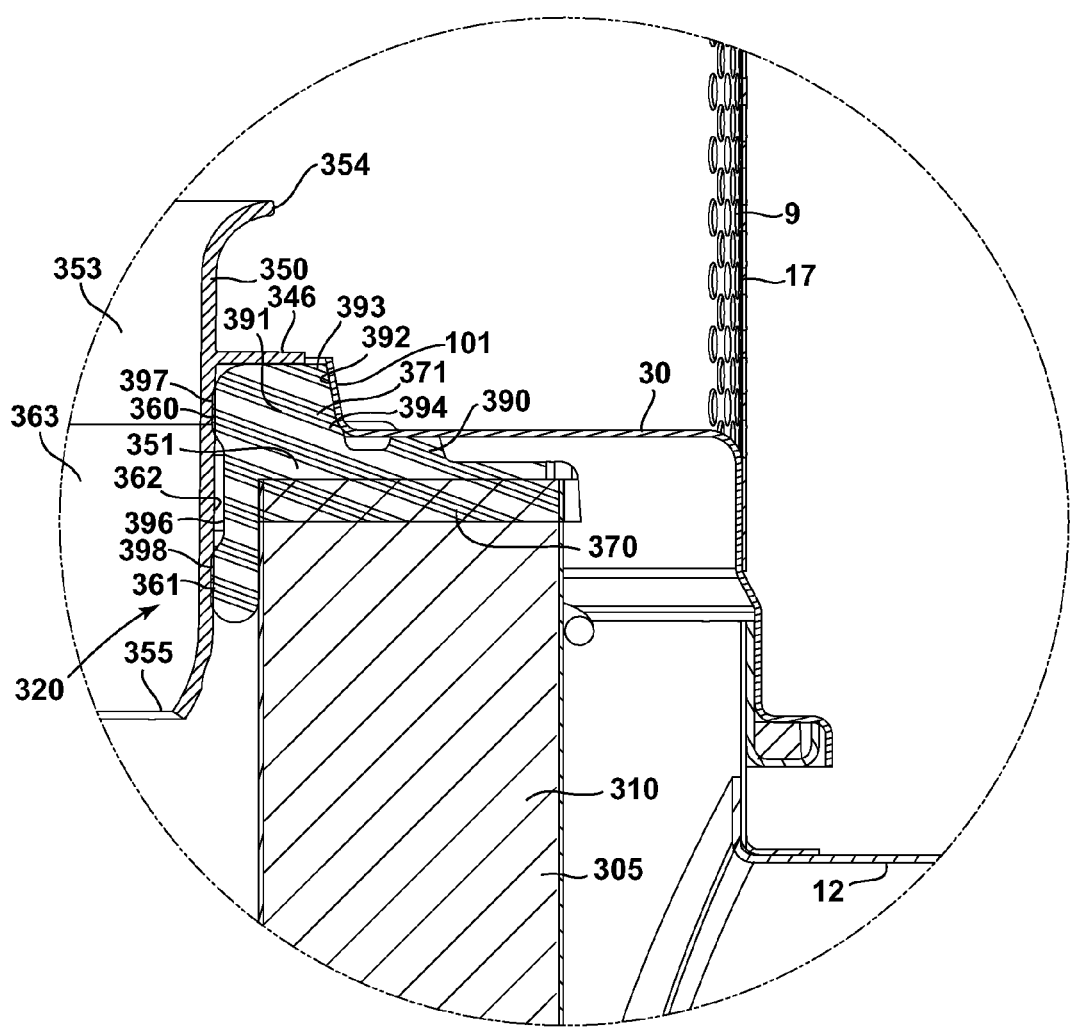
FIG. 34 is an enlarged, fragmentary, schematic view of a selected portion of FIG. 33.

Attention is now directed to FIGS. 33 and 34, in which a second alternate embodiment is depicted. In general, referring to FIG. 33, assembly 300 is depicted. The assembly 300 includes a housing 4 as generally previously defined. The housing 4 therefor, includes bottom 8, service access cover assembly 9. The difference between assembly 300 and assemblies 1 and 200 relates to cartridge 305.

In general, as with previous arrangements, cartridge 305 includes a media pack 306 surrounding and defining an interior 307. The media pack 306 includes media 310 extending between a first, upper, end 311 and a second, lower, end 312. Lower end 312 engages lower end cap 314, which can be generally analogous to end cap 42, FIG. 6.

The media pack 306 includes an inner support liner 316 and an outer support liner 317, with inner an outer adhesive coils 318, 319. These features can be generally analogous to similar features previously discussed.

The basic difference between cartridge 305 and cartridges 5, 205, relates to end cap 320 positioned on end 311 of media pack 306.

In particular, end cap 320 includes inlet tube section 350 positioned therein. However, the tube section 350 is not permanently attached to the end cartridge 305, but rather is removable therefrom. This will be understood further, by reference to FIG. 34.

Referring to FIG. 34, end cap 320 comprises molded-in-place section 351 and pre-form 350. Pre-form 350 generally defines an inner air flow inlet aperture or passageway 353 having an upwardly outwardly flared end 354 and a lower, inwardly, flared end 355. Ring 346, analogous to ring 114, FIG. 12, is present. A ring analogous to ring 115, FIG. 12, is not present; however one could be used if desired.

Pre-form 350 is secured to molded-in-place portion 351 by a releasable radial seal, formed at regions 360, 361, around an outer surface portion 362 of central portion 363, of pre-form 350.

Referring to FIG. 34, molded-in-place end cap 351 depicted, comprises two molded-in-place sections, 370, 371. Region 370 will typically comprise a relatively hard, axially, inner base end cap region, for example, molded from material analogous to region 92, FIG. 7. Region 371, on the other hand, is generally an axially outer, softer, more compressible region. For example it can be molded a foamed polyurethane similar to region 105, FIG. 7.

Still referring to FIG. 34, region 371 includes therein, housing air seal member 390, which can be generally analogous to region 90, previously discussed; and, housing water seal member 391 with outer peripheral surface 392 tapering outwardly in extension toward bottom 394; and positioned to engage flange 101 to form a radially directed water seal therewith.

Region 391, molded-in-place from a relatively soft, compressible urethane, also includes an inner periphery 396 having an upper radial inward projection 397 and a lower radial inward projection 398. These projections are sized and positioned for interference engagement with surface 362, as pre-from 350 is pushed into place. Thus, pre-from 350 comprising a tube member, can be pushed and sealed in position, after molded-in-place portions 321 of end cap 320 are formed. The tube section 350 can be separated from cartridge 5, after use, and installed in a new cartridge, if desired.

Cartridge 305 is not as desirable as cartridge 5, in many applications. However, it is functional, and will appropriately seal within housing 4.

C. A Third Alternate Embodiment, FIGS. 35-38

Figure 35:
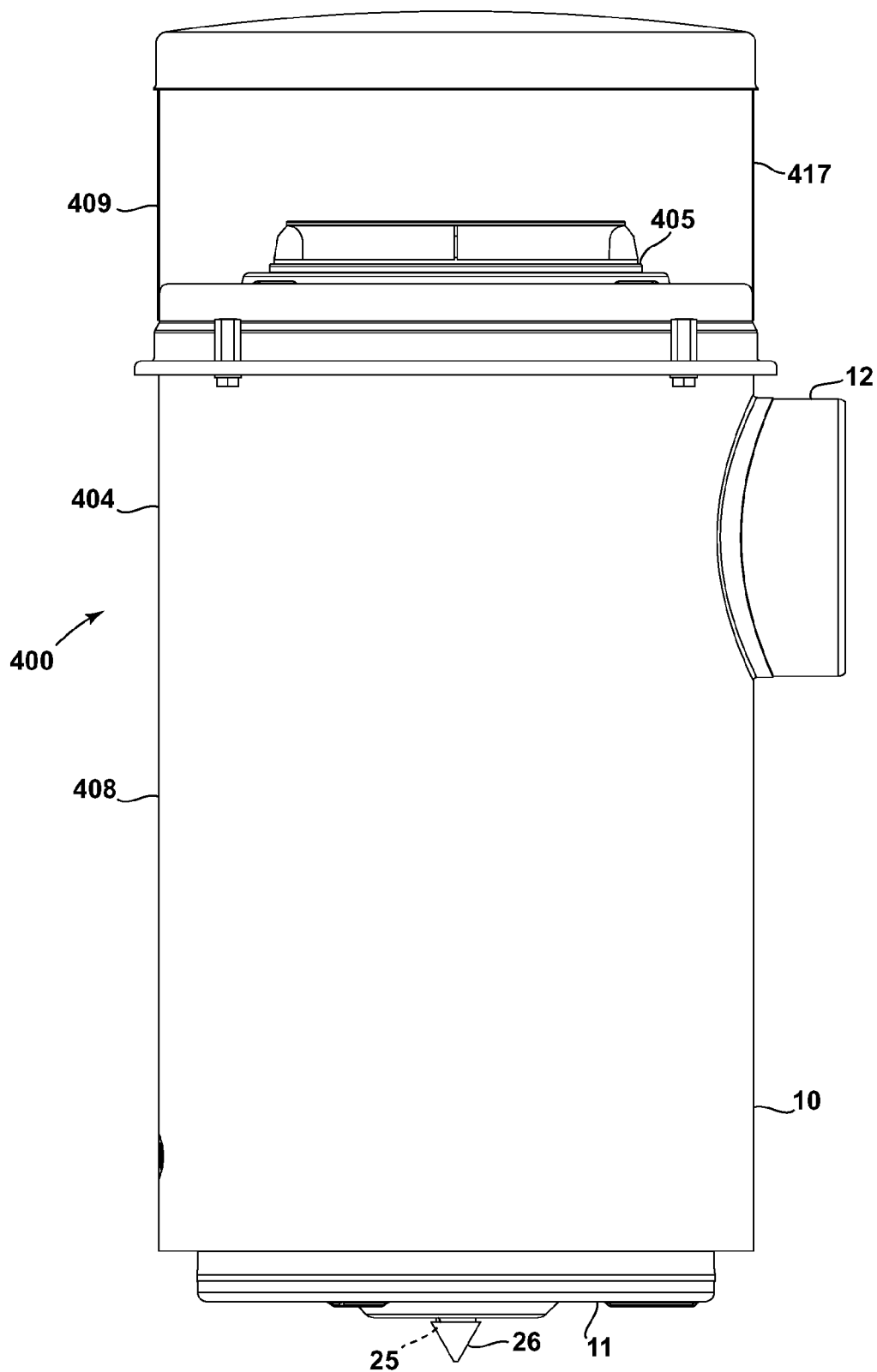
FIG. 35 is an enlarged, schematic, side elevational view of an air cleaner assembly according to the third alternate embodiment of the present disclosure.

The reference numeral 400, FIG. 35, indicates a further embodiment of an air cleaner assembly according to the present disclosure. Air cleaner assembly 400 includes a housing 404 comprising a housing body 408 and service cover assembly 409. The service cover assembly 409 is depicted schematically, with portions of a screen 417 removed, for viewing of an internal detail. Within the assembly 400 is positioned cartridge 405. Still referring to FIG. 35, assembly 400 includes: an air flow outlet tube 12; sidewall 10; and, a bottom 11 with a drain aperture 25 therethrough, and an evac valve arrangement 26 thereover. Features of the housing 404 can be generally analogous to those previously described.

Figure 36:
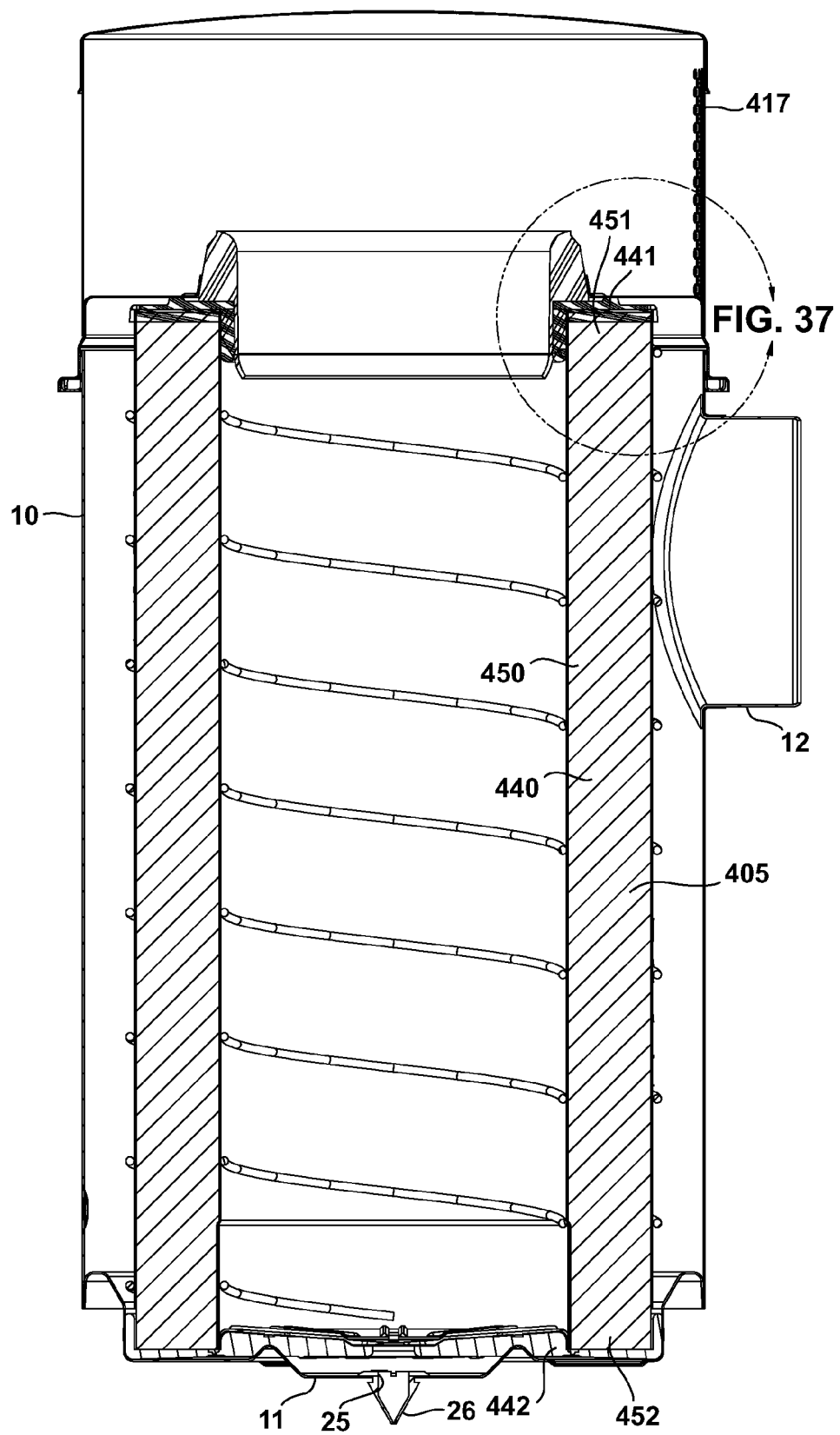
FIG. 36 is schematic, cross-sectional view of the assembly depicted in FIG. 35.

Referring to FIG. 36, a cross-sectional view, cartridge 405 can be seen to include a media pack 440 comprising media 450 extending between first and second, opposite, ends 451, 452, analogously to previously described embodiments. End 452 is enclosed by end cap 442, generally analogous to previously described end cap 42. End 451 is closed by end cap 441.

Figure 37:
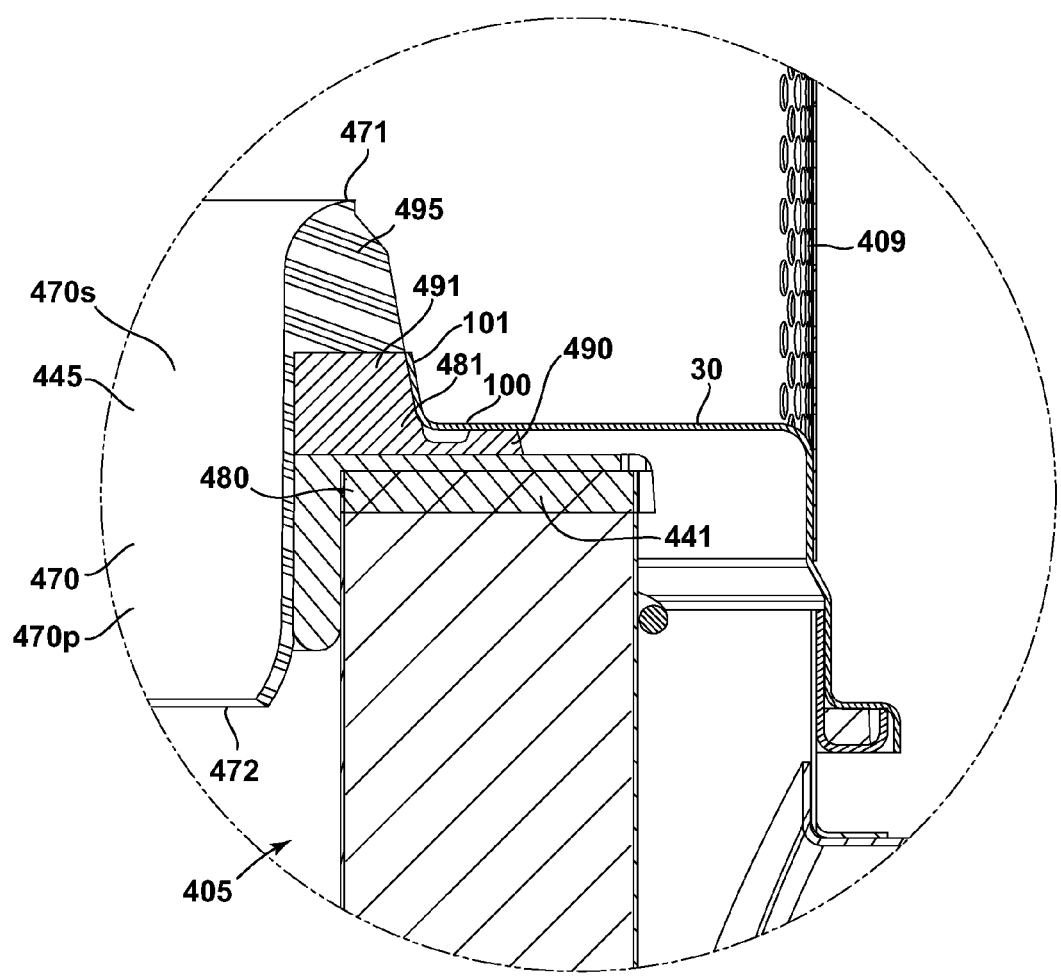
FIG. 37 is an enlarged, fragmentary, schematic view of the selected portion of FIG. 36.

Referring to FIG. 37, an enlarged fragmentary schematic view of a portion of FIG. 36 is depicted. Here, end cap 441 can be seen to comprise first, axially inner, base section 480 and a second, axially outer, compressible section 481 having an air seal member 490 thereon, and a water seal member 491. Seal members 490, 491, can be generally as previously described for analogous features.

Still referring to FIG. 37, cartridge 405 includes a pre-from 470p positioned therein, to form inlet tube section 470. The pre-form 470p defines inlet aperture 445 for the cartridge 405. Pre-from 470p defines a flow surface 470s, extending between outer end 471 and inner end 472. Outer end 471 is flared or belled outwardly, and inner end 472 is flared or curved inwardly. These features are generally analogous to those previously discussed.

Typically, the pre-from 470*p* will be formed from a relatively hard plastic. The particular pre-form 470 depicted, would be formed and embedded permanently within end cap 441. The end cap 441 can be formed from two different materials, relatively hard material forming region 480 and a relatively soft compressible material forming region 481. Materials and features suitable for this can be as previously described.

Figure 38:
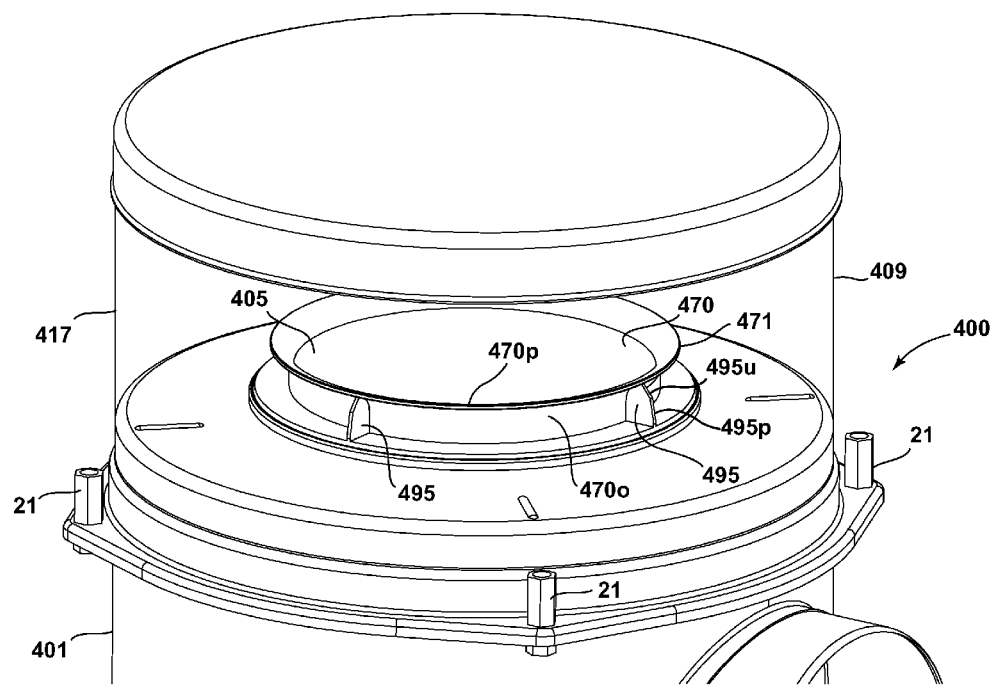
FIG. 38 is a fragmentary, schematic, top perspective view of a portion of the assembly depicted in FIG. 35, again with a screen removed for viewing internal detail.

Attention is now directed to FIG. 38, a fragmentary schematic top perspective view of a portion of assembly 400. Here, an upper portion of pre-form 470*p* adjacent upper edge or tip 471 can be seen. It can be observed that underneath the outer flare of tip 471 are provided a plurality of spaced projections 495. The particular spaced projections 495 extend from an outer portion of 470*o* of pre-from 470*p* surrounding an outer region of tube section 470 underneath outer flange 471. For the particular example depicted, the flanges 495 extend vertically, and project radially outwardly. Flanges 495 will provide bearing surfaces for flange 101, FIG. 37, as service cover assembly 409 is lowered, and centered. Thus, the flanges 495 provide for engagement with housing flange 101, while centering the cartridge 405, as the access cover assembly 409 is lowered and aligned for tightening of nuts 21, FIG. 38. To facilitate this, each flange 495 as an upper tapered section 495*u*, and a lower edge section 495*p*; the upper edge section 495*u* extending downwardly at a less steep slant than edge section 495*p*.

It is noted that the cartridge 405 configuration of FIGS. 36-38, although usable, is not as advantageous as the cartridge 5 of assembly 1. A reason for this is that the flanges 495 provide obstructions, to air flow around surface 470*o*. This could cause a whistling effect or other undesirable flow, as the air cleaner assembly 401 is mounted on the side of a truck, and moved at highway speeds. In contrast, cartridge 5, FIG. 6, does not include any flange arrangements which would provide substantial obstruction to flow circling pre-from 470. Flanges 114, 115 do not provide substantial vertical blockage to flow around an outer portion pre-from 470. That is, each of flanges 114, 115 generally has a small vertical profile, consistent with a smooth air flow.

III. Methods of Assembling a Filter Cartridge, FIGS. 39 and 40

According to the present disclosure, some techniques in forming a air filter cartridge are provided. With respect to this, attention is directed to FIGS. 39 and 40.

Figure 39:
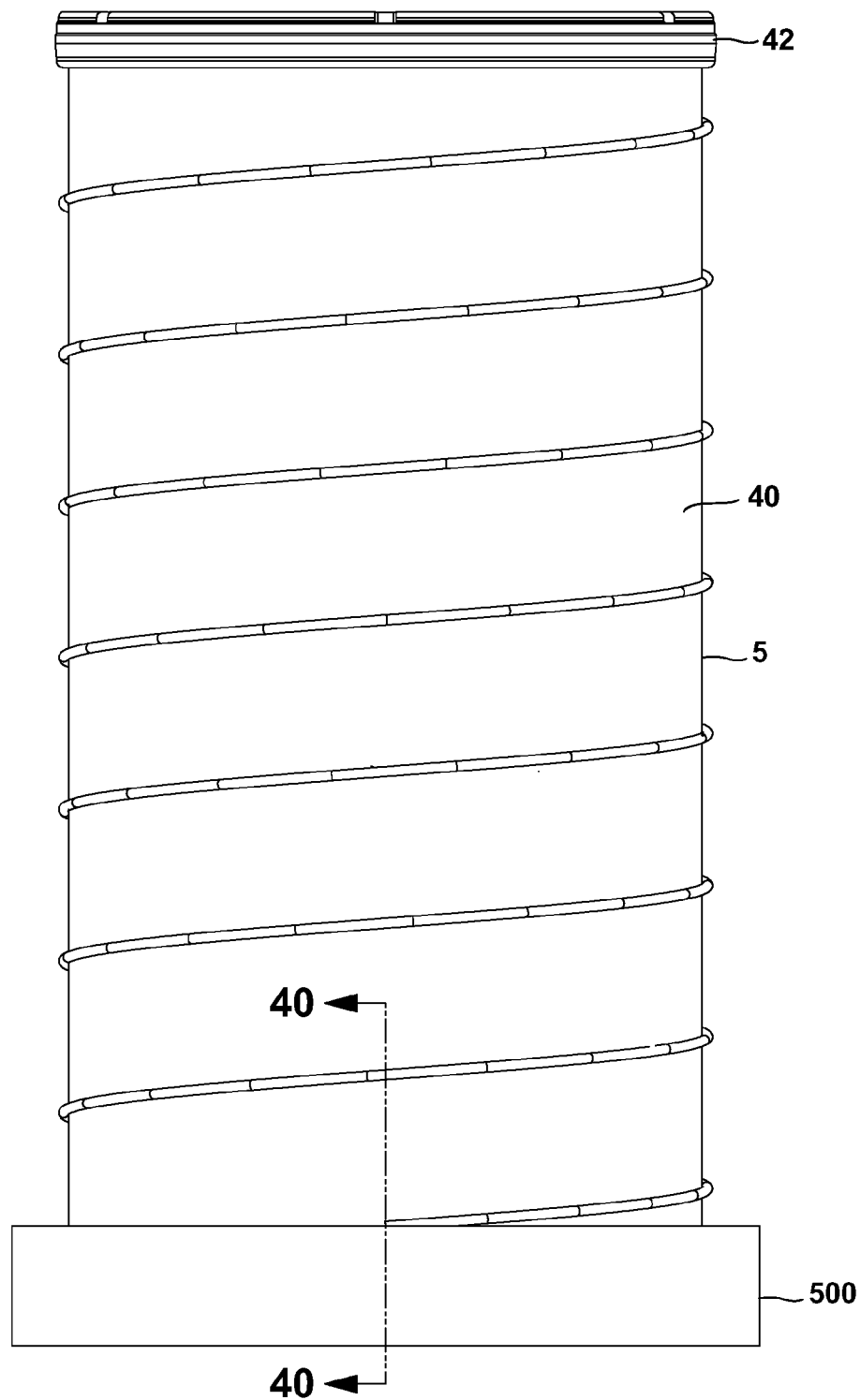
FIG. 39 is a schematic side elevational view of a step of forming an end cap of a filter cartridge according to the present disclosure.

In FIG. 39, a filter cartridge depicted being formed, corresponds to cartridge 5, FIG. 6. In FIG. 39, a final step relating to the formation of end cap 41 is being conducted. Thus, referring to FIG. 39, cartridge 5 comprises a media pack 40 having an end cap 42 already formed. The cartridge 5 is positioned directing downwardly into mold arrangement 500, for formation of the end cap 41.

Figure 40:
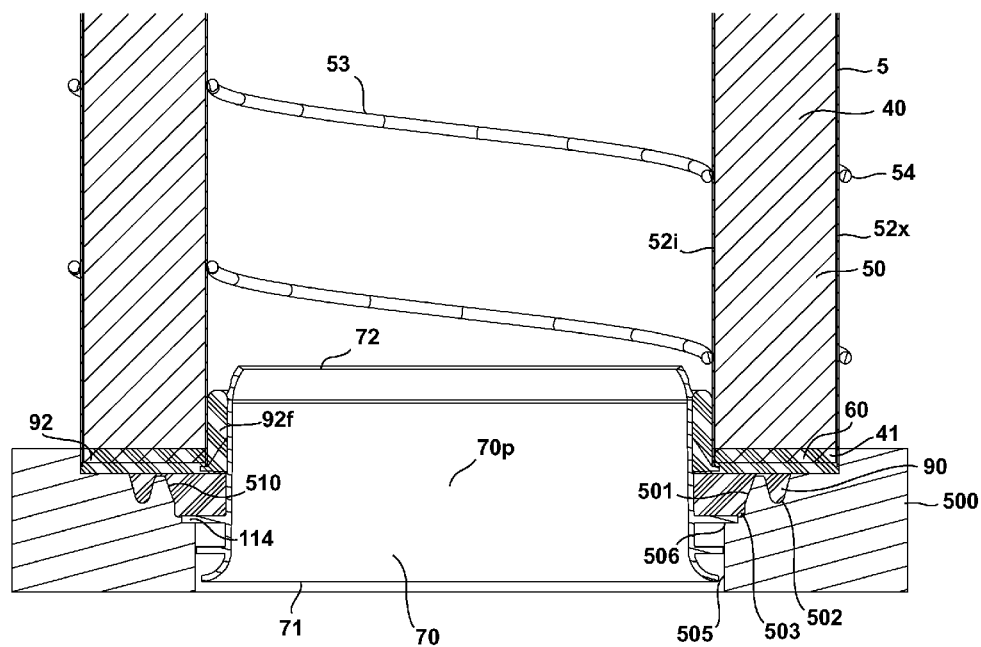
FIG. 40 is an enlarged schematic cross-sectional view of a identified portion of FIG. 39.

In FIG. 40, a fragmentary schematic cross-sectional view showing formation of end cap 41, FIG. 6, is depicted. Referring to FIG. 40, the media pack 40 comprises media 50 positioned between an inner liner 52*i* and outer liner 52*x*. Media end 60 is shown directed downwardly into mold 500.

Referring to FIG. 40, mold 500 can be seen to define a mold cavity 501 configured for formation of molded-in-place portions of end cap 41. In particular, cavity 501 is configured to define a recess 502, for formation of seal member 90; and, recess portion 503 configured for formation of water seal member 91. Mold cavity 500 includes a central aperture or bore 505 therethrough, and a shelf 506.

Pre-from 70 is positioned with ring 114 resting on shelf 506, and with tip 71 projecting downwardly and tip 72 projecting upwardly. Thus, when the pre-form 70*p* is positioned within the mold 500, it forms a radially inner portion of the mold, and closes the mold. Resin appropriate for forming region 105 (seal projections 90, 91) would then be poured within in the cavity 510, formed by mold cavity 501 and pre-form 70*p*. Above that resin material, would be poured the resin material appropriate for forming base region 92. Region 92*f* is a free rise region of resin forming region 92. The amount of free rise in this region may vary, depending on the specific formulation of the resin.

It is noted that some of the alternate embodiments described herein, can be manufactured using a similar approach. Also, an order of steps can be varied.

IV. General Comments

According to the present disclosure, air filter cartridge arrangements are provided. In at least one example arrangement described herein, the air filter cartridge arrangement comprises a air filter cartridge including a media pack comprising media surrounding an open interior and having and second ends. A first end cap is positioned on a first end of the media. The first end cap includes a central air flow inlet aperture positioned to direct through the first end cap and into the open interior.

The filter cartridge further includes a housing axial seal ring surrounding, and spaced radially outwardly from, the central air flow inlet aperture. Further, in example arrangements, a water seal projection is positioned spaced radially inwardly from, and surrounded by, the housing axial seal ring. The water seal projection has an outer, radially-directed, housing water seal surface. A water seal surface is typically continuous.

A second end cap is provided on a second end of the media.

In a typical example air filter cartridge arrangement of the type previously characterized, the water seal projection extends axially away from the media, further, typically a distance at least 2 mm further, than a free distance of axial extension of the housing axial air seal away from the media. By the term "free distance of axial extension" and variants thereof, in this context, reference is meant to the extension of the water seal projection and the axial air seal ring when neither is compressed by a structure such as a housing structure.

In at least one example air filter cartridge characterized herein, an air flow inlet tube or tube section is non-removably secured to the air flow cartridge. The air flow inlet tube section generally defines an inner flow surface surrounding and defining an air flow inlet aperture. The air flow inlet tube section has an outer end projecting axially at least 10 mm further from the media, than the free distance of axial extension and the housing axial air seal. Typically, this amount of extension is at least 15 mm further; and, often an amount within the range of 20-50 mm, inclusive, further, although alternatives are possible.

In an example arrangement described herein, the air flow inlet tube section inner flow surface is an outwardly flared outer end surface portion. That is, a portion of the inner flow surface, positioned remote from the media, as an outwardly flared inner surface. Typically, the inner flow surface has an outer flow radius within the range of 9-15 mm, inclusive, although alternatives are possible.

Also, in accord with an example described herein, the air flow inlet tube section inner flow surface has an inwardly flared inner end surface portion; the inner end surface portion being a portion most deeply extending into a region surrounded by the media. Although, alternatives are possible, typically the air flow inlet tube section inner flow surface has an inwardly flared inner end surface portion with an inner flare radius, i.e. radius of curvature, within the range of 18-32 mm, inclusive; typically within the range of 20-30 mm, inclusive.

In general, the typical air inlet tube section inner flow surface has smooth, open, s-shaped surface contour. By the term "open, s-shaped surface contour" it is meant that in cross-section, the air inlet tube inner flow surface generally defines an s-shape, but without the end curves extending completely back on themselves, i.e. the term "open" in this context is meant to refer to an s-shape which as been stretched open somewhat.

By the term "smooth" in this context, it is meant that the air inlet tube inner flow surface is generally free of bumps, ridges and grooves therein.

The typical air filter cartridge characterized herein is one having a second end cap that includes an outer perimeter with a housing radial seal portion thereon. Further, the second end cap typically includes a central portion with a drain aperture arrangement therethrough.

According to another aspect of the present disclosure, an air filter cartridge is provided which includes a media pack comprising media surrounding an open interior having first and second ends; a first end cap on a first end of the media; and, an air inlet tube section separate from a housing with which the air filter cartridge is removably used in use, the air inlet tube section extending through the first end cap to define a central air flow inlet aperture. Further, typically a housing axial seal ring (usually a continuous ring) is provided surrounding, and spaced radially outwardly from, the central air flow inlet aperture and the air inlet tube section. Typically, the air inlet tube section projects at least 10 mm beyond the first end of the media. Typically, a second end cap is provided on a second end of the media.

In an example air filter cartridge described, the media defines an outer media perimeter and an inner media perimeter; and, the axial air seal ring is positioned (i.e. centered) in axial overlap with the media first end at a location spaced at least 25% of a distance across the media first end from each of the inner and outer media perimeters. Typically, the housing axial air seal ring is centered, spaced at least 33% of a distance across the media first end from each of the inner and outer perimeters.

In example arrangements characterized herein, the media is pleated and the outer media perimeter is an outer pleat tip perimeter; and, the inner media perimeter is an inner pleat tip perimeter.

In some example arrangements characterized herein, the air inlet tube section is non-removable from a remainder of the first end cap. By the term "non-removable" in this context, it is meant that the air inlet tube section in the first end cap cannot be separated without damage to at least one or other.

Typically, the air inlet tube section comprises a pre-form non-removably secured to a remainder of the end cap.

In example alternate arrangements characterized herein, which the air inlet tube section comprises a pre-form that is removably secured to a remainder of the first end cap. In another example arrangement, the air inlet tube section is molded integral with a first end cap.

Typically, as previously characterized, the air inlet tube section includes an inner flow surface having radially outwardly flared outer axial surface portion and a radially inwardly flared inner axial surface portion. The air inlet tube section, as previously characterized above for an alternate characterization, typically has an inner surface, with a smooth, open, s-shaped contoured surface.

The filter cartridge typically includes a first end cap having water seal projection thereon spaced radially inwardly from the housing axial air seal ring; the water seal projection having an outer, radial, housing water seal surface; the water seal projection typically being radially continuous. Typically, the water seal surface has an outwardly tapered portion, in extension toward the media. This outwardly tapered portion may not comprise the entire water seal surface of the water seal projection.

In certain example air filter cartridges according to the present disclosure, the first end cap includes an axially inner molded-in-place base portion and axially outer molded-in-place seal portion.

When this is the case, the axially outer portion defines the housing air seal ring; and, if present, a water seal projection. The base portion typically comprises a hard, more dense, molding than the axial outer seal portion. For example, the axial outer portion molded-in-place can be provided to have a hardness, Shore A, of no greater than 20, typically no greater than 18, whereas the base portion can be provided with a hardness, Shore A, of no less than 22.

Typically, the second end cap includes an outer perimeter with an outer perimeter radial housing seal portion thereon, and a central drain aperture arrangement therethrough.

Typically, the air inlet tube section includes a centering projection arrangement thereon, projecting radially outwardly from the air inlet tube section. The centering projection can comprise a plurality of fins, for example vertical fins. Alternatively, the centering projection can comprise one or more radial center rings surrounding, and projecting radially outwardly from, adjacent portions of the air inlet tube section. In at least one example described, the centering projection arrangement includes a radial centering ring spaced from an outer end of the air inlet tube section toward the media in at least partial axial overlap with the media. In an example arrangement, the centering projection arrangement comprises two centering rings, vertically spaced from one another.

In yet another aspect of the present disclosure, an air filter cartridge is provided for removable positioning in an air cleaner housing. The air filter cartridge again comprises a media pack comprising media surrounding an open interior and having first and second ends. Further, the media defines an inner media perimeter and an outer media perimeter. The first end cap is provided on the first end of the media. A housing axial air seal ring is provided on the first end cap, positioned in axial overlap with the media, at a location spaced at least 25% of a distance across the media from the both inner media perimeter and the outer media perimeter. An air flow inlet tube section is non-removably secured to a remainder of the first end cap. The air flow inlet tube section projects axially outwardly from the media pack first end a distance at least 10 mm greater than a free distance projection of the housing axial air seal ring. Further, the air flow inlet tube section defines a flow aperture through the first end cap and in communication with the open interior. A second end cap is provided on the second end of the media, with a outer perimeter housing radial seal portion. Typically, the second end cap includes a drain aperture arrangement therethrough.

Specific features previously characterized can be included in this characterized aspect of the present disclosure.

According to another characterization of aspect of to the present disclosure, an air filter cartridge from removably positioning in an air cleaner housing for use is provided. The air cleaner filter cart includes a media pack comprising media surrounding an open interior and having first and second ends; the first end cap on a first end of the media, the first end cap defining a central air flow inlet aperture therethrough. A housing axial seal ring is provided surrounding, and spaced radially outwardly from, the central air flow inlet aperture. A projection arrangement on the first end cap is provided projecting axially further from the media pack of the housing axial air seal ring. This projection arrangement can comprise a water seal projection, an inlet flow tube section, or both. A second end cap is provided on a second end of the media. Features specifically characterized herein in the examples, can be applied in connection with this characterization of the techniques described herein.

According to yet another aspect of the present disclosure, an air filter cartridge removably positioned in an air cleaner housing for use is provided, having a media pack comprising media surrounding an open interior and having first and second ends. The first end cap is positioned on the first end of the media, the first end cap including a central air flow inlet aperture therethrough positioned to direct air through the first end cap into the open interior. An air flow inlet tube section surrounds and defines the air flow inlet aperture. The air flow inlet tube section can be non-removably contained within the first end cap, if desired.

The air flow inlet tube section has a central portion and an inner end. In an example described, the inner end has an inwardly radiused surface portion adjacent thereto, and curved inwardly over a radius within the range of 20-30 mm; and defining an inner flow diameter at the inner end at least 7 mm smaller than a central portion inner diameter of the air flow inlet tube section. Also, typically the housing has an axial seal ring surrounding, and spaced radially outwardly from, the central air flow inlet aperture. Further, a second end cap is positioned on the second end of the media, typically having an outwardly directed radial seal portion thereon.

Also, according to the present disclosure, air cleaner assemblies are provided. The air cleaner assemblies typically include a housing defining an interior and including an air flow inlet and an air flow outlet. In example arrangements depicted, the housing further includes a bottom drain outlet.

Filter cartridges as previously characterized can be operably positioned within the interior of the housing.

In example arrangements characterized herein, the housing includes a cover assembly with the seal plate. The seal plate has a lower axial seal surface and a inner water seal flange surrounding a central aperture. In an example depicted, a water seal flange is configured to be directed upwardly, when the air cleaner is installed in use.

Typically, filter cartridge as previously characterized, is positioned within the housing interior with an axial seal ring on a first end cap of the filter cartridge compressed by, and sealed to, a lower axial seal surface of the seal plate. Also in some aspects of the present disclosure, a water seal projection is provided on the first end cap, projecting into the central aperture of the seal plate, to a location surrounded by the inner flange. In this characterized assembly, the water seal projection will typically have an outer radial seal surface sealed to, and separable from, the inner flange.

The housing can be configured for engagement with other features of the cartridge as characterized herein. For example, it can be configured so that a inlet tube on the first end cap projects upwardly through the central aperture on the seal plate. The seal plate can be configured as a centering plate, and the cartridge can include a centering projection positioned radially interiorly of the central aperture of the seal plate.

Further, the cartridge can include a lower end cap with a radial seal perimeter, and a housing can include a seal surface for removable engagement by the radial seal perimeter of the second or lower end cap.

Also, the cartridge lower end cap can include a drain aperture therethrough, in operable alignment with the drain aperture arrangement and a bottom of the housing, allowing water to collect on an interior of the cartridge to drain through the lower drain arrangement in the cartridge, into the housing, and eventually through the bottom drain arrangement in the housing in an exterior of the housing.

In an example arrangement characterized herein, the housing includes a service access cover positioned above, and is secured to, a housing bottom section. The housing service or access cover can be provided with: a top; a side air flow screen; and, an inner centering seal ring, comprising at least in part a seal plate as previously described.

The access cover can be configured to be secured to the housing bottom section by a fastener arrangement, for example a bolt and nut arrangement.

Also according to the present disclosure, a method of installing an air filter cartridge and an air cleaner assembly housing is provided. The method generally involves using a service access cover of the air cleaner housing, to center the cartridge vertically, as the access cover is installed. This centering can be accomplished by engaging a ring on the surface over access assembly, with a centering projection on the filter cartridge, as a centering projection on the filter cartridge as it passed through the centering ring.

Methods of assembly are also described, in which a mold is provided along with a pre-form use as the air flow tube section. A pre-form is positioned in the mold, resin is poured therein, and the cartridge is then positioned in the mold extending upwardly therefrom. Within in the mold an end cap can be formed, securing the pre-form in place. There is no requirement that a specific assembly, feature, or method include all of the details characterized herein, in order to obtain some benefit according to the present disclosure.

What is claimed:

1. An air filter cartridge for removably positioning in an air cleaner housing for use; the air filter cartridge comprising:
   (a) a media pack comprising media surrounding an open interior and having first and second ends;
   (b) a first end cap on a first end of the media;
   (c) an air inlet tube section separate from the air cleaner housing and extending through the first end cap to define a central air flow inlet aperture;
      (i) the air inlet tube section comprising a pre-form non-removably secured to a remainder of the first end cap as part of the air filter cartridge;
   (d) a housing axial air seal ring surrounding, and spaced radially outwardly from, the central air flow inlet aperture and the air inlet tube section;
      (i) the air inlet tube section projecting at least 10 mm beyond the first end of the media; and,
      (ii) the axial seal ring having a tip remote from, and in overlap with, the media; the tip being positioned for releasable sealing with an air cleaner; in use; and,
   (e) a second end cap on the second end of the media.

2. An air filter cartridge according to claim 1 wherein:
   (a) the air flow inlet tube section inner flow surface has an outwardly flared outer end surface portion.

3. An air filter cartridge according to claim 1 wherein:
(a) the air inlet tube section has an inner surface with a smooth, open, S-shaped contoured surface.

4. An air filter cartridge according to claim 1 wherein:
(a) the first end cap includes a water seal projection thereon spaced radially inwardly from the housing axial air seal ring;
　(i) the water seal projection having an outer, radial, housing water seal surface.

5. An air filter cartridge according to claim 4 wherein:
(a) the housing water seal surface has an outwardly tapered portion, in extension toward the media.

6. An air filter cartridge according to claim 1 wherein:
(a) the media defines an outer media perimeter and an inner media perimeter; and,
(b) the housing axial air seal ring is positioned in axial overlap with the media first end at location spaced at least twenty-five percent (25%) of a distance across the media first end from each of the inner media perimeter and the outer media perimeter.

7. An air filter cartridge according to claim 1 wherein:
(a) the first end cap includes: an axially inner, molded-in-place, base portion, and an axially outer, molded-in-place, seal portion;
　(i) the axially outer, molded-in-place, seal portion defining the housing air seal ring; and, a water seal projection; and,
　(ii) the base portion comprising a harder, more dense, molding than the axially outer seal portion.

8. An air filter cartridge according to claim 1 wherein:
(a) the air inlet tube section includes a centering projection arrangement thereon projecting radially outwardly from the air inlet tube section.

9. An air filter cartridge for removably positioning in an air cleaner housing, for use; the air filter cartridge comprising:
(a) a media pack comprising media surrounding an open interior and having first and second ends;
　(i) the media defining an inner media perimeter and an outer media perimeter;
(b) a first end cap on a first end of the media;
(c) a housing axial air seal ring on the first end cap having a tip remote from the media; the tip being positioned in axial overlap with the media, at a location spaced at least 25% of a distance across the media from both the inner media perimeter and the outer media perimeter and positioned for releasable sealing engagement with an air cleaner in use;
(d) an air flow inlet tube section non-removably secured to a remainder of the first end cap;
　(i) the air flow inlet tube section projecting axially outwardly from the media pack first end a distance of at least 10 mm greater than a free distance of projection of the housing axial air seal ring; and,
　(ii) the air flow inlet tube section defining a flow aperture through the first end cap and in communication with the open interior; and,
(e) a second end cap on a second end of the media;
　(i) the second end cap including an outer perimeter housing radial seal portion.

10. An air filter cartridge for removably positioning in an air cleaner housing for use:
the air filter cartridge comprising:
(a) a media pack comprising media surrounding an open interior and having first and second ends;
(b) a first end cap on the first end of the media, the first end cap including:
　(i) a central air flow inlet aperture therethrough positioned to direct air through the first end cap into the open interior;
(c) an air flow inlet tube section surrounding and defining the air flow inlet aperture;
　(i) the air flow inlet tube section having a central portion and an inner end;
　　(A) the inner end having a inwardly radiused surface portion adjacent thereto, curved inwardly over a radius within the range of 20-30 mm; and, defining an inner air flow diameter at the inner end or least 7 mm smaller than the central portion inner diameter;
(d) a housing axial air seal ring surrounding, and spaced radially outwardly from, the central air flow inlet aperture; and,
(e) a second end cap on the second end of the media; the second end cap having an outer perimeter with an outwardly directed seal portion thereon.

11. An air filter cartridge according to claim 10 wherein:
(a) the air flow inlet tube section is non-removably secured to a remainder of the first end cap.

12. An air filter cartridge for removably positioning in an air cleaner housing for use:
the air filter cartridge comprising:
(a) a media pack comprising media surrounding an open interior and having first and second ends;
(b) a first end cap on the first end of the media, the first end cap including:
　(i) a central air flow inlet aperture therethrough positioned to direct air through the first end cap into the open interior;
(c) an air flow inlet tube section non-removably secured to a remainder of the first end cap and surrounding and defining the air flow inlet aperture;
　(i) the air flow inlet tube section having a central portion and an inner end;
(d) a housing axial air seal ring surrounding, and spaced radially outwardly from, the central air flow inlet aperture; and,
(e) a second end cap on the second end of the media; the second end cap having an outer perimeter with an outwardly directed seal portion thereon.

13. An air filter cartridge for removably positioning in an air cleaner housing for use; the air filter cartridge comprising:
(a) a media pack comprising media surrounding an open interior and having first and second ends;
(b) a first end cap on a first end of the media;
(c) an air inlet tube section separate from the housing and extending through the first end cap to define a central air flow inlet aperture;
(d) a housing axial air seal ring surrounding, and spaced radially outwardly from, the central air flow inlet aperture and the air inlet tube section;
　(i) the air inlet tube section projecting at least 10 mm beyond the first end of the media; and,
(e) a second end cap on the second end of the media;
(f) the first end cap including a water seal projection thereon spaced radially inwardly from the housing axial air seal ring;
　(i) the water seal projection having an outer, radial, housing water seal surface; and,
(g) the water seal projection extending axially, away from the media, a distance at least 2 mm further than a free distance of axial extension of the housing axial air seal ring away from the media.

14. An air filter cartridge for removably positioning in an air cleaner housing for use; the air filter cartridge comprising:
(a) a media pack comprising media surrounding an open interior and having first and second ends;
(b) a first end cap on a first end of the media;
(c) an air inlet tube section separate from the housing and extending through the first end cap to define a central air flow inlet aperture;
  (i) the air inlet tube section including an inner flow surface having an inwardly flared inner end surface portion;
(d) a housing axial air seal ring surrounding, and spaced radially outwardly from, the central air flow inlet aperture and the air inlet tube section;
  (i) the air inlet tube section projecting at least 10 mm beyond the first end of the media; and,
(e) a second end cap on the second end of the media.

15. An air filter cartridge according to claim 14 wherein:
(a) the media defines an outer media perimeter and an inner media perimeter; and,
(b) the housing axial air seal ring is positioned in axial overlap with the media first end at location spaced at least twenty-five percent (25%) of a distance across the media first end from each of the inner and outer media perimeters.

16. An air filter cartridge according to claim 14 wherein:
(a) the first end cap includes a water seal projection thereon spaced radially inwardly from the housing axial air seal ring;
  (i) the water seal projection having an outer, radial, housing water seal surface.

17. An air filter cartridge according to claim 16 wherein:
(a) the water seal projection extends axially, away from the media, a distance at least 2 mm further than a free distance of axial extension of the housing axial air seal ring away from the media.

18. An air filter cartridge according to claim 16 wherein:
(a) the housing water seal surface has an outwardly tapered portion, in extension toward the media.

19. An air filter cartridge according to claim 18 wherein:
(a) the first end cap includes: an axially inner, molded-in-place, base portion, and an axially outer, molded-in-place, seal portion;
  (i) the axially outer portion defining the housing air seal ring; and, the water seal projection;
  (ii) the base portion comprising a harder, more dense, molding than the axially outer seal portion.

20. An air filter cartridge according to claim 19 wherein:
(a) the air inlet tube comprises a pre-form non-removably embedded in the axially inner, molded-in-place base portion of the first end cap.

21. An air filter cartridge according to claim 14 wherein:
(a) the air inlet tube section includes a centering projection arrangement thereon projecting radially outwardly from the air inlet tube section.

22. An air filter cartridge according to claim 21 wherein:
(a) the centering projection arrangement comprises a plurality of vertical fins.

23. An air filter cartridge according to claim 21 wherein:
(a) the centering projection arrangement comprises at least one radial centering ring surrounding, and projecting outwardly from, an adjacent portion of the air inlet tube section;
  (i) the radial centering ring being spaced from an outer end of the air inlet tube section, toward the media, and in at least partial axial overlap with the media.

24. An air filter cartridge for removably positioning in an air cleaner housing for use; the air filter cartridge comprising:
(a) a media pack comprising media surrounding an open interior and having first and second ends;
(b) a first end cap on a first end of the media;
(c) an air inlet tube section separate from the housing and extending through the first end cap to define a central air flow inlet aperture;
(d) a housing axial air seal ring surrounding, and spaced radially outwardly from, the central air flow inlet aperture and the air inlet tube section;
  (i) the air inlet tube section projecting at least 10 mm beyond the first end of the media; and,
(e) a second end cap on the second end of the media;
(f) the first end cap including a water seal projection thereon spaced radially inwardly from the housing axial air seal ring;
  (i) the water seal projection having an outer, radial, housing water seal surface; and,
  (ii) the housing water seal surface having an outwardly tapered portion, in extension toward the media; and,
(g) the first end cap including: an axially inner, molded-in-place, base portion, and an axially outer, molded-in-place, seal portion;
  (i) the axially outer, molded-in-place, seal portion defining the housing air seal ring; and, the water seal projection; and,
  (ii) the base portion comprising a harder, more dense, molding than the axially outer seal portion.

25. An air filter cartridge for removably positioning in an air cleaner housing for use; the air filter cartridge comprising:
(a) a media pack comprising media surrounding an open interior and having first and second ends;
(b) a first end cap on a first end of the media;
(c) an air inlet tube section separate from the housing and extending through the first end cap to define a central air flow inlet aperture;
(d) a housing axial air seal ring surrounding, and spaced radially outwardly from, the central air flow inlet aperture and the air inlet tube section;
  (i) the air inlet tube section projecting at least 10 mm beyond the first end of the media; and,
(e) a second end cap on the second end of the media;
(f) the air inlet tube section including a centering projection arrangement thereon projecting radially outwardly from the air inlet tube section;
  (i) the centering projection arrangement comprising a plurality of vertical fins.

26. An air cleaner assembly comprising:
(a) a housing defining an interior including an air flow inlet; and, an air flow outlet;
(b) an air filter cartridge operably positioned within the interior of the housing; the air filter cartridge comprising:
  (i) a media pack comprising media surrounding an open interior and having first and second ends;
  (ii) a first end cap on a first end of the media;
  (iii) an air inlet tube section separate from the housing and extending through the first end cap to define a central air flow inlet aperture;
  (iv) a housing axial air seal ring surrounding, and spaced radially outwardly from, the central air flow inlet aperture and the air inlet tube section;
    (A) the air inlet tube section projecting at least 10 mm beyond the first end of the media; and,
  (v) a water seal projection on the first end cap positioned radially inwardly from the housing axial air seal ring; and,
  (vi) a second end cap on the second end of the media;

(c) the housing including a cover assembly with a centering and seal plate having:
  (i) a lower axial seal surface; and,
  (ii) an inner flange surrounding a central aperture; and,
(d) the filter cartridge being positioned within the housing interior with:
  (i) the axial seal ring on a first end cap of the filter cartridge compressed by, and sealed to, the lower axial seal surface of the centering and seal plate; and,
  (ii) the water seal projection on the filter cartridge extending into the central aperture of the centering and seal plate; the water seal projection having an outer radial seal surface sealed to the inner flange of the centering plate.

* * * * *